Oct. 8, 1940.   R. H. LAWSON ET AL   2,217,022
SOLID COLOR PATTERN KNITTING MACHINE
Filed Oct. 26, 1937   45 Sheets-Sheet 2

INVENTORS:
ROBERT H. LAWSON,
ISAAC H. C. GREEN,
BY Roy F. Lovell
ATT'Y.

Oct. 8, 1940.   R. H. LAWSON ET AL   2,217,022
SOLID COLOR PATTERN KNITTING MACHINE
Filed Oct. 26, 1937   45 Sheets-Sheet 7

INVENTORS:
ROBERT H. LAWSON,
ISAAC H. C. GREEN,
By Roy R. Lovell,
ATT'Y.

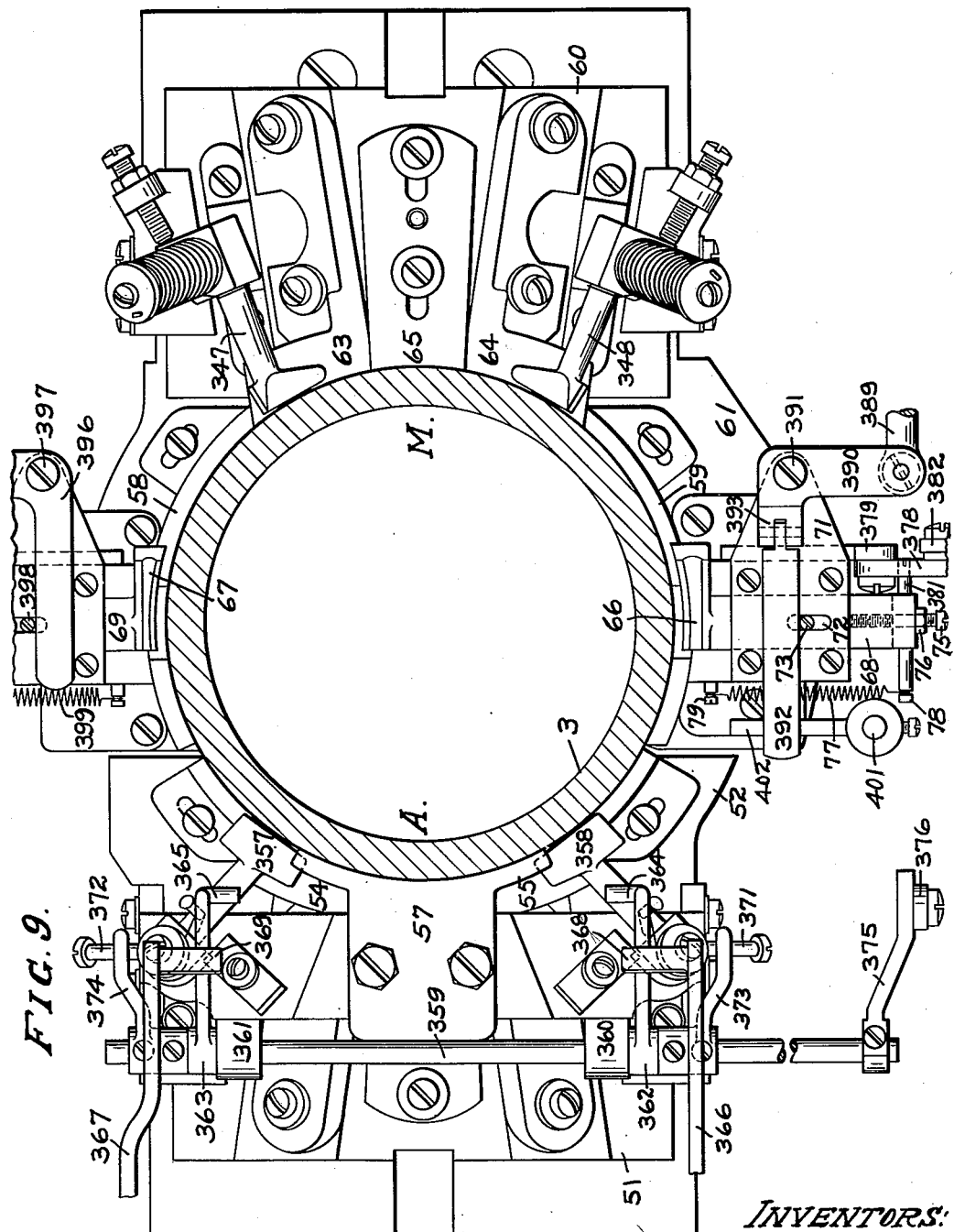

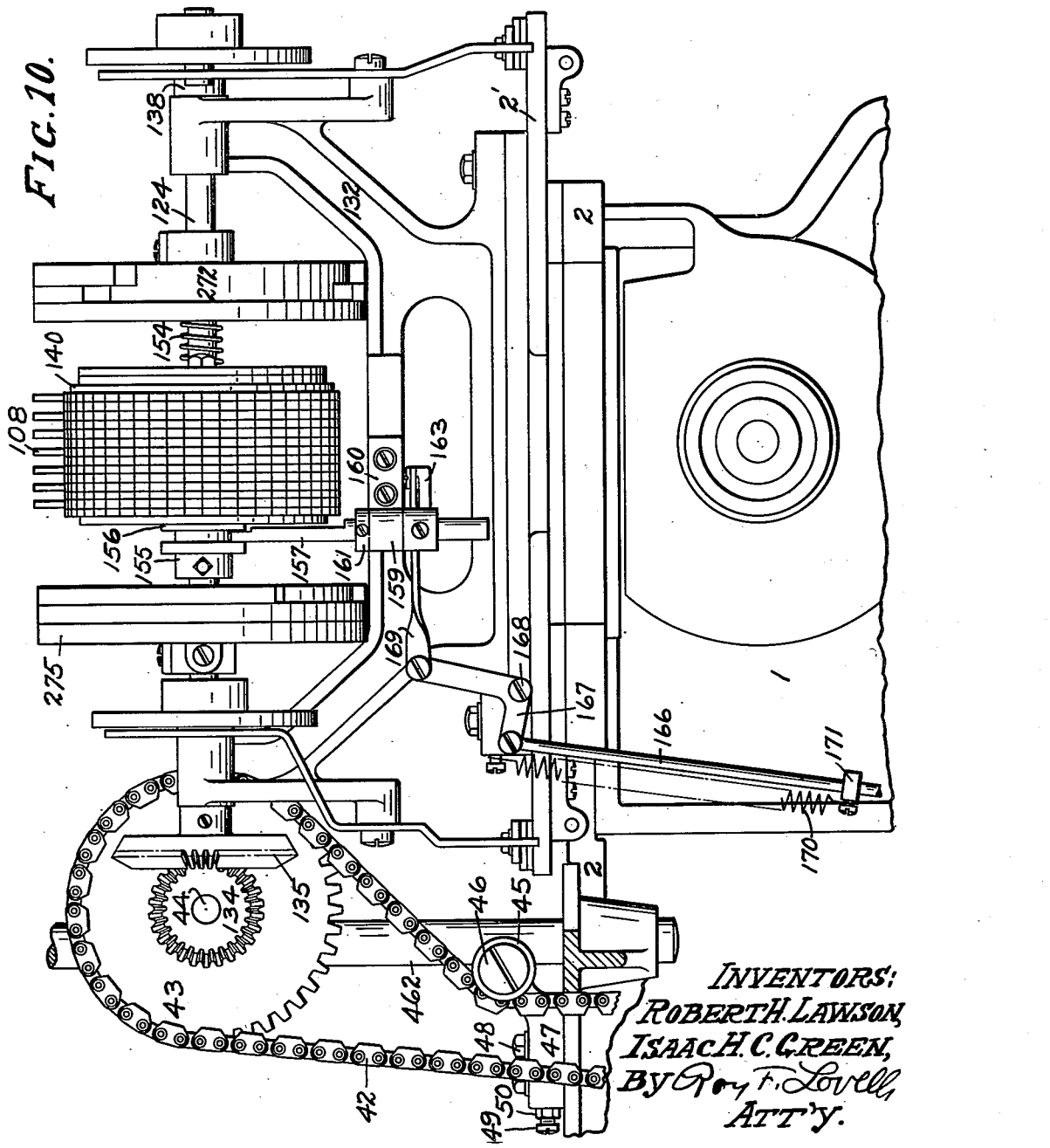

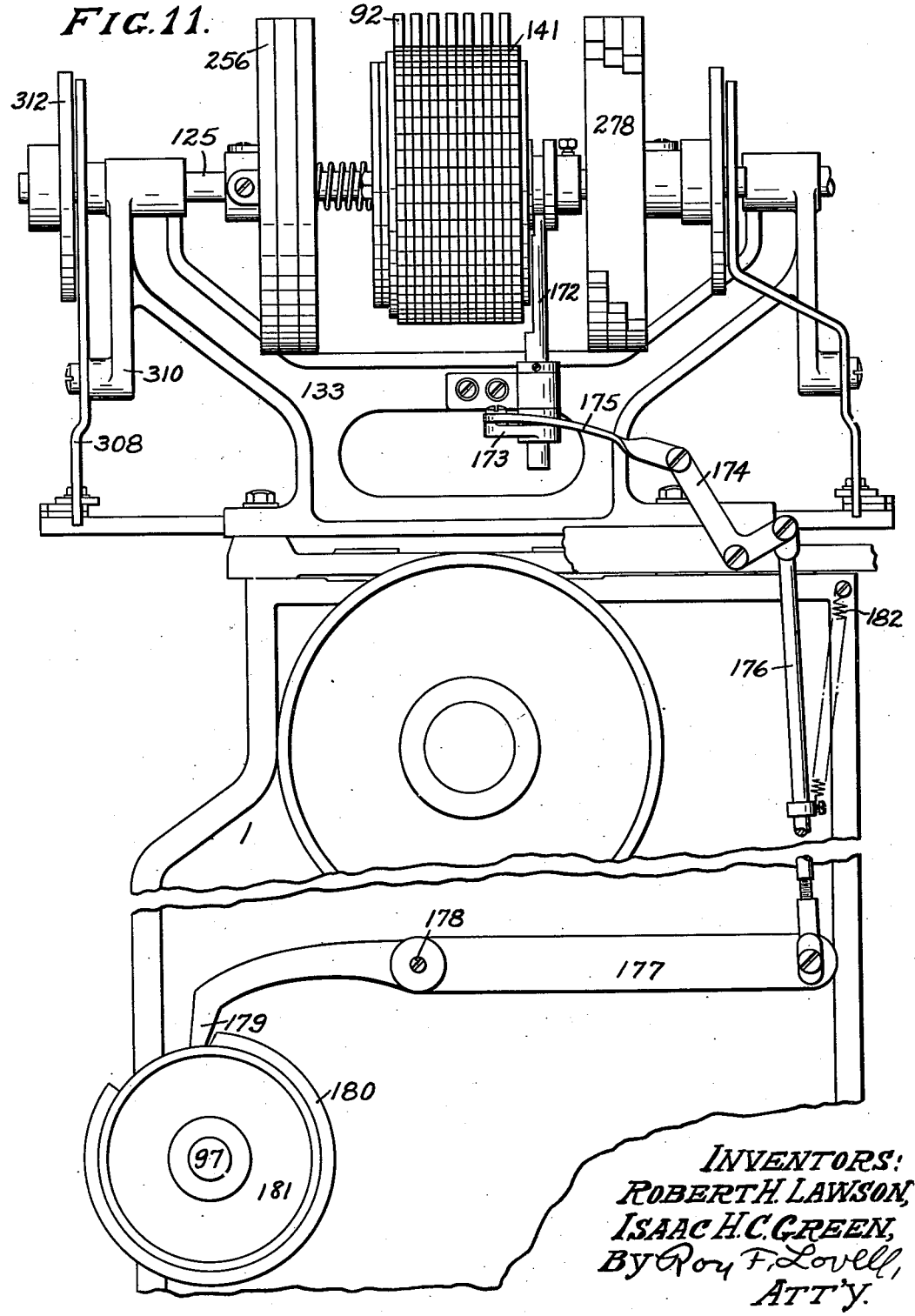

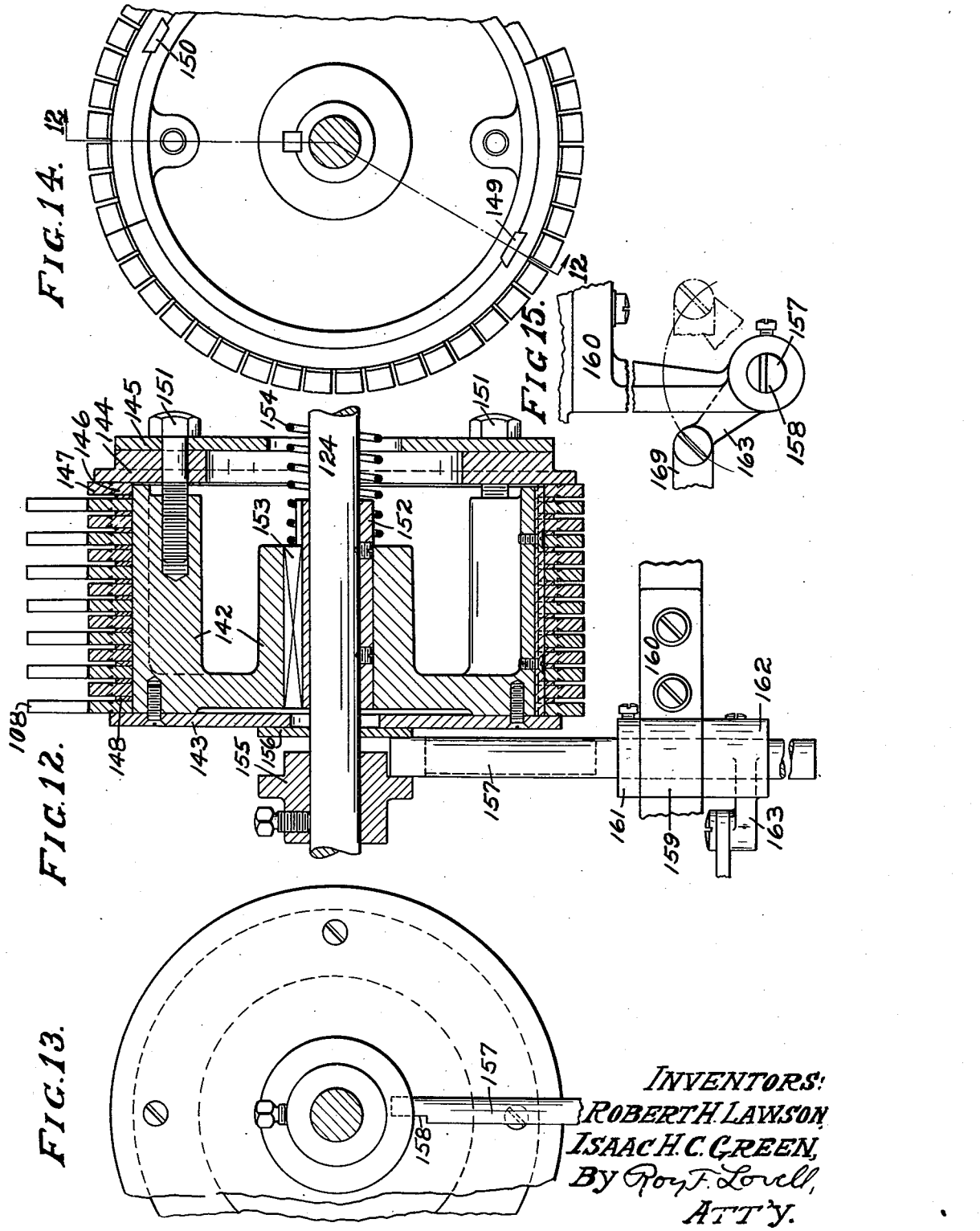

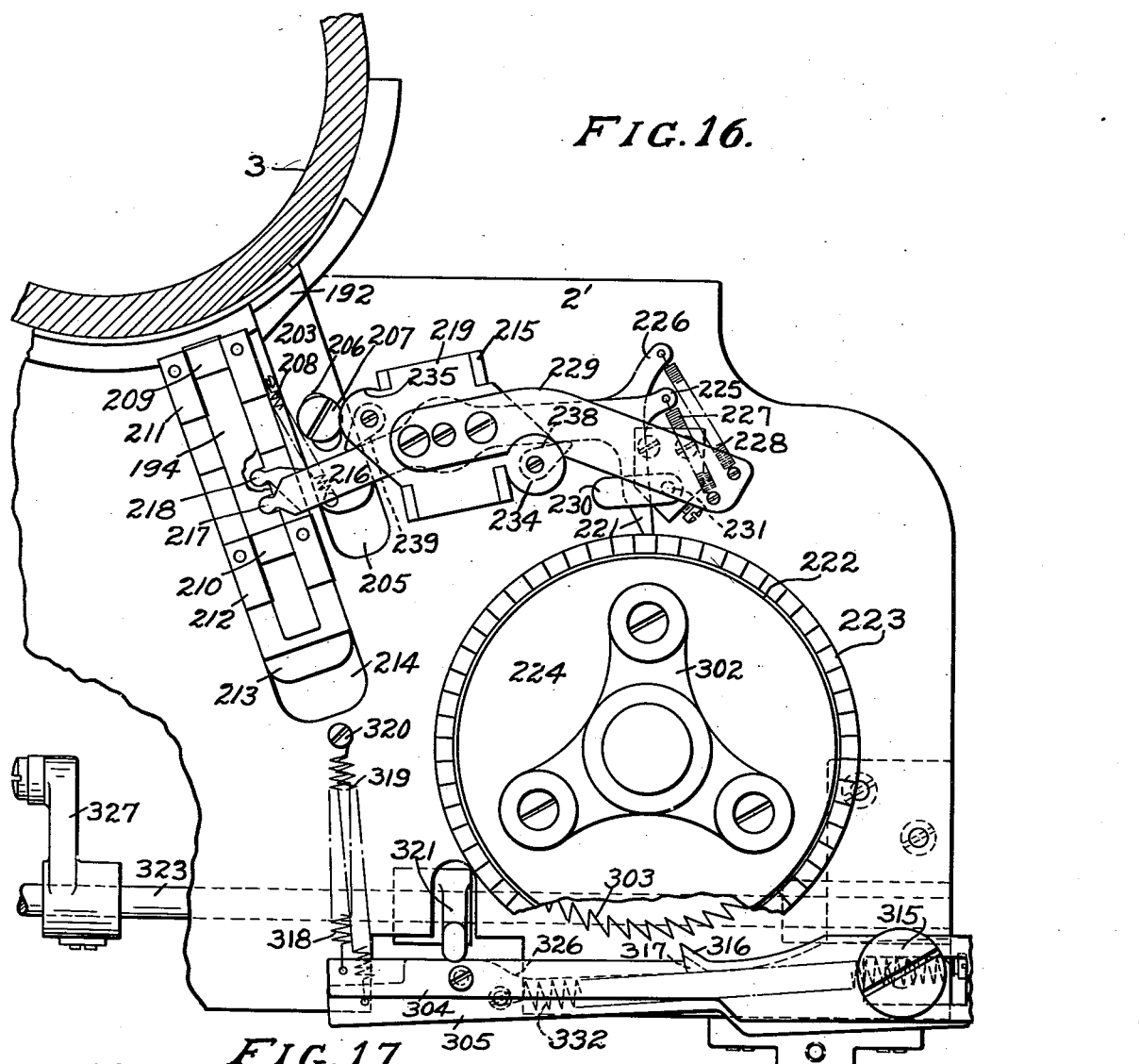
FIG. 16.
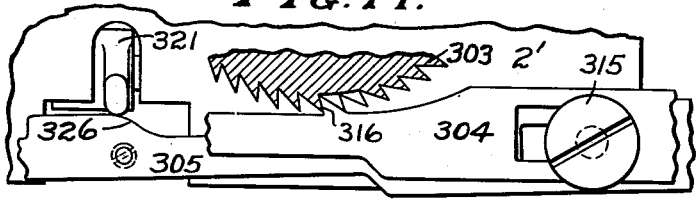
FIG. 17.
FIG. 18.    FIG. 19.
INVENTORS:
ROBERT H. LAWSON,
ISAAC H. C. GREEN,
By Roy F. Lovell
ATT'Y

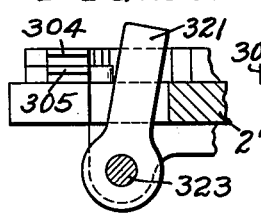
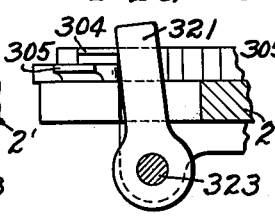
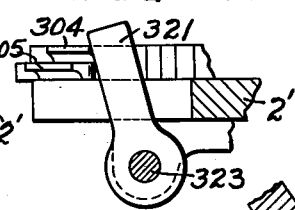
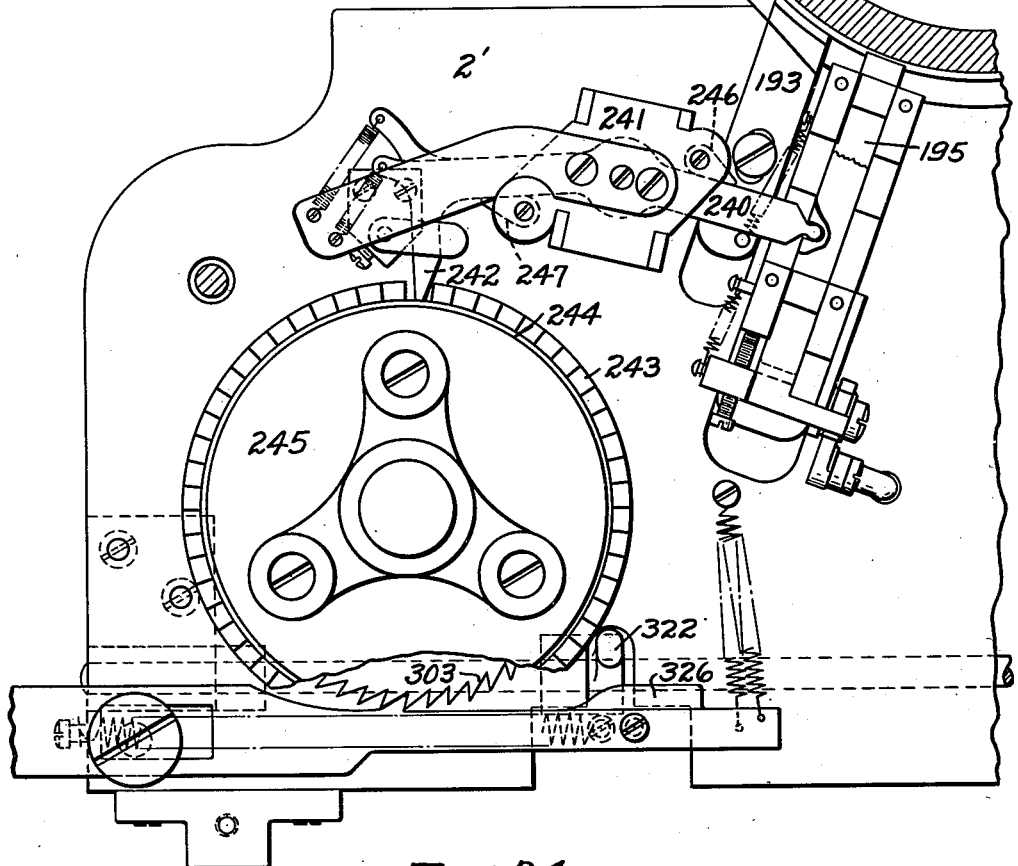
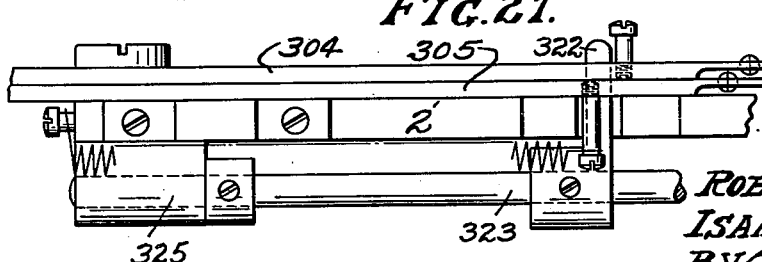

Oct. 8, 1940. R. H. LAWSON ET AL 2,217,022
SOLID COLOR PATTERN KNITTING MACHINE
Filed Oct. 26, 1937 45 Sheets-Sheet 14
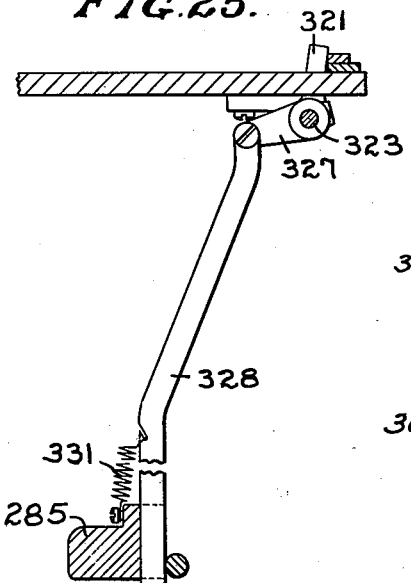
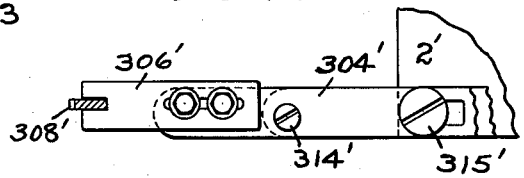
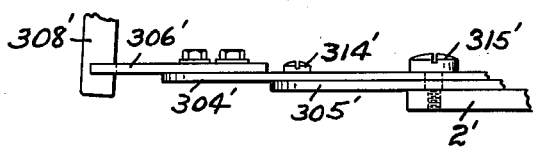
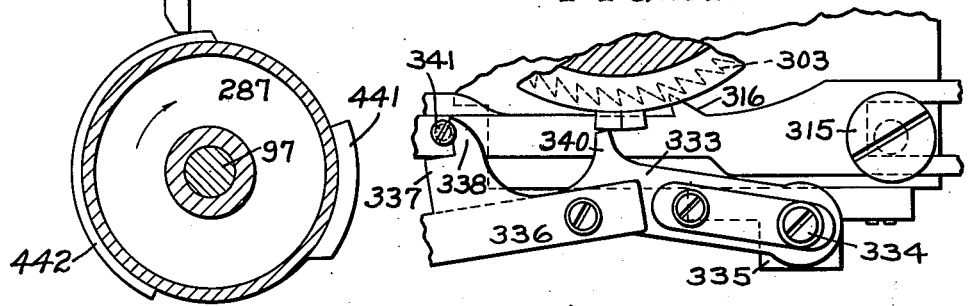
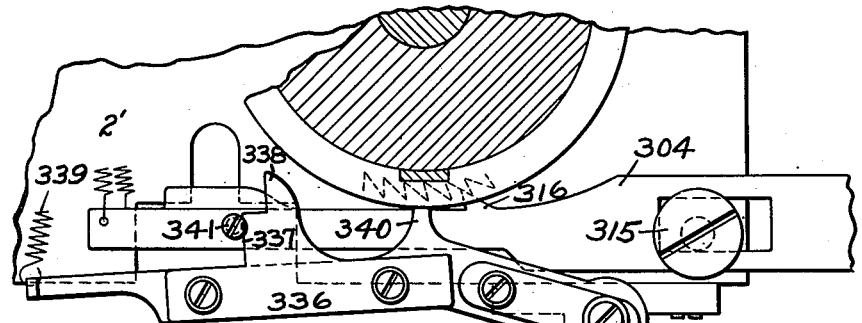
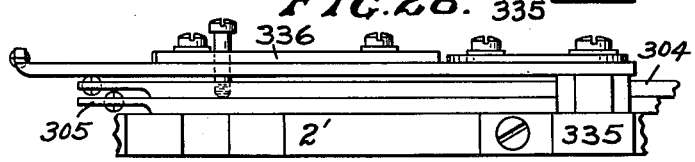
INVENTORS:
ROBERT H. LAWSON,
ISAAC H. C. GREEN,
By Roy F. Lovell,
ATT'Y.

Oct. 8, 1940. R. H. LAWSON ET AL 2,217,022
SOLID COLOR PATTERN KNITTING MACHINE
Filed Oct. 26, 1937 45 Sheets-Sheet 15

INVENTORS:
ROBERT H. LAWSON,
ISAAC H. C. GREEN,
By Roy F. Lovell
ATT'Y.

Oct. 8, 1940.  R. H. LAWSON ET AL  2,217,022
SOLID COLOR PATTERN KNITTING MACHINE
Filed Oct. 26, 1937  45 Sheets-Sheet 17

INVENTORS:
ROBERT H. LAWSON,
ISAAC C. GREEN,
BY Roy F. Lovell,
ATT'Y.

Oct. 8, 1940.  R. H. LAWSON ET AL  2,217,022
SOLID COLOR PATTERN KNITTING MACHINE
Filed Oct. 26, 1937   45 Sheets-Sheet 18
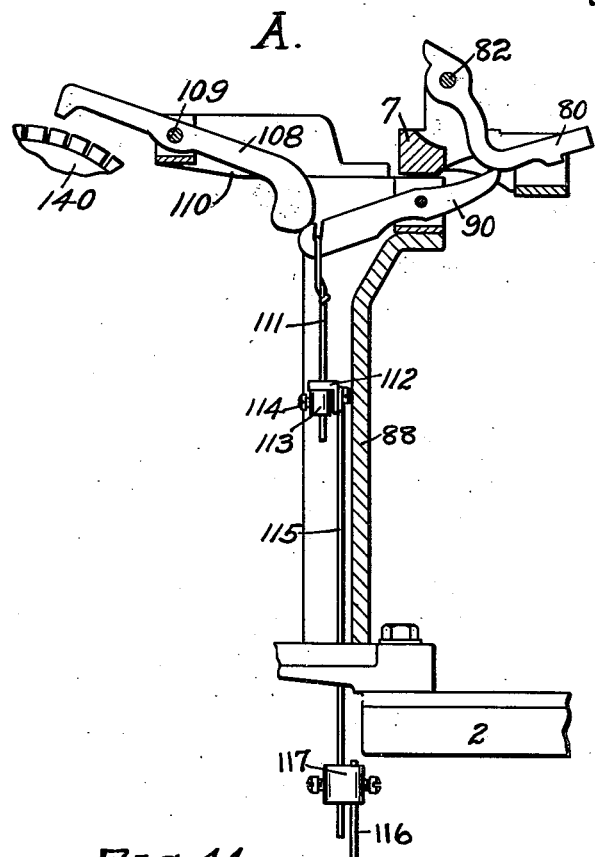
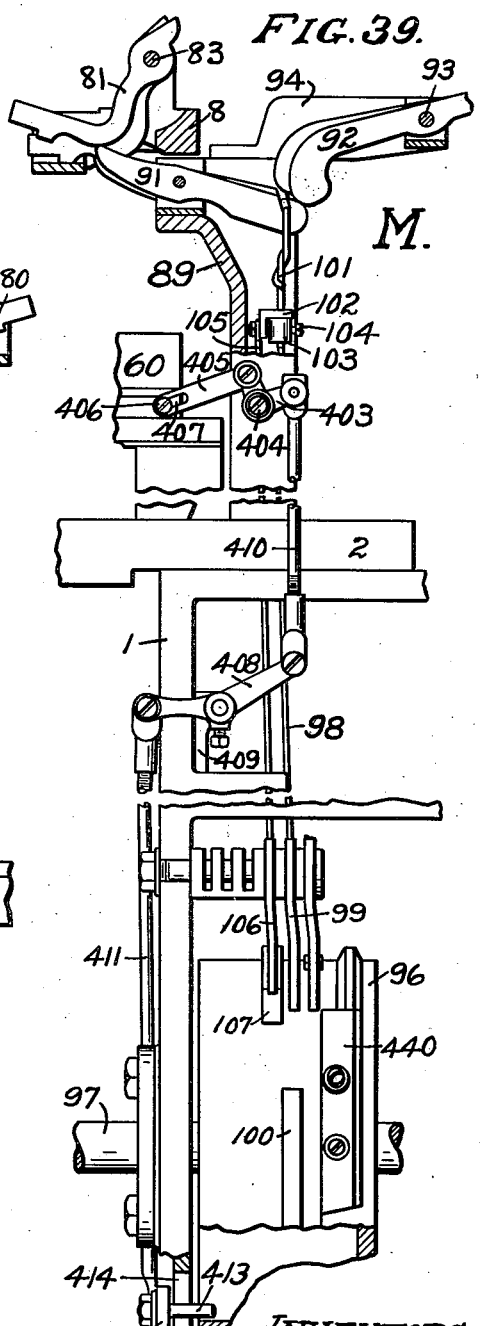
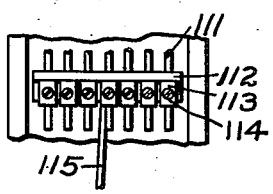
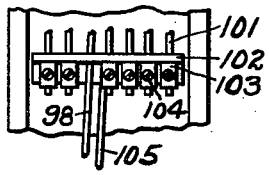
INVENTORS:
ROBERT H. LAWSON,
ISAAC H. C. GREEN,
BY Roy F. Lovell,
ATT'Y.

Oct. 8, 1940.   R. H. LAWSON ET AL   2,217,022
SOLID COLOR PATTERN KNITTING MACHINE
Filed Oct. 26, 1937   45 Sheets—Sheet 19
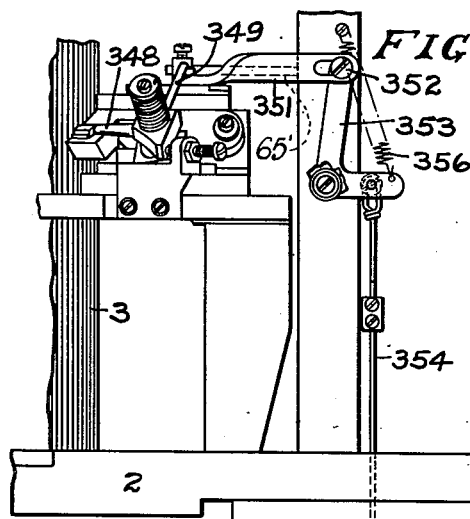
FIG. 43.
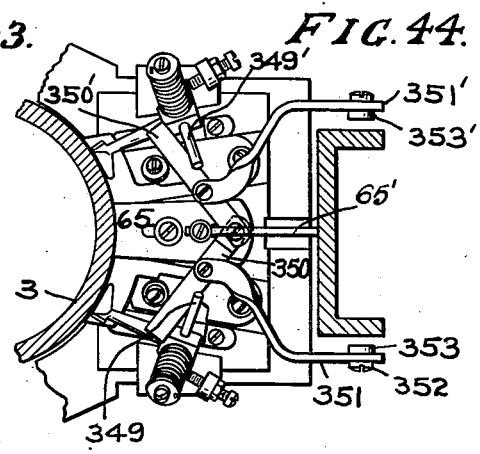
FIG. 44.
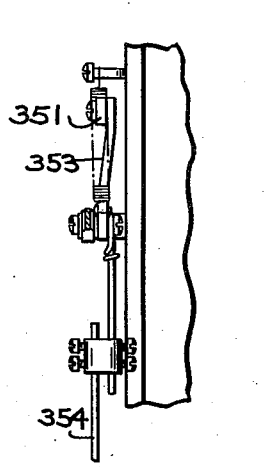
FIG. 45.
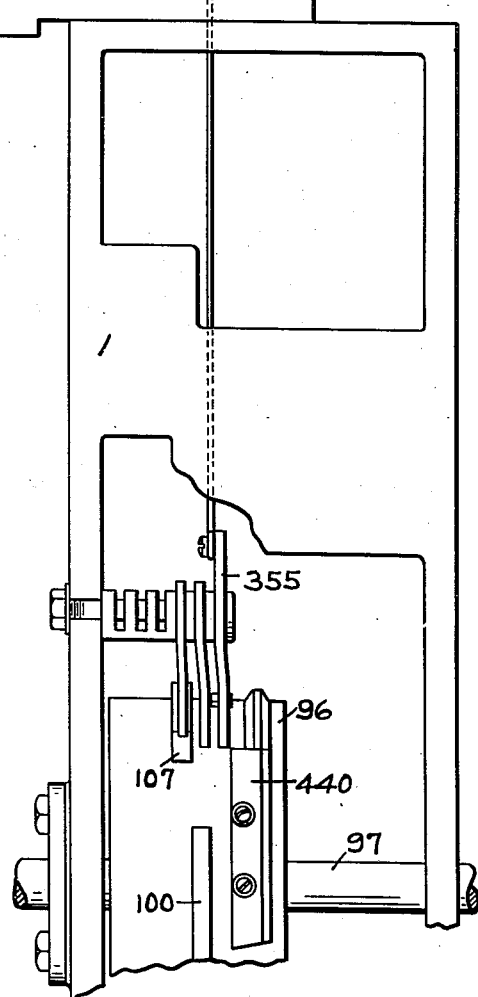
INVENTORS:
ROBERT H. LAWSON,
ISAAC H. C. GREEN,
BY Roy F. Lovell,
ATT'Y.

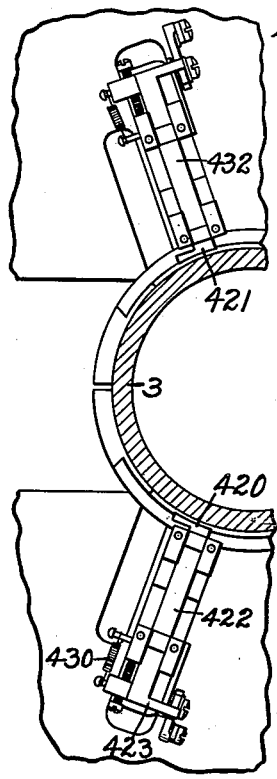
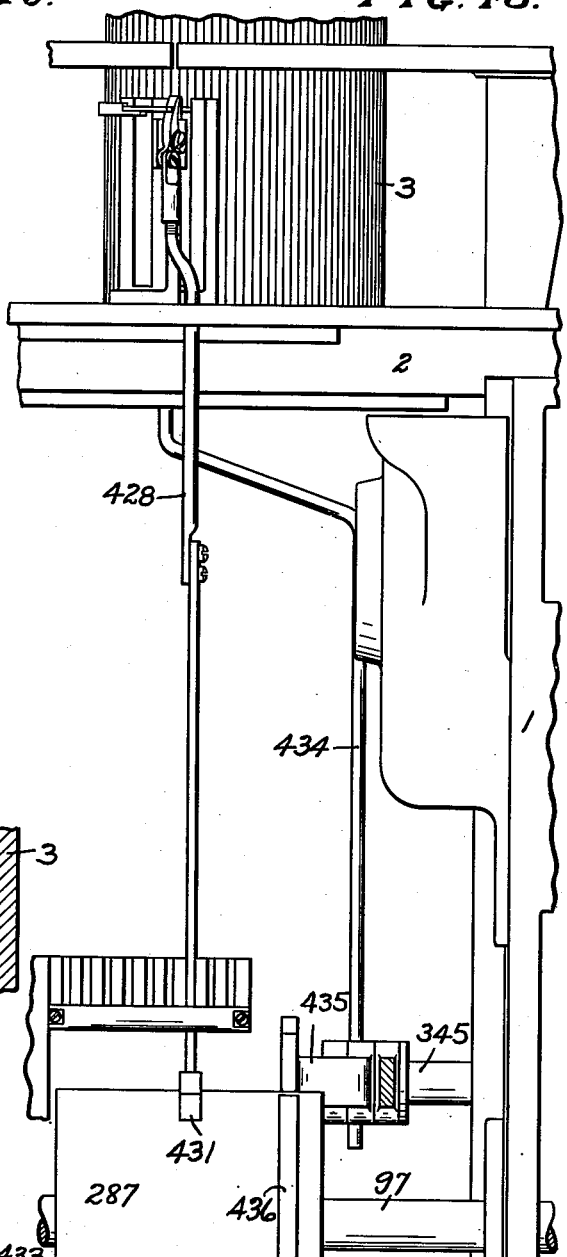
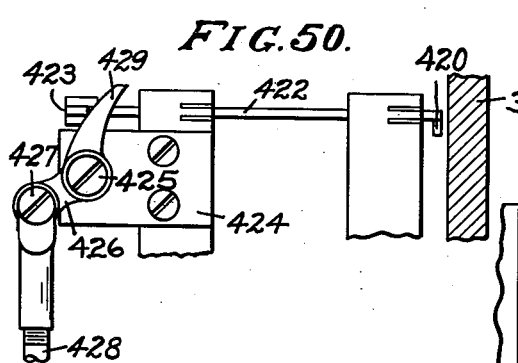
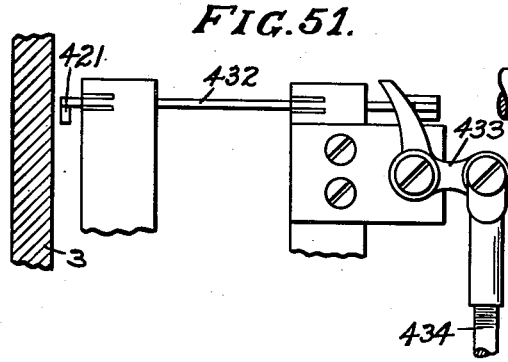

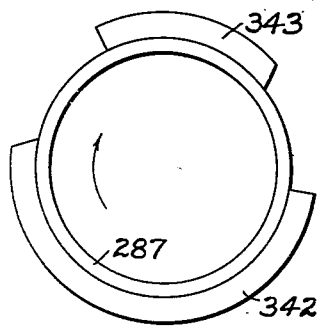
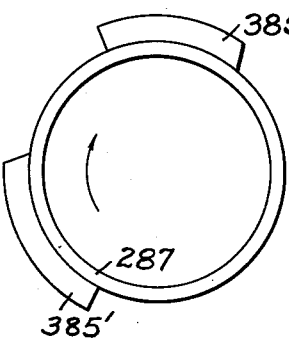
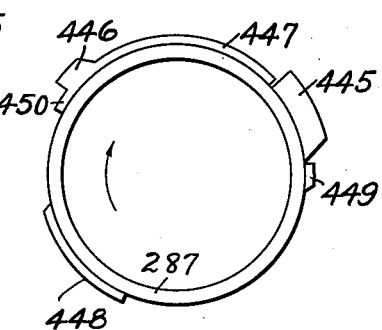
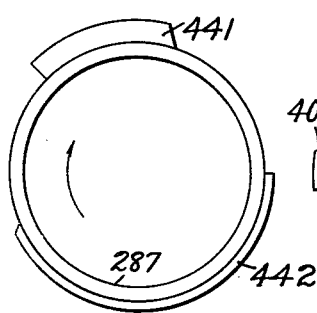
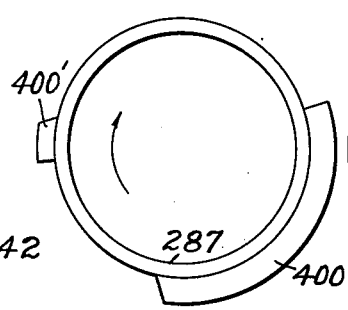
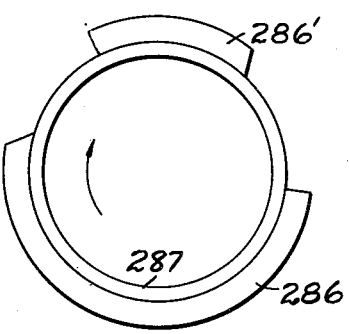
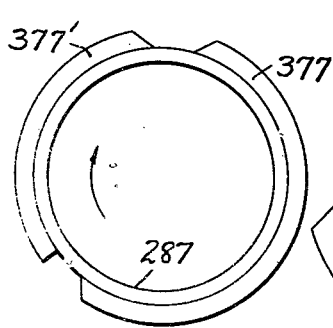
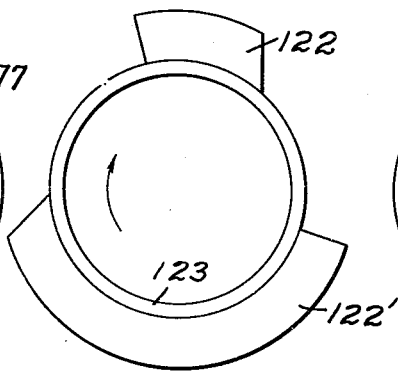
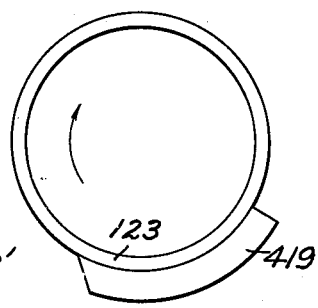

FIG. 64.
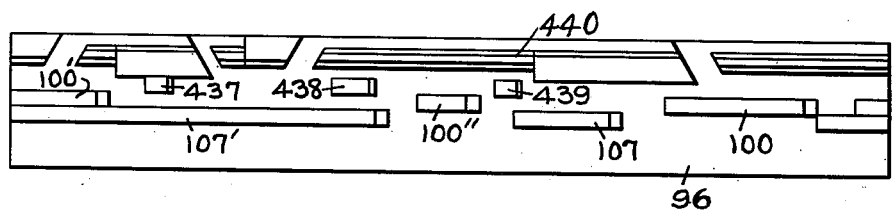
FIG. 65.
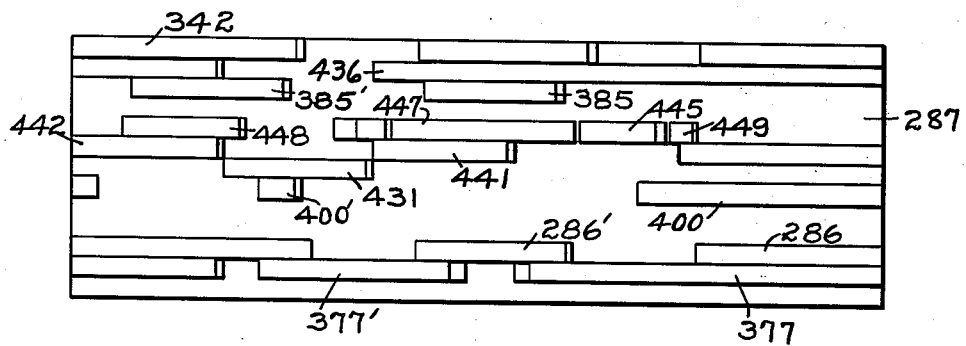
FIG. 66.
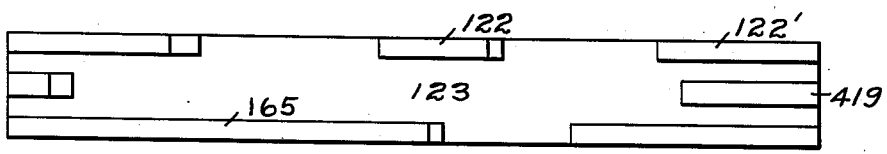
FIG. 61.     FIG. 63.     FIG. 62.
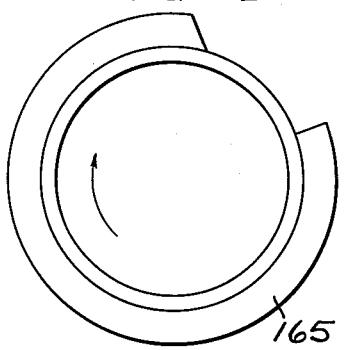
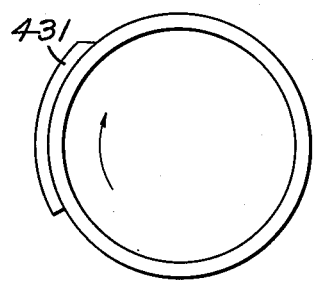
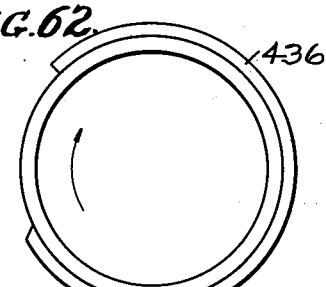

Oct. 8, 1940.  R. H. LAWSON ET AL  2,217,022
SOLID COLOR PATTERN KNITTING MACHINE
Filed Oct. 26, 1937   45 Sheets-Sheet 25
FIG. 67.
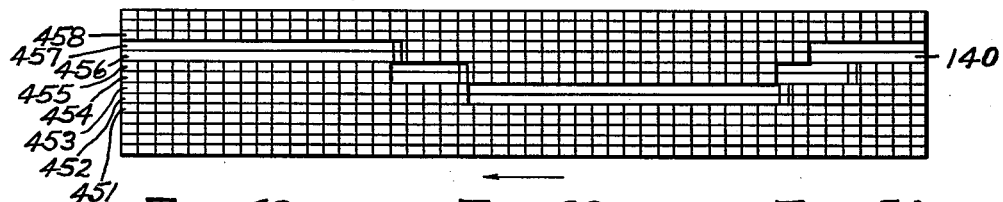
FIG. 68.    FIG. 69.    FIG. 70.
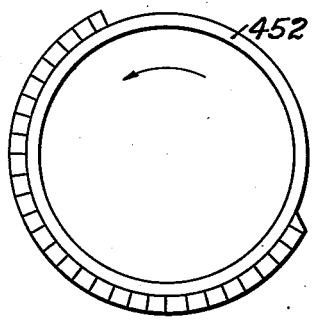 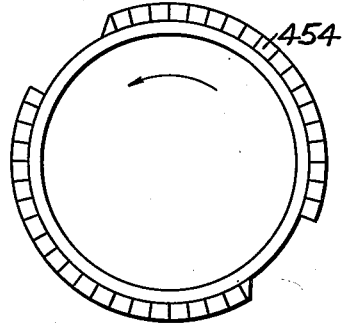 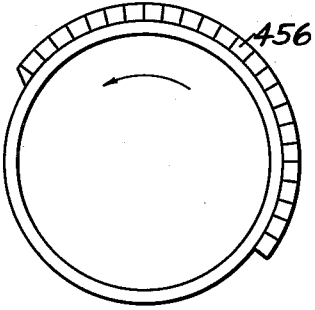
FIG. 71.
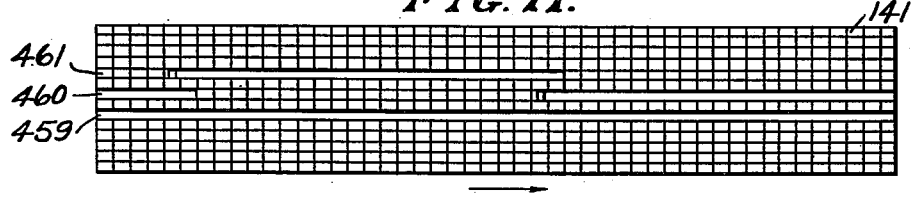
FIG. 73.    FIG. 72.
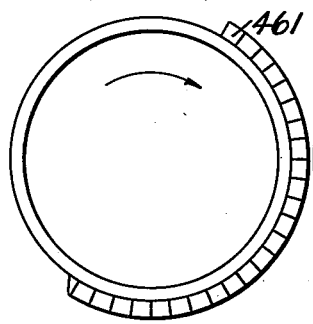 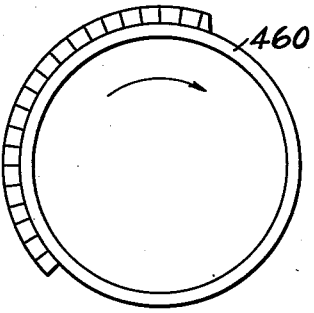
INVENTORS:
ROBERT H. LAWSON,
ISAAC H. C. GREEN,
BY Roy F. Lovell,
ATT'Y.

Oct. 8, 1940.  R. H. LAWSON ET AL  2,217,022
SOLID COLOR PATTERN KNITTING MACHINE
Filed Oct. 26, 1937   45 Sheets-Sheet 26
FIG. 74.
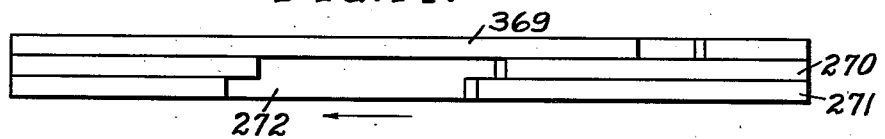
FIG. 75.  FIG. 76.  FIG. 77.
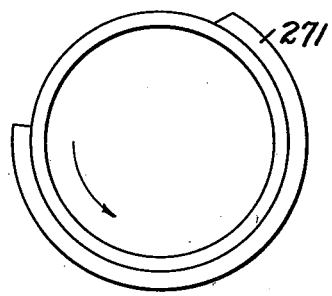 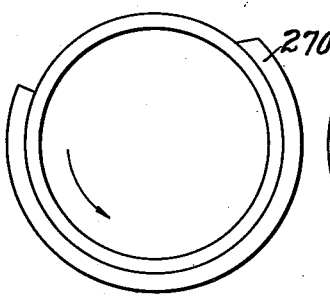 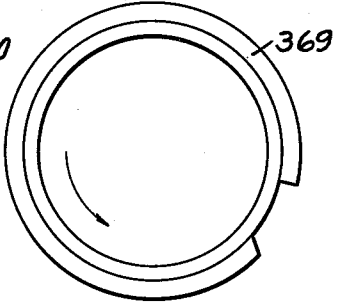
FIG. 78.
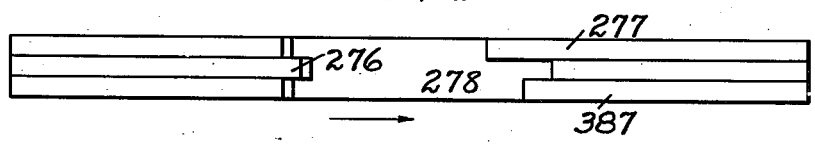
FIG. 79.  FIG. 80.  FIG. 81.
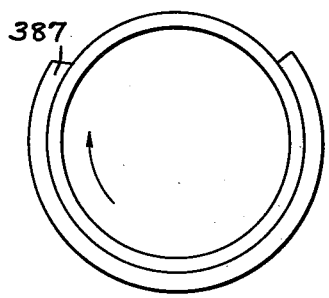 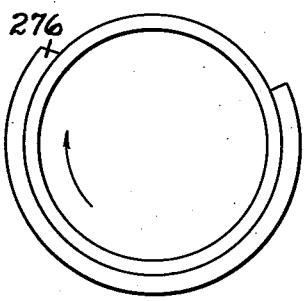 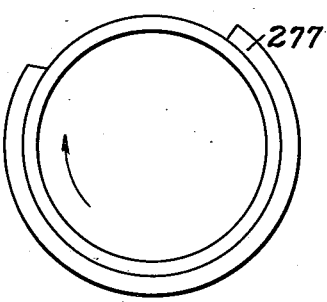
FIG. 82.
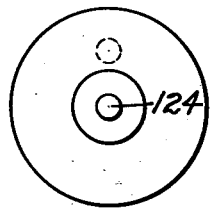
INVENTORS:
ROBERT H. LAWSON,
ISAAC H. C. GREEN,
BY Roy F. Lovell,
ATT'Y.

FIG. 83.
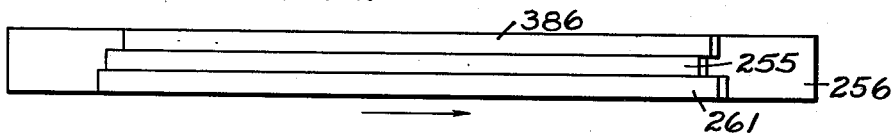
FIG. 84.     FIG. 85.     FIG. 86.
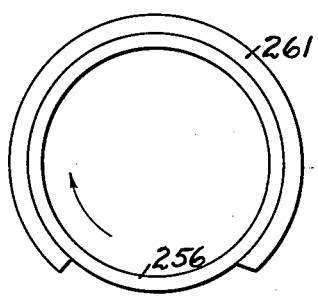 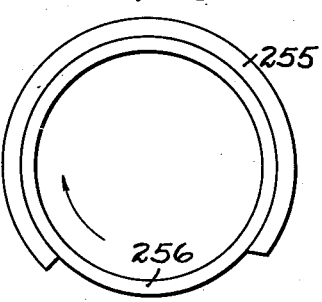 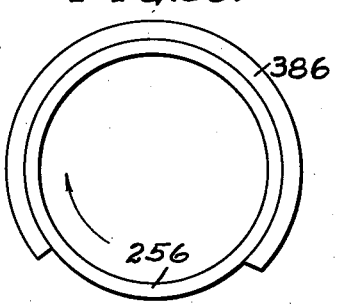
FIG. 87.
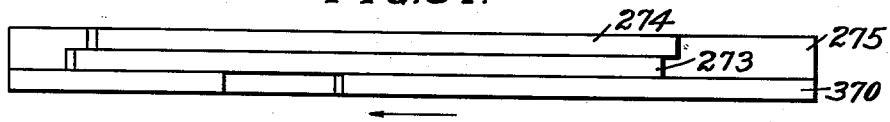
FIG. 88.     FIG. 89.     FIG. 90.
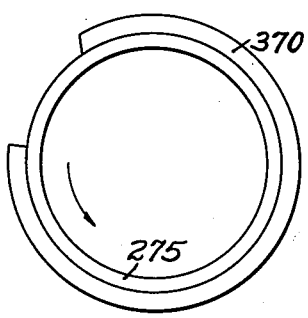 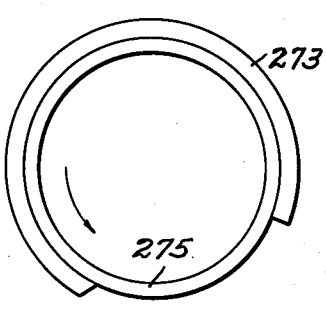 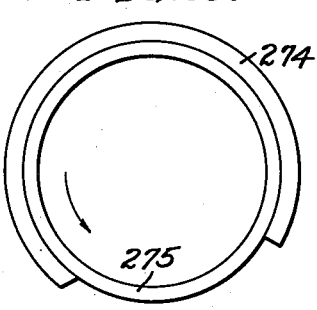
FIG. 91.
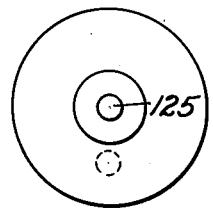
INVENTORS:
ROBERT H. LAWSON,
ISAAC H. C. GREEN,
BY Roy F. Lovell
ATT'Y.

Oct. 8, 1940.　　R. H. LAWSON ET AL　　2,217,022
SOLID COLOR PATTERN KNITTING MACHINE
Filed Oct. 26, 1937　　45 Sheets-Sheet 28

INVENTORS:
ROBERT H. LAWSON,
ISAAC H. C. GREEN,
BY Roy F. Lovell,
ATT'Y.

Oct. 8, 1940.  R. H. LAWSON ET AL  2,217,022
SOLID COLOR PATTERN KNITTING MACHINE
Filed Oct. 26, 1937   45 Sheets-Sheet 29
*FIG.94.*
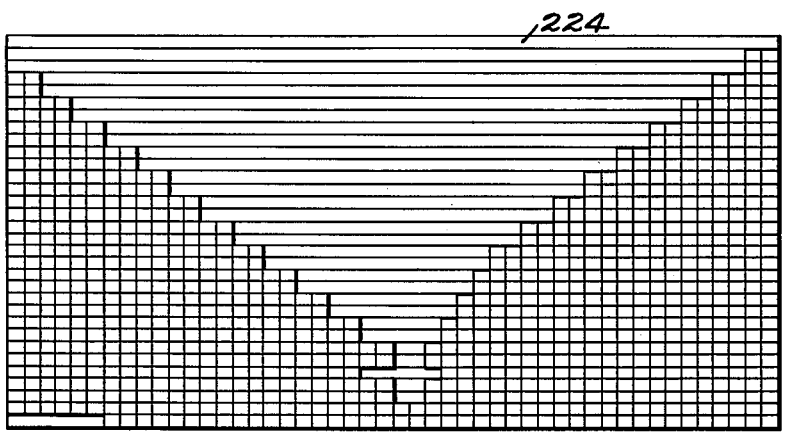
*FIG.95.*
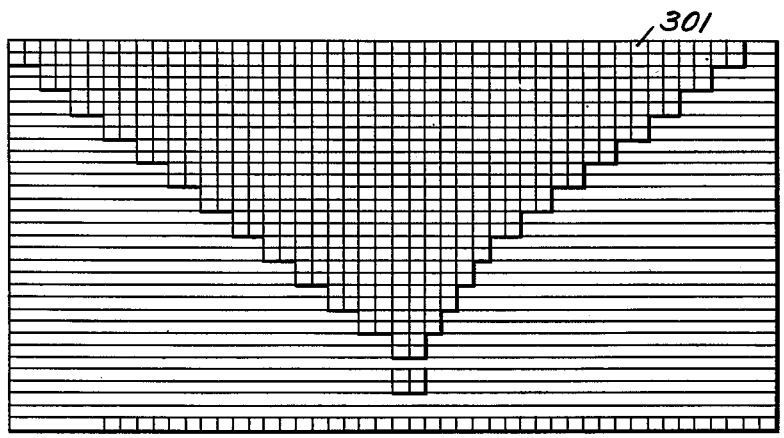
INVENTORS:
ROBERT H. LAWSON,
ISAAC H. C. GREEN,
BY Roy F. Lovell
ATT'Y.

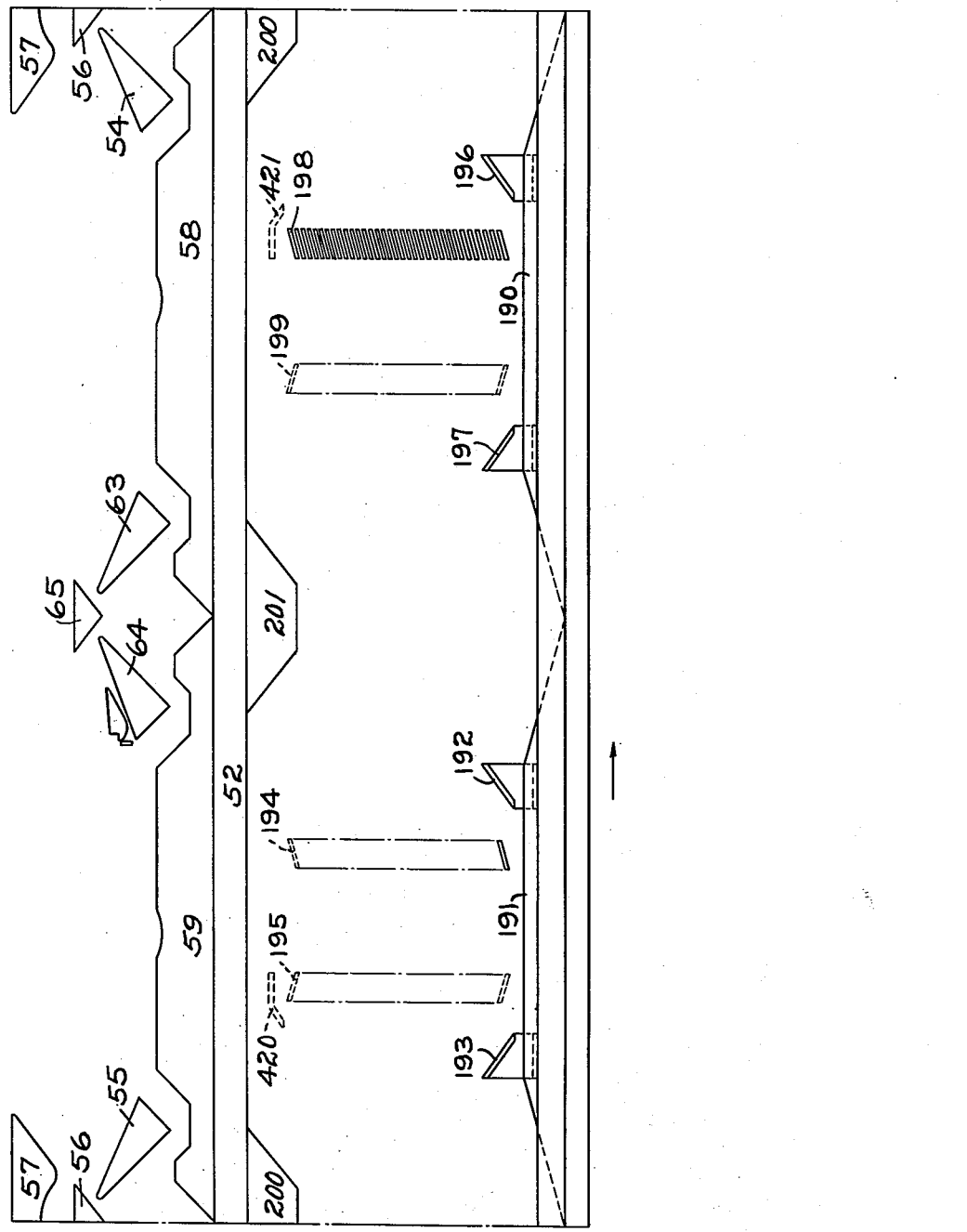

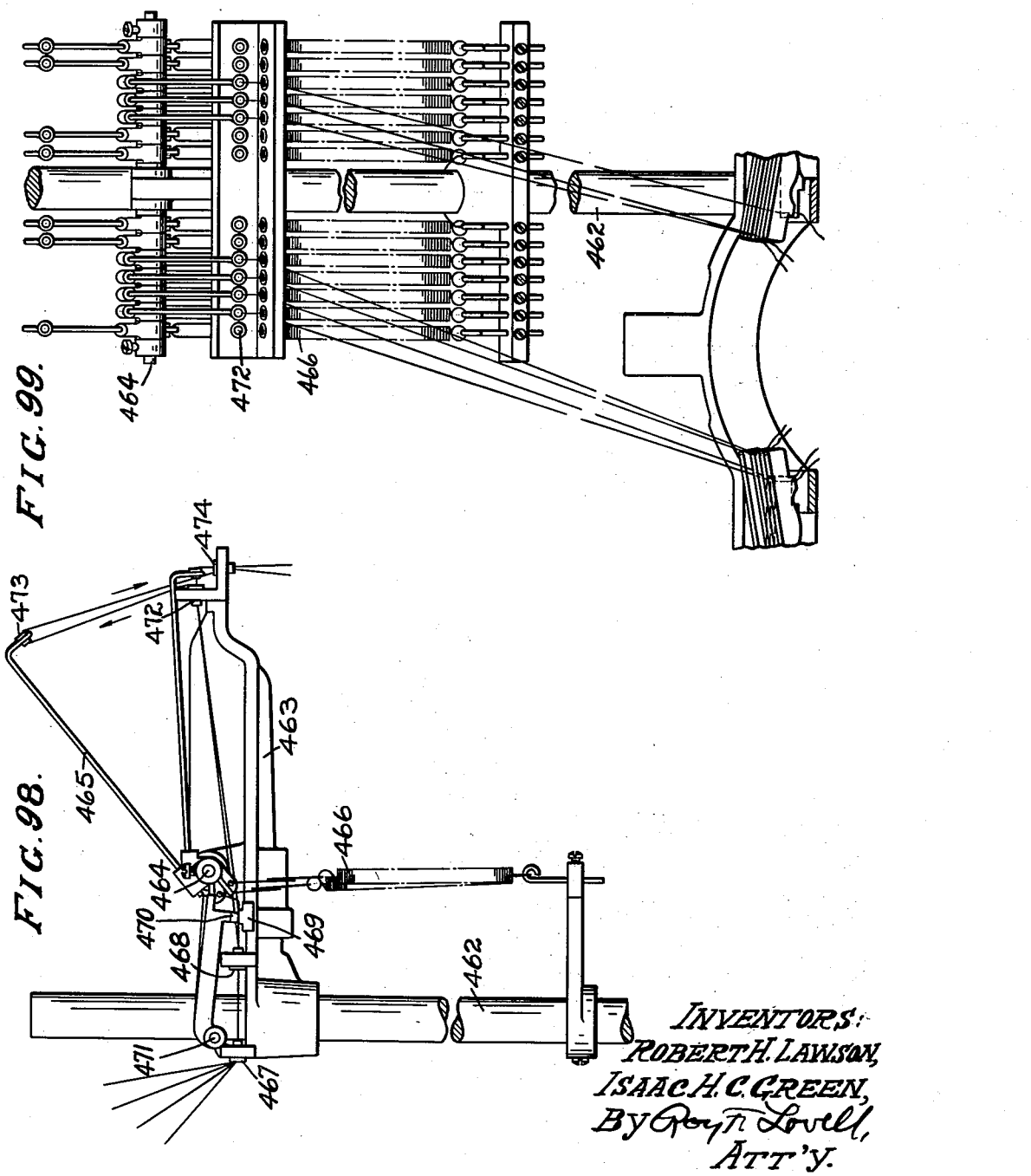

Oct. 8, 1940.                R. H. LAWSON ET AL                2,217,022
                    SOLID COLOR PATTERN KNITTING MACHINE
                    Filed Oct. 26, 1937        45 Sheets-Sheet 33
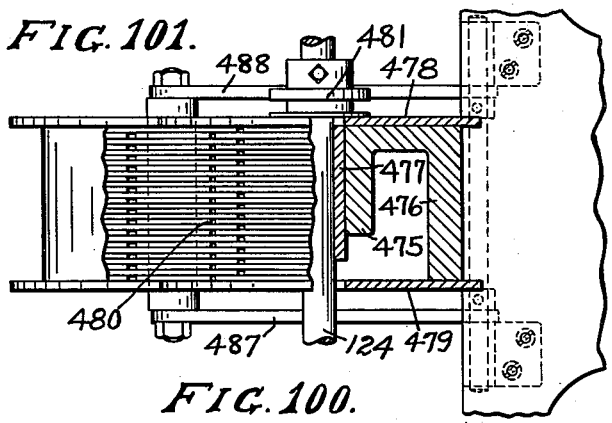
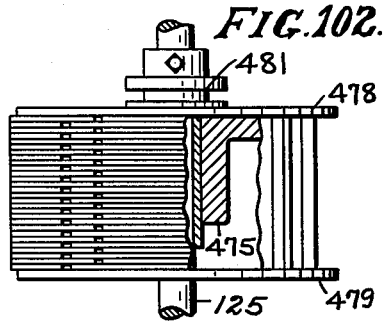
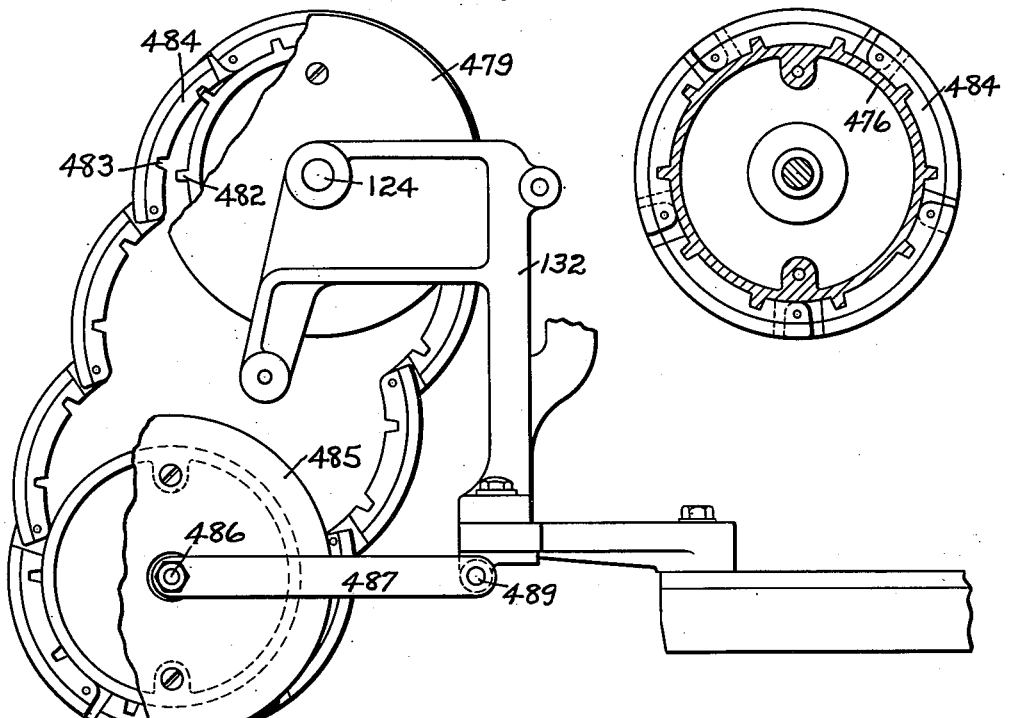
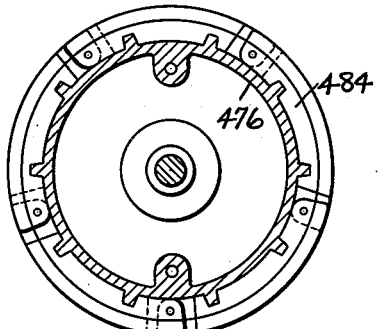
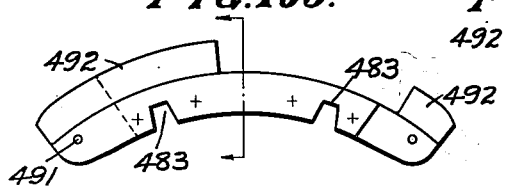
INVENTORS:
ROBERT H. LAWSON,
ISAAC H. C. GREEN,
BY Roy F. Lovell,
    ATT'Y.

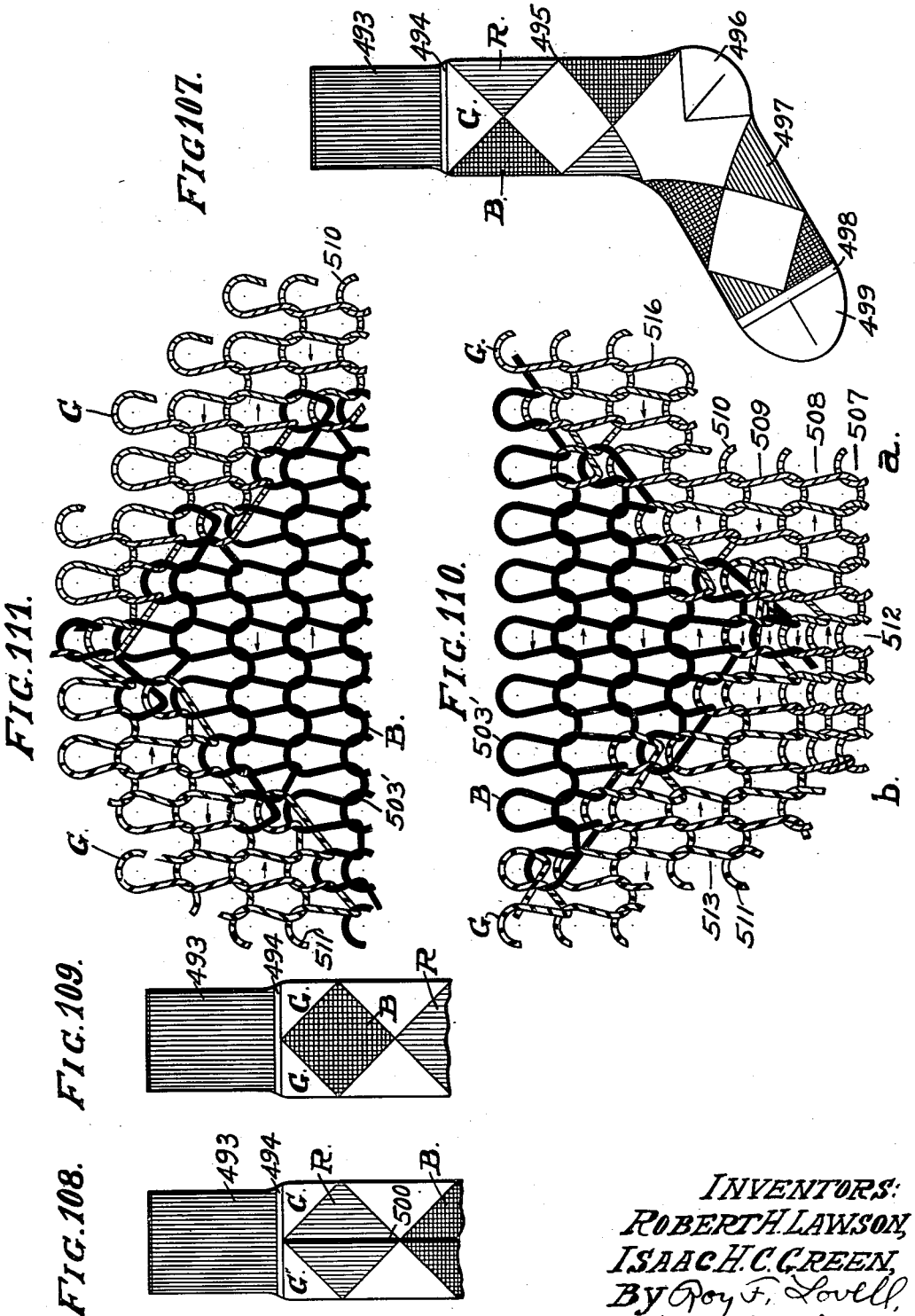

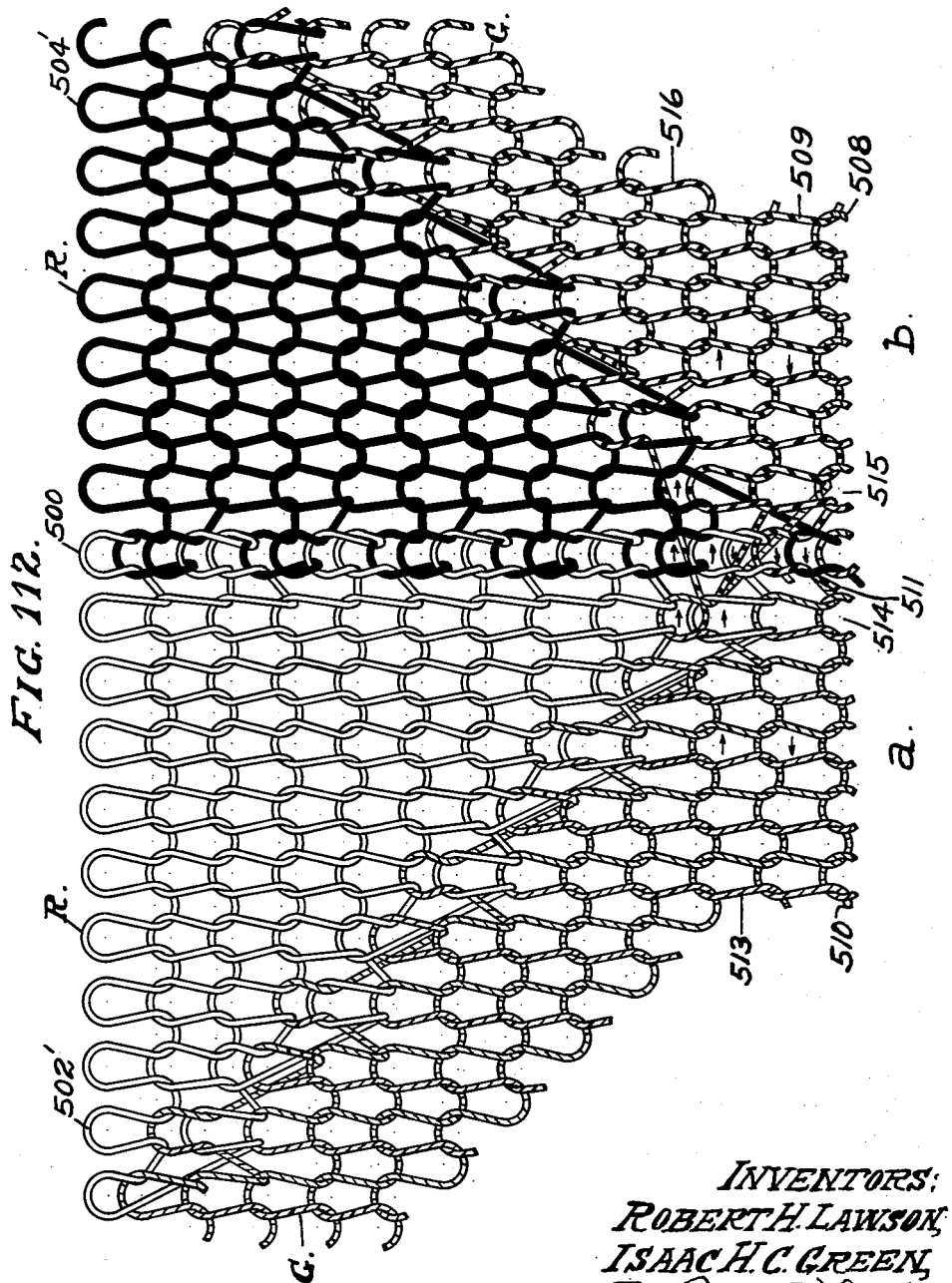

Oct. 8, 1940.   R. H. LAWSON ET AL   2,217,022
SOLID COLOR PATTERN KNITTING MACHINE
Filed Oct. 26, 1937   45 Sheets-Sheet 36

INVENTORS:
ROBERT H. LAWSON,
ISAAC H. C. GREEN,
BY Roy F. Lovell,
ATT'Y.

Oct. 8, 1940.                R. H. LAWSON ET AL               2,217,022
                     SOLID COLOR PATTERN KNITTING MACHINE
                  Filed Oct. 26, 1937      45 Sheets-Sheet 37
FIG.114.                              FIG.115.
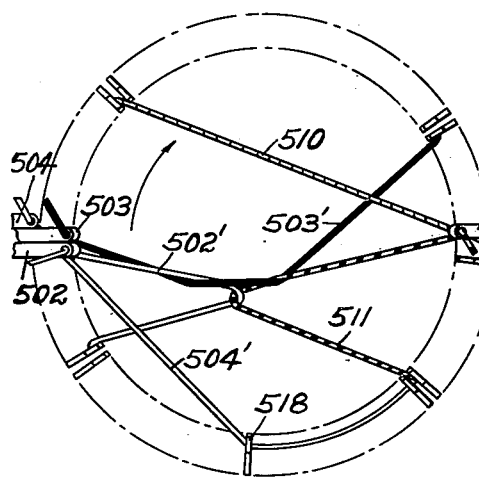
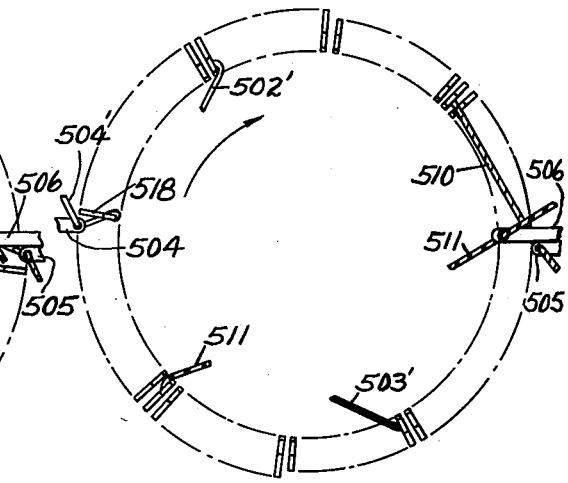
FIG.116.                              FIG.117.
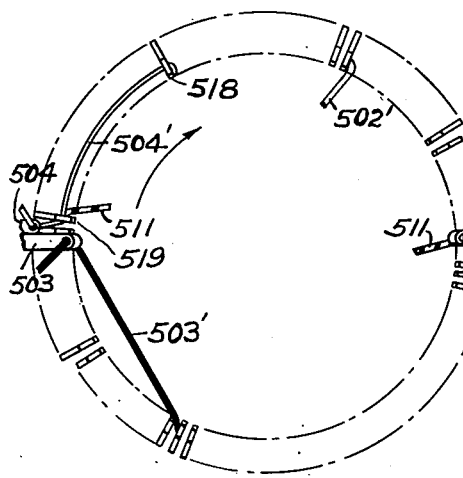
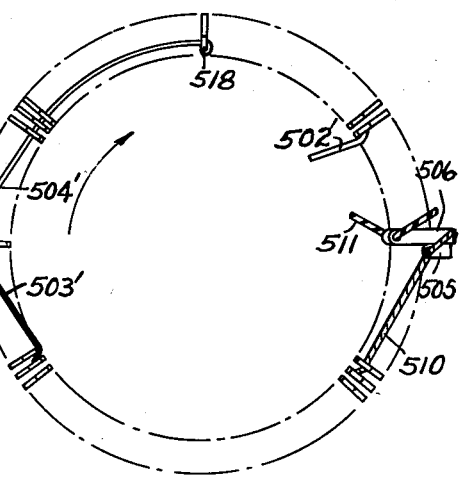
INVENTORS:
ROBERT H. LAWSON,
ISAAC H. C. GREEN,
BY Roy F. Lovell
     ATT'Y.

Oct. 8, 1940.  R. H. LAWSON ET AL  2,217,022
SOLID COLOR PATTERN KNITTING MACHINE
Filed Oct. 26, 1937  45 Sheets-Sheet 38

INVENTORS:
ROBERT H. LAWSON,
ISAAC H. C. GREEN,
BY Poy F. Lovell
ATTY.

Oct. 8, 1940.   R. H. LAWSON ET AL   2,217,022
SOLID COLOR PATTERN KNITTING MACHINE
Filed Oct. 26, 1937   45 Sheets-Sheet 39

INVENTORS:
ROBERT H. LAWSON,
ISAAC H. C. GREEN,
By Roy F. Lovell,
ATT'Y.

Oct. 8, 1940.   R. H. LAWSON ET AL   2,217,022
SOLID COLOR PATTERN KNITTING MACHINE
Filed Oct. 26, 1937   45 Sheets-Sheet 40

INVENTORS:
ROBERT H. LAWSON,
ISAAC H. C. GREEN,
By Roy F. Lovell,
ATT'Y.

INVENTORS:
ROBERT H. LAWSON,
ISAAC H.C. GREEN,
BY Roy F. Lovell
ATT'Y.

Oct. 8, 1940.  R. H. LAWSON ET AL  2,217,022

SOLID COLOR PATTERN KNITTING MACHINE

Filed Oct. 26, 1937  45 Sheets-Sheet 43

INVENTORS:
ROBERT H. LAWSON,
ISAAC H. C. GREEN,
BY Roy F. Lovell,
ATT'Y.

Oct. 8, 1940.  R. H. LAWSON ET AL  2,217,022
SOLID COLOR PATTERN KNITTING MACHINE
Filed Oct. 26, 1937   45 Sheets-Sheet 44

INVENTORS:
ROBERT H. LAWSON
ISAAC H. C. GREEN,
BY
ATT'Y.

Oct. 8, 1940.   R. H. LAWSON ET AL   2,217,022
SOLID COLOR PATTERN KNITTING MACHINE
Filed Oct. 26, 1937   45 Sheets—Sheet 45

INVENTORS:
ROBERT H. LAWSON,
ISAAC H. C. GREEN,
By Roy F. Lovell,
ATT'Y.

Patented Oct. 8, 1940

2,217,022

UNITED STATES PATENT OFFICE 2,217,022

SOLID COLOR PATTERN KNITTING MACHINE

Robert H. Lawson, Pawtucket, and Isaac H. C. Green, Central Falls, R. I., assignors to Hemphill Company, Central Falls, R. I., a corporation of Massachusetts Application October 26, 1937, Serial No. 171,134

58 Claims. (Cl. 66—43)

This case involves a machine and method for knitting hosiery and other fabrics wherein the same are ornamented in what is known as solid color patterns in contrast to plating, wrapping and other types of ornamentation. Such fabrics have been knitted, especially in men's hosiery, but not by completely automatic machinery so that the said fabrics were to some extent hand made. The present machine and principle of operation of the machine are illustrated in a circular knitting machine adapted to oscillate or reciprocate throughout the knitting of certain parts of the fabric but further being adapted to rotate at other times. The invention is described with respect to a circular type machine wherein the needle bed, needles, etc., constitute the movable element, but obviously we are not limited to such a construction, as the principles of the invention are equally applicable in machines wherein the cams and pattern devices move while the needle bed and parts incidental thereto are held stationary. The following is a short description of figures wherein like numerals of reference indicate the same elements throughout the drawings and description:

Figure 3:
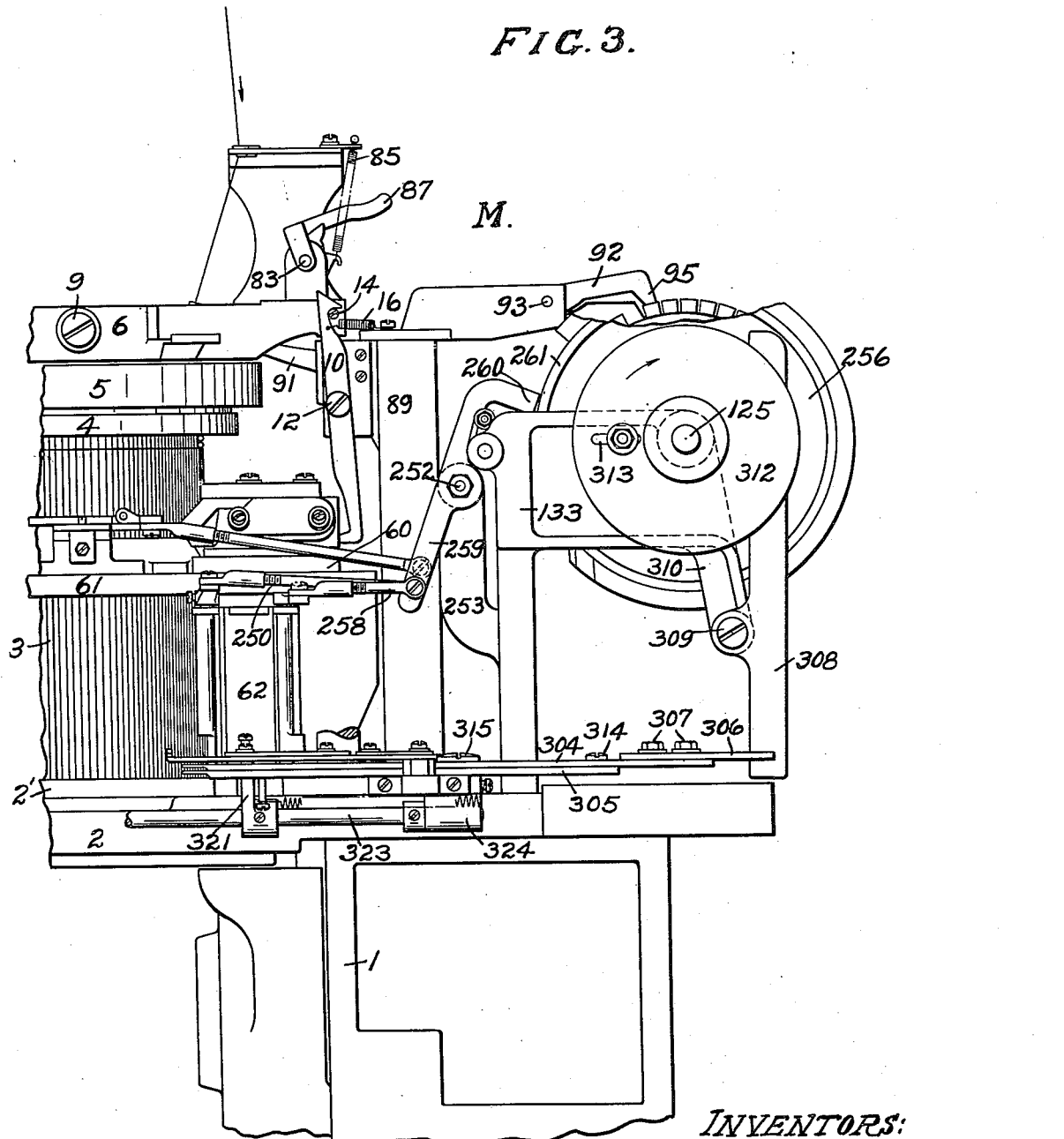
Figure 4:
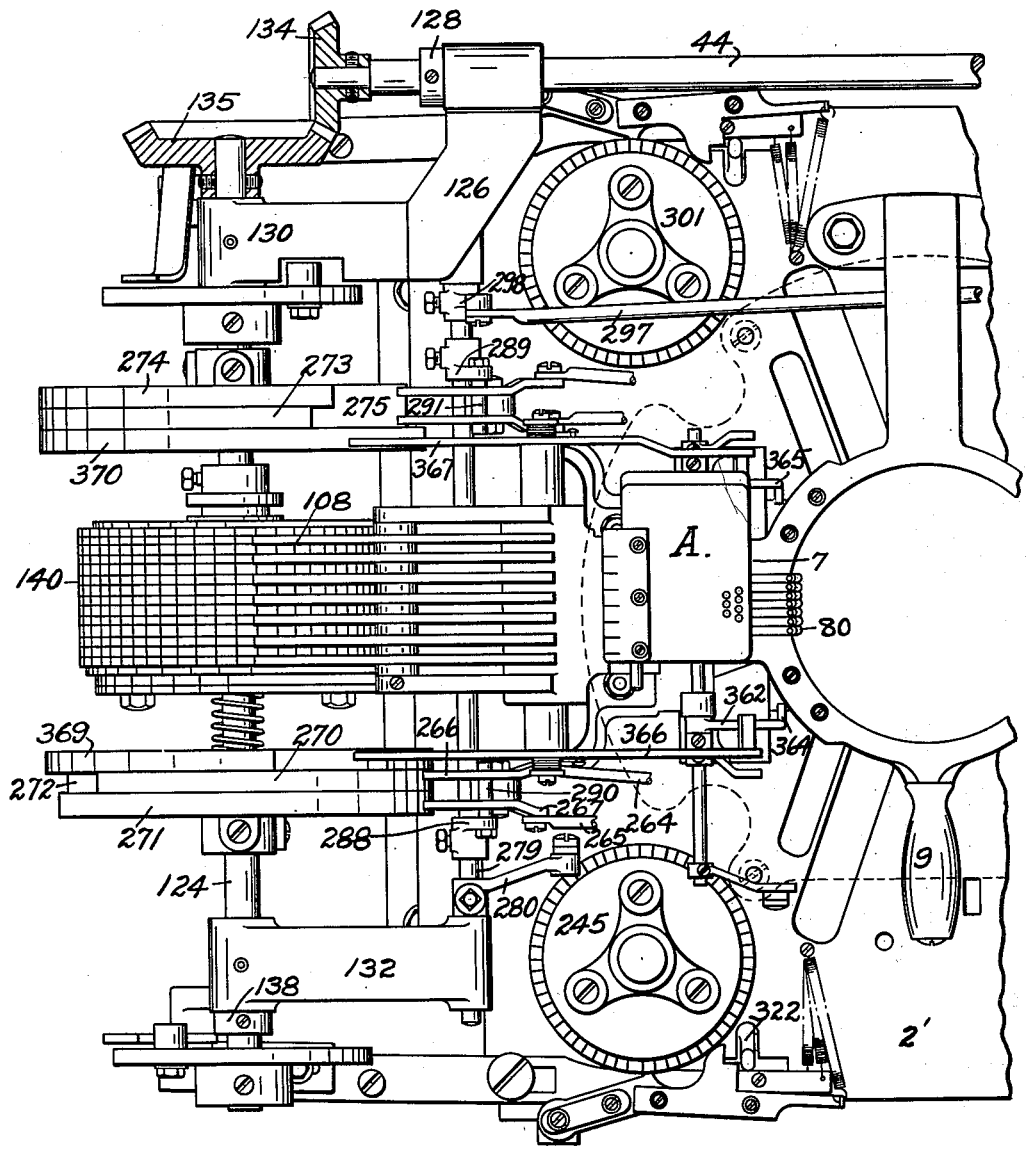
Figure 5:
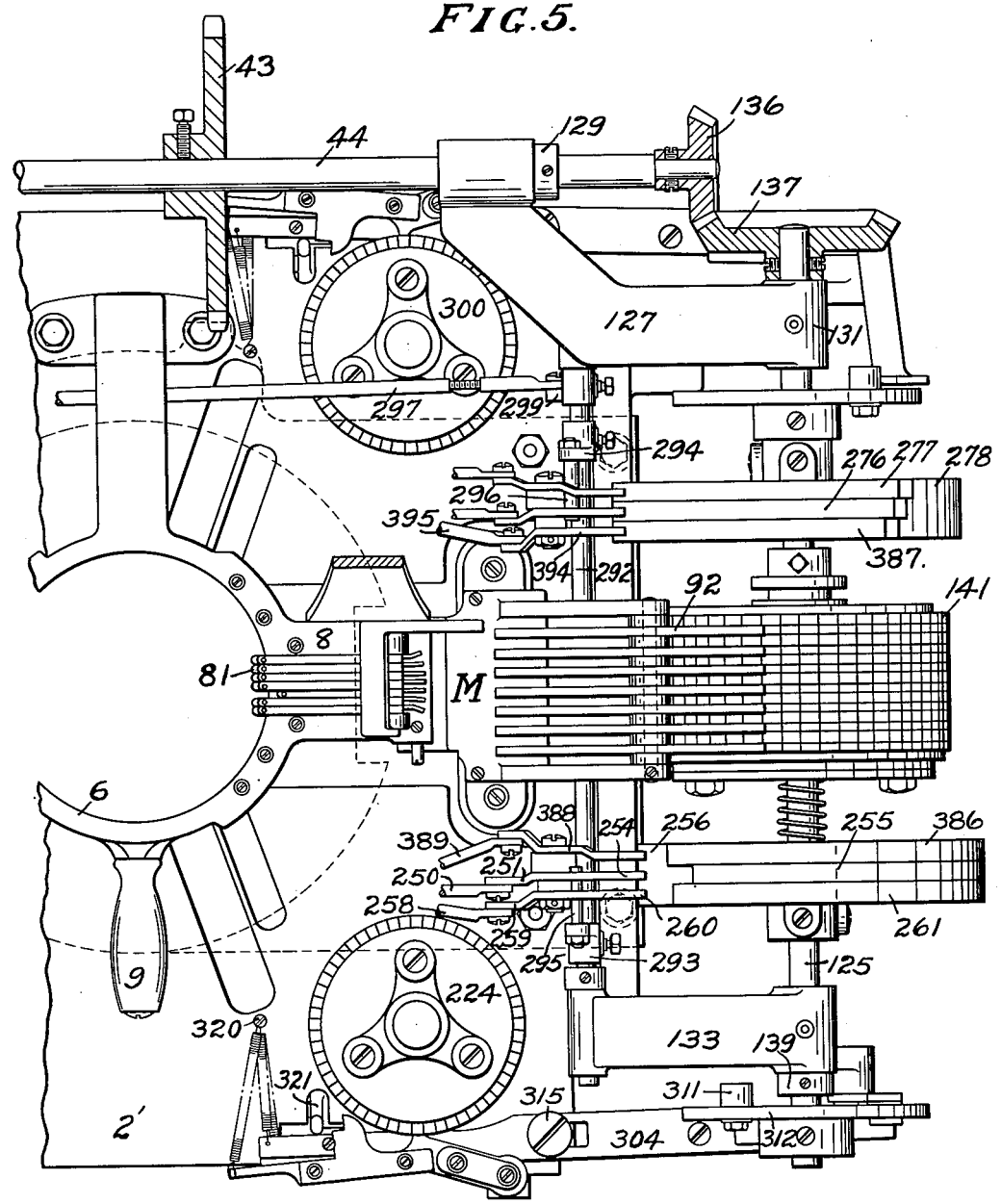
Figure 6:
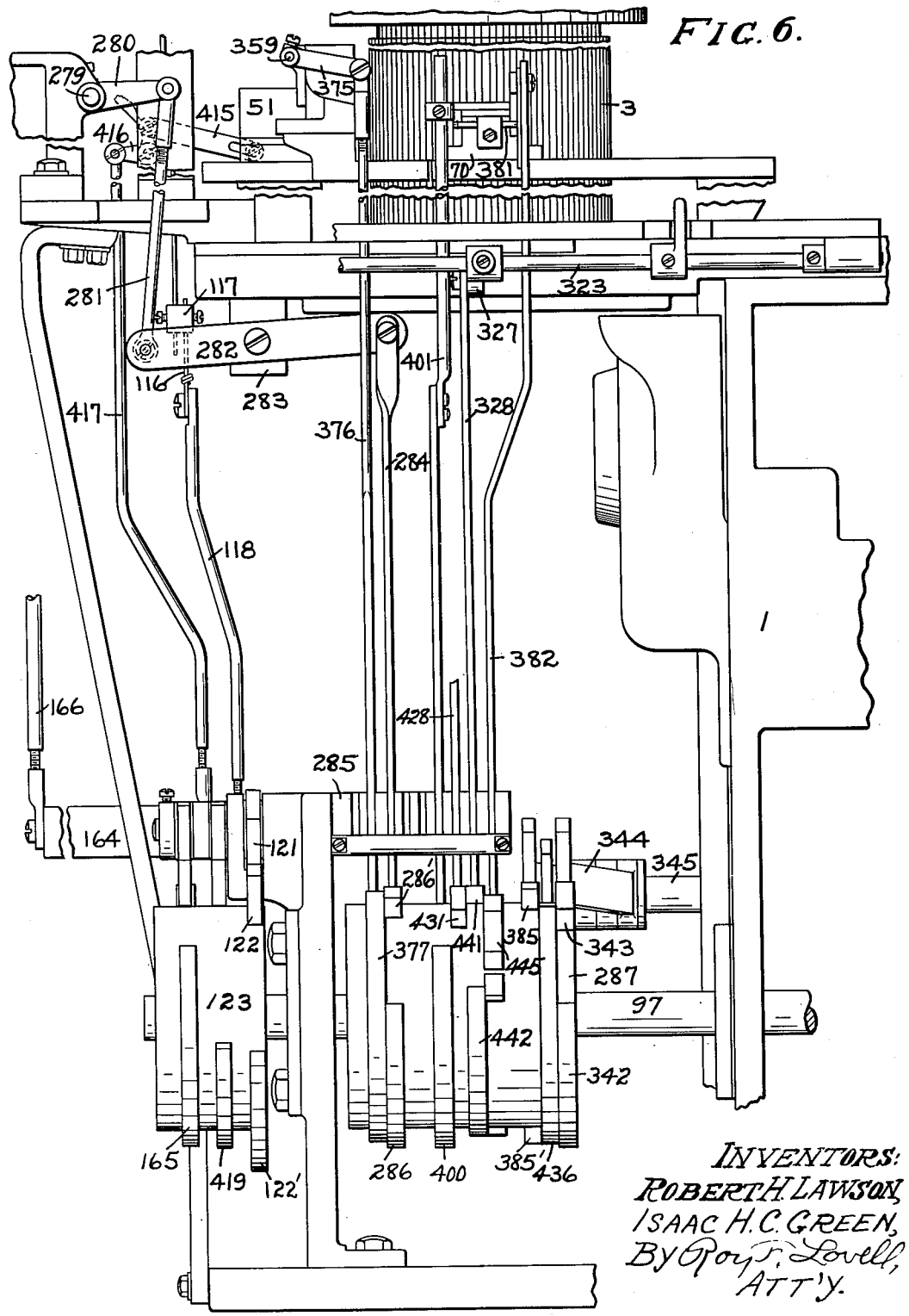
Figure 7:
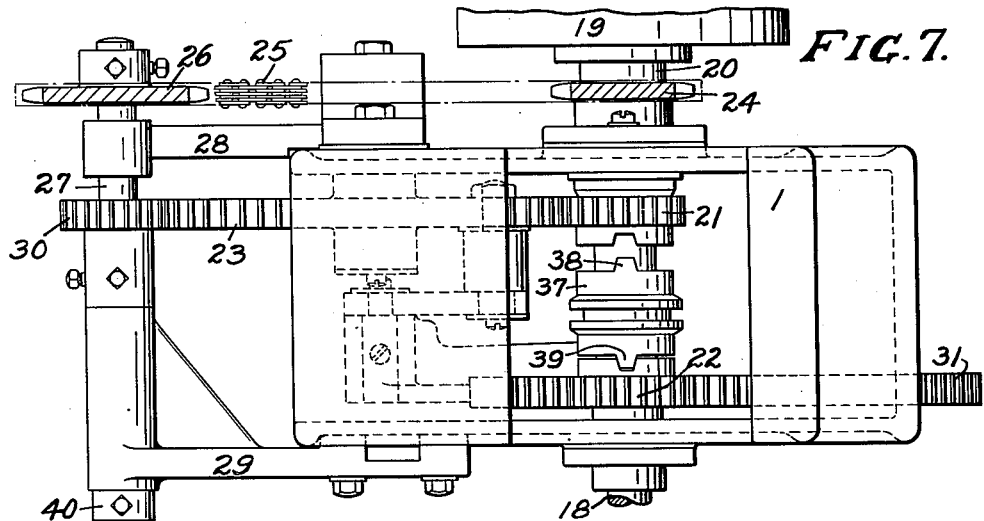
Figure 8:
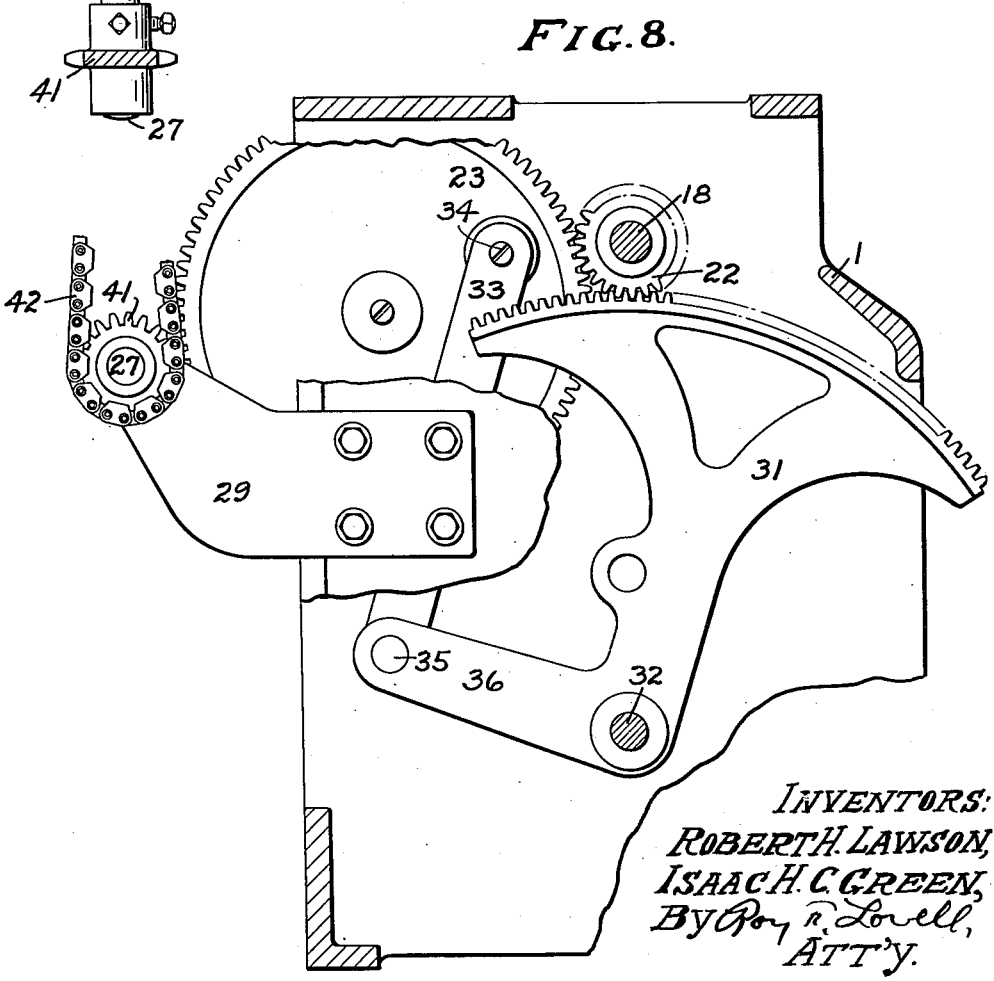
Figure 31:
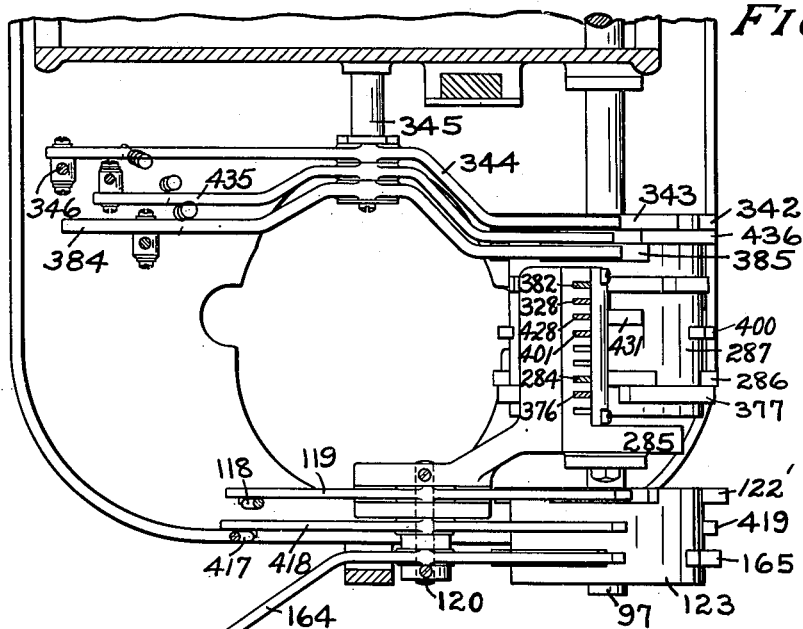
Figure 32:
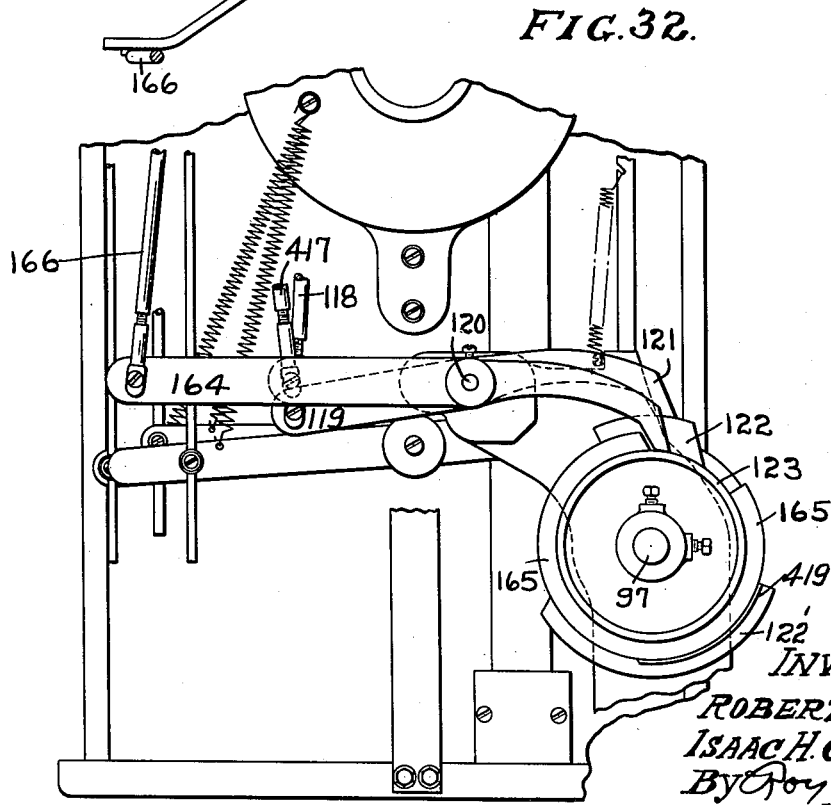
Figure 33:
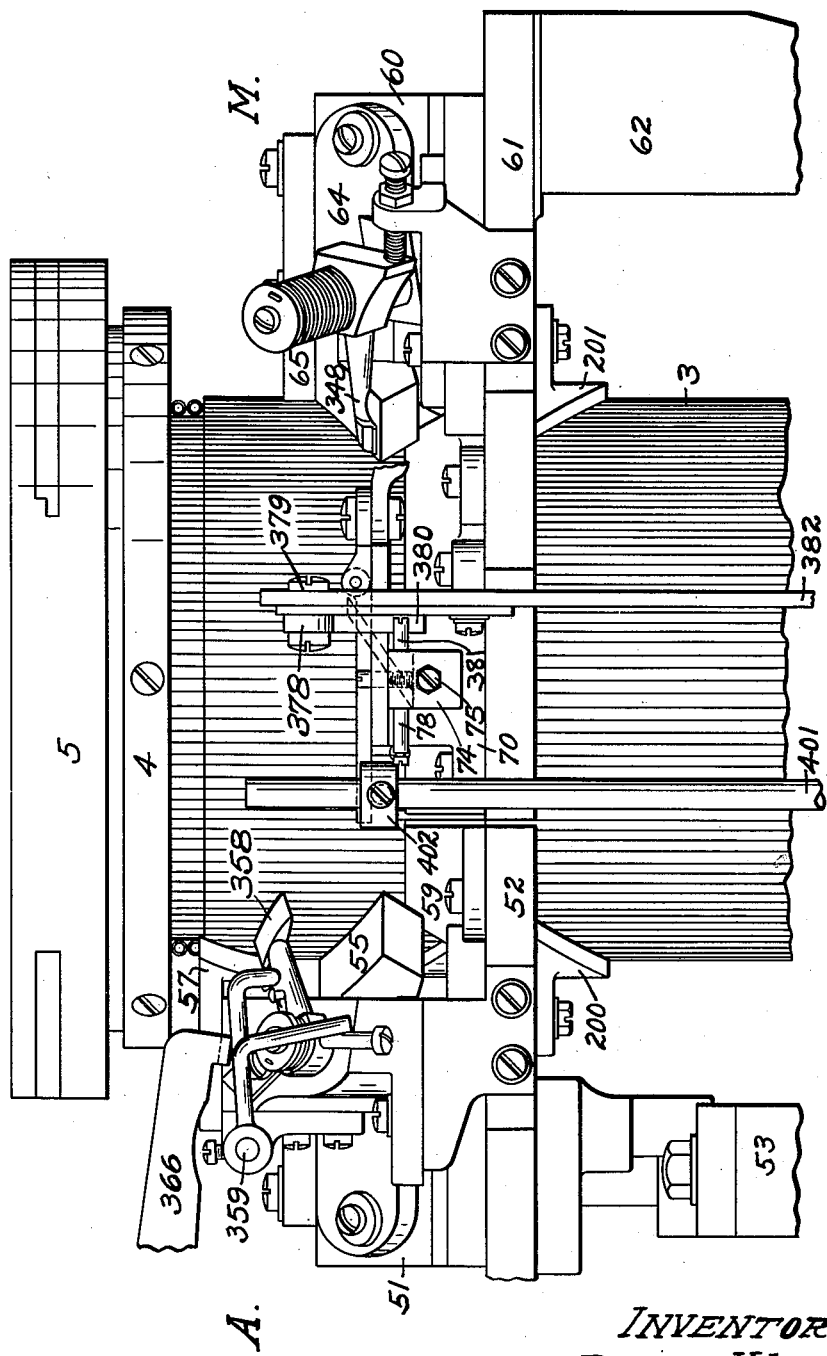
Figure 34:
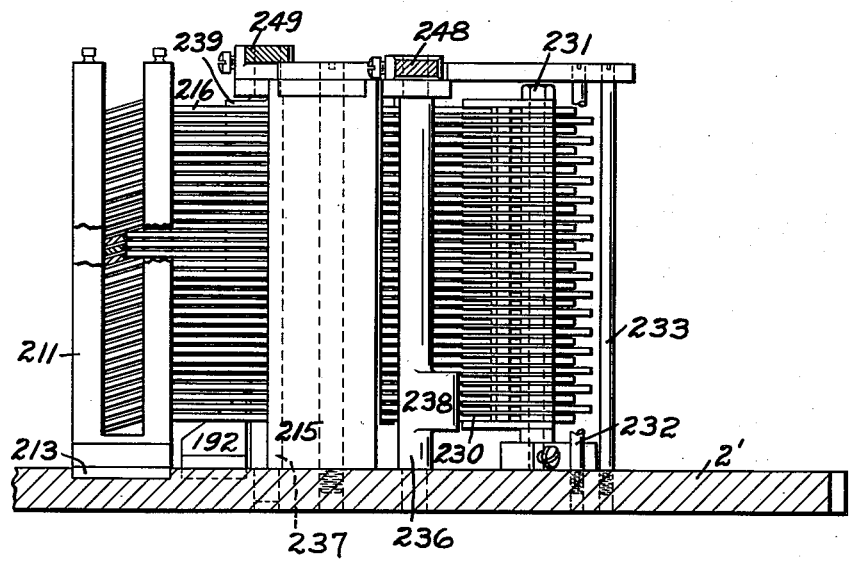
Figure 35:
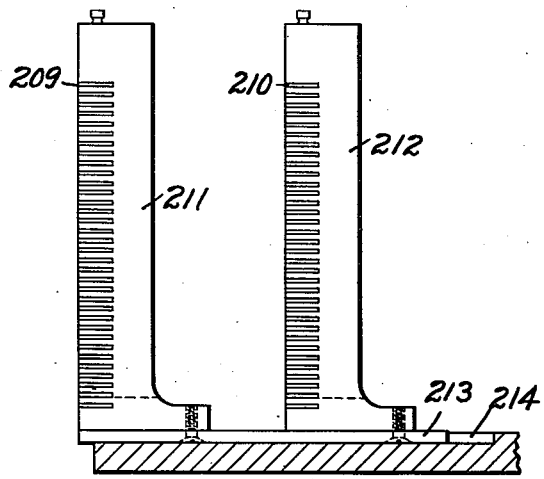
Figure 36:
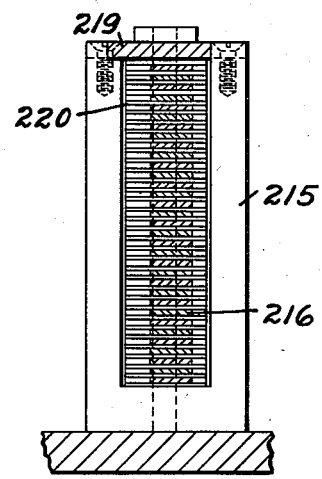
Figures 37, 38:
Figure 46:
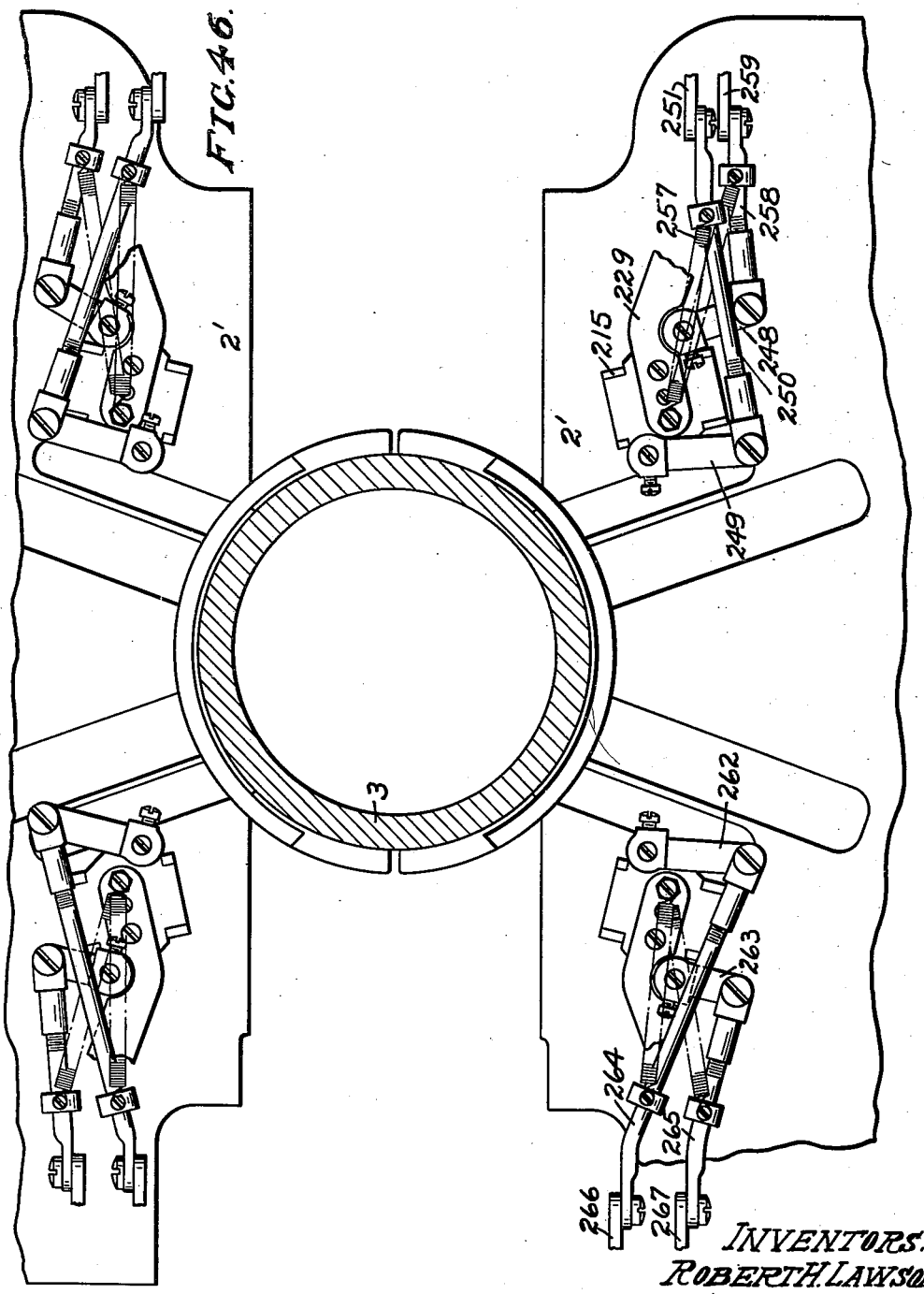
Figure 47:
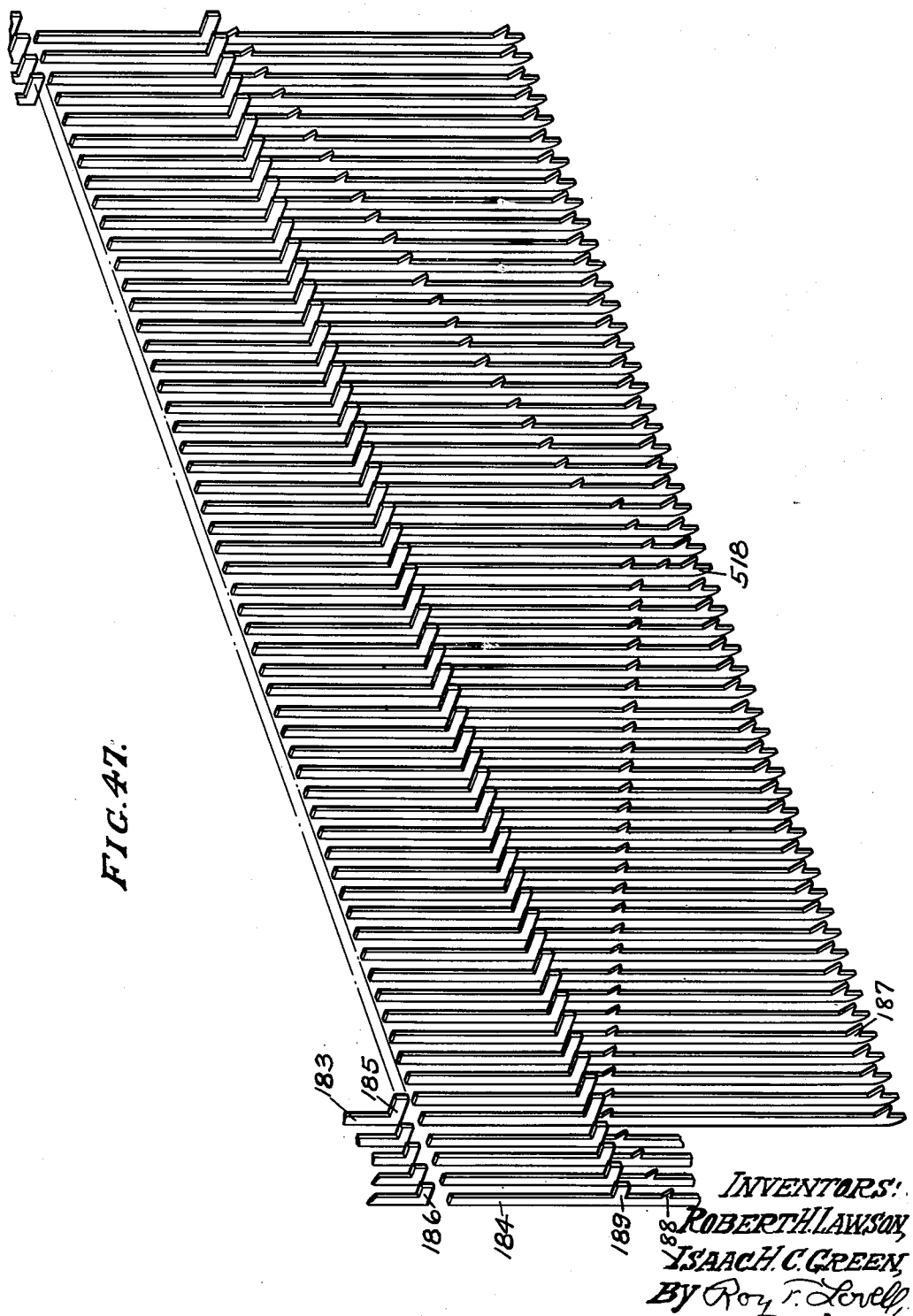
Figure 92:
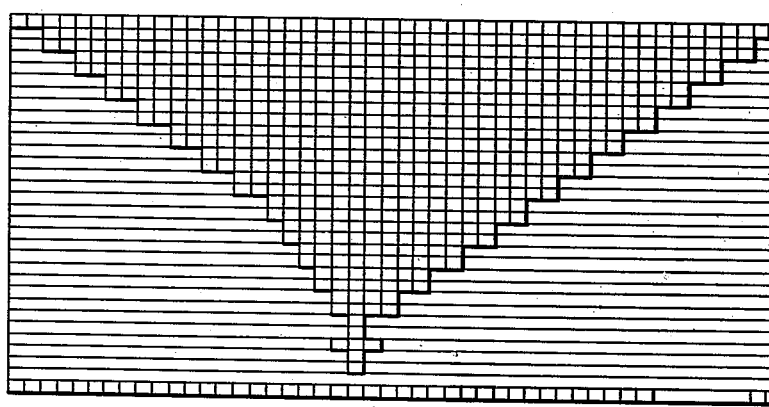
Figure 93:
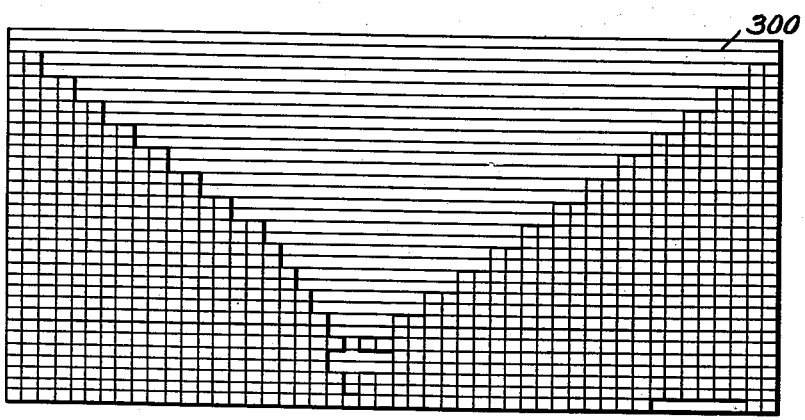
Figure 96:
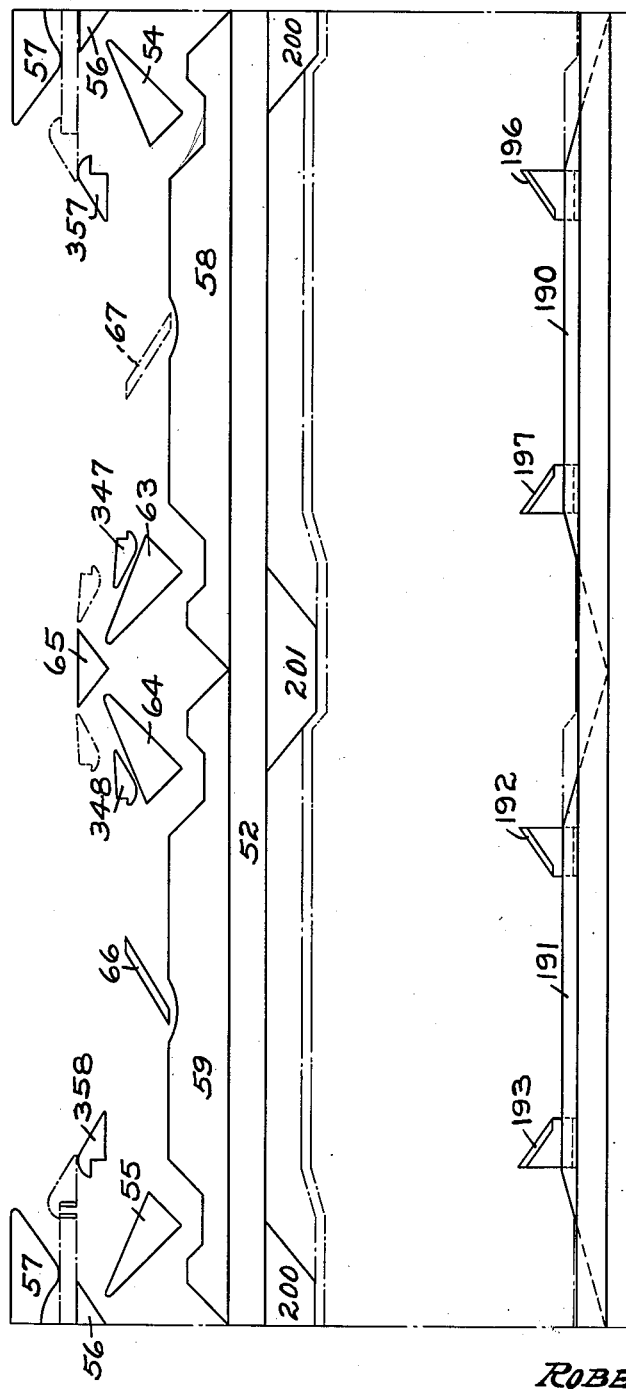
Figure 113:
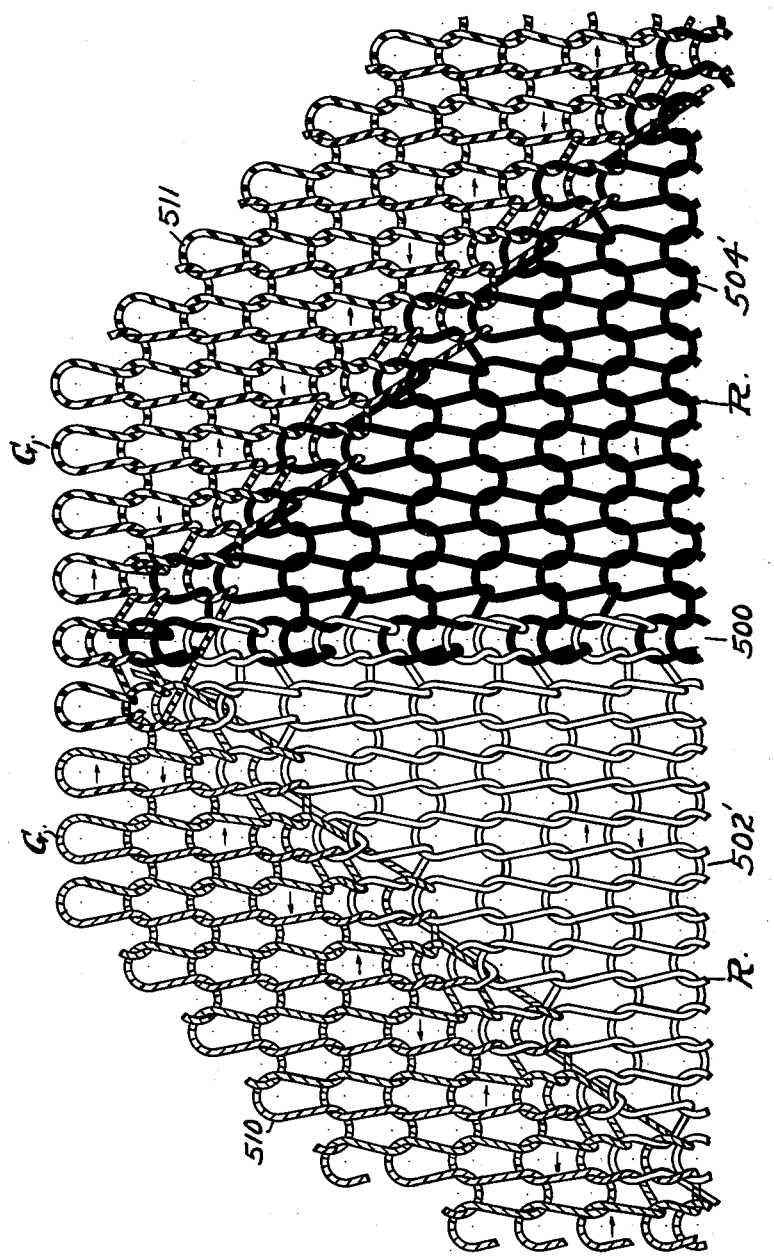
Figure 124:
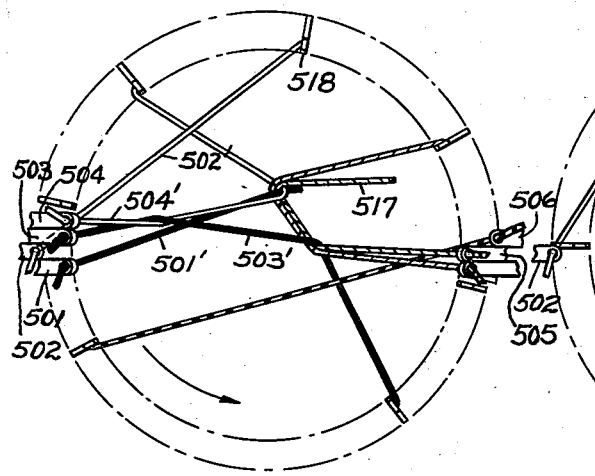
Figure 125:
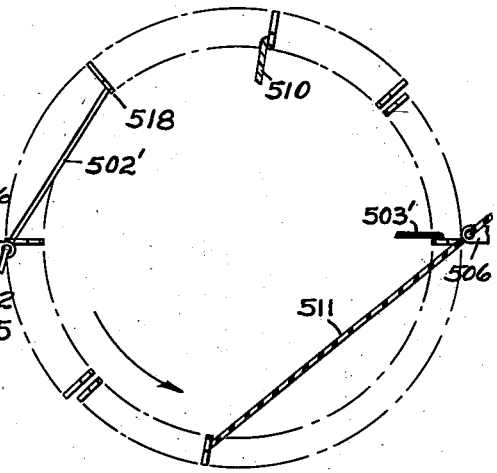
Figure 126:
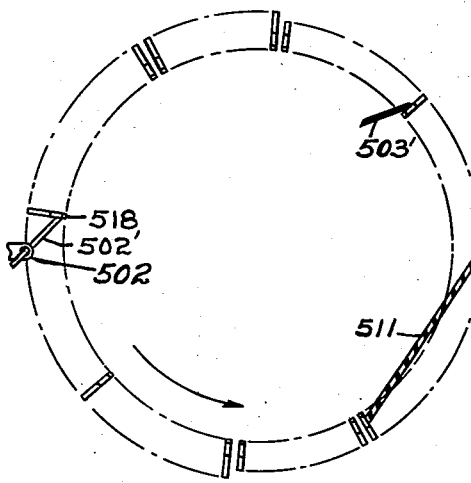
Figure 138:
Figure 136:
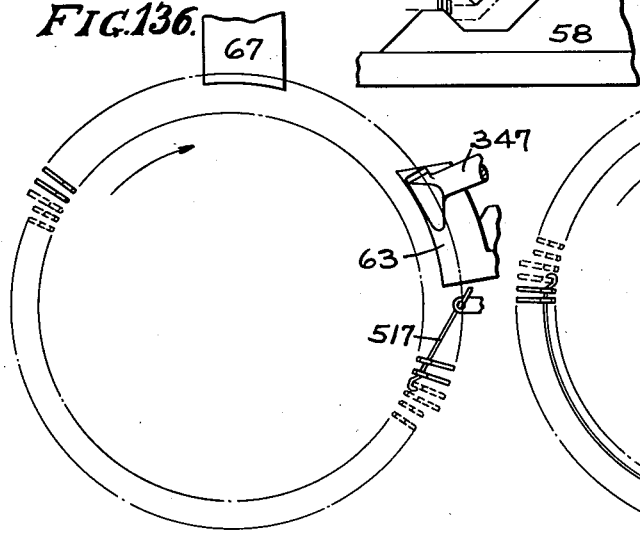
Figure 137:
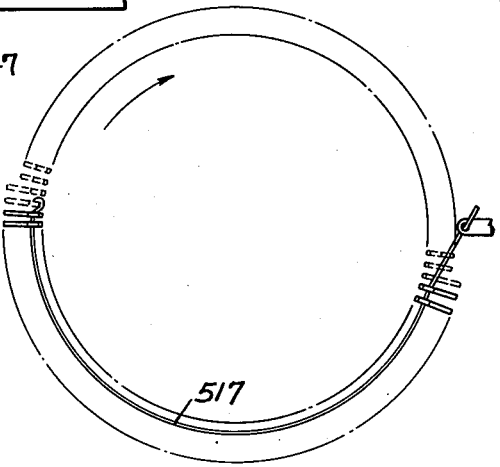
Figure 139:
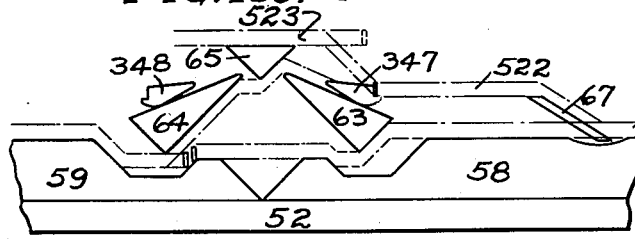
Figure 140:
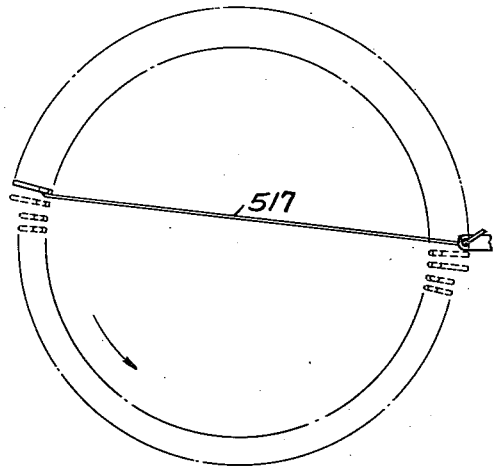
Figure 141:
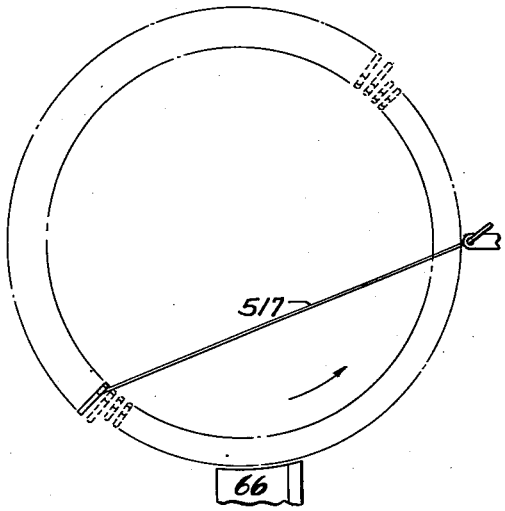
Figure 142:
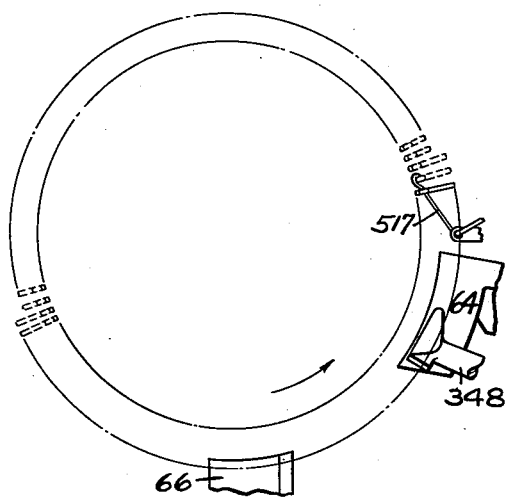
Figure 143:
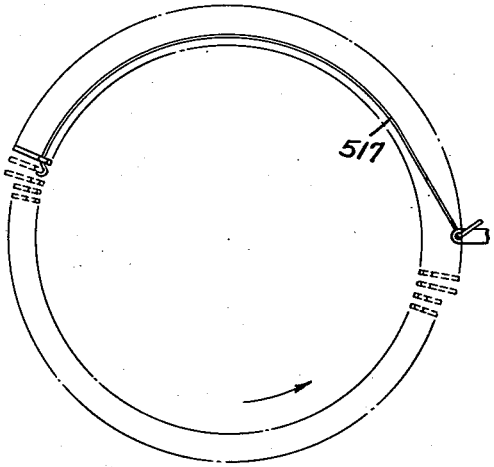
Figure 144:
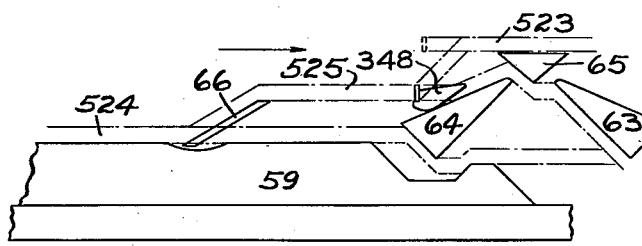
Figure 145:
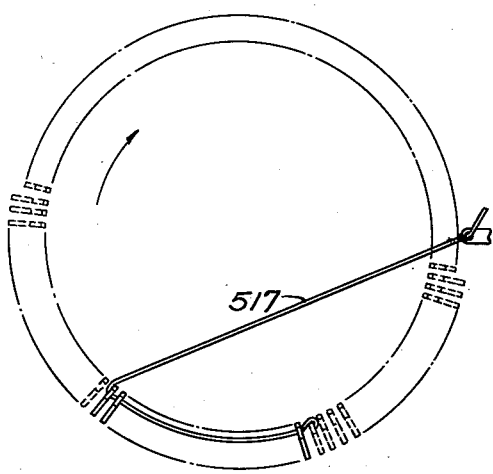
Figure 146:
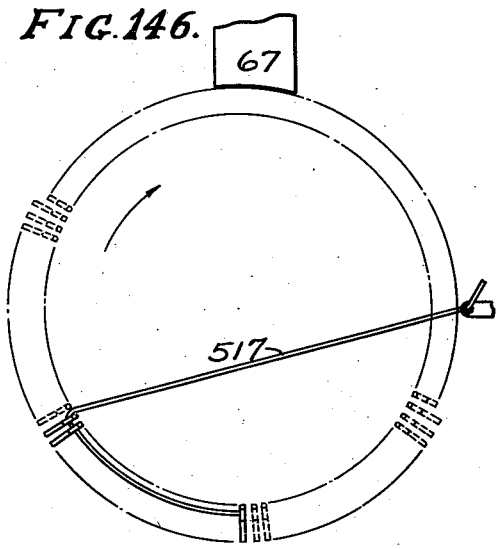
Figure 147:
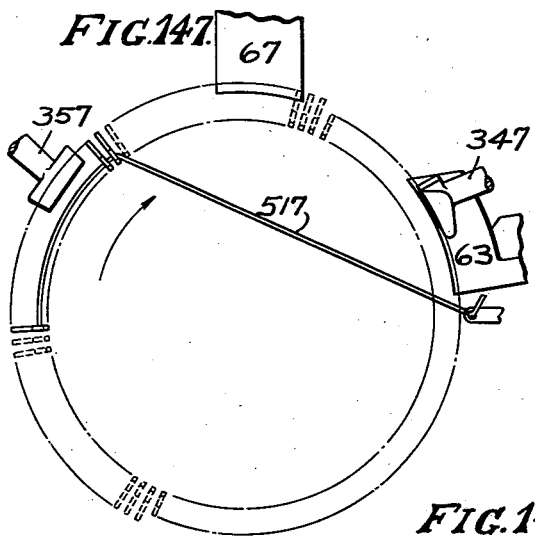
Figure 148:
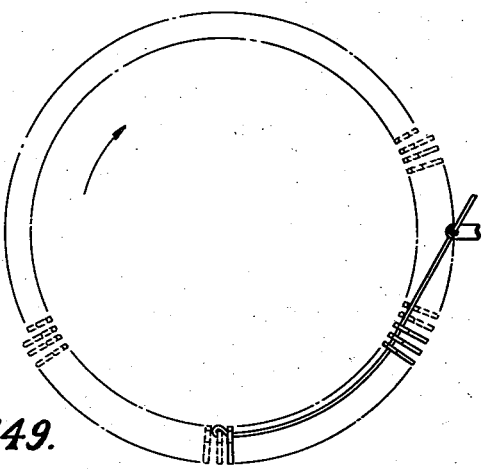
Figure 149:
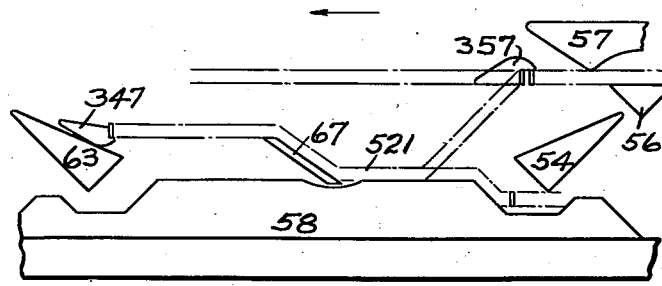
Figure 150:
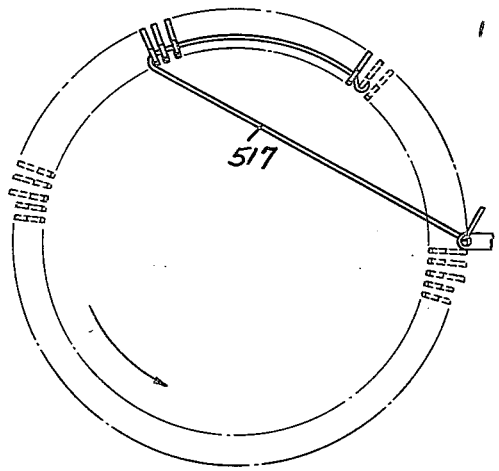
Figure 151:
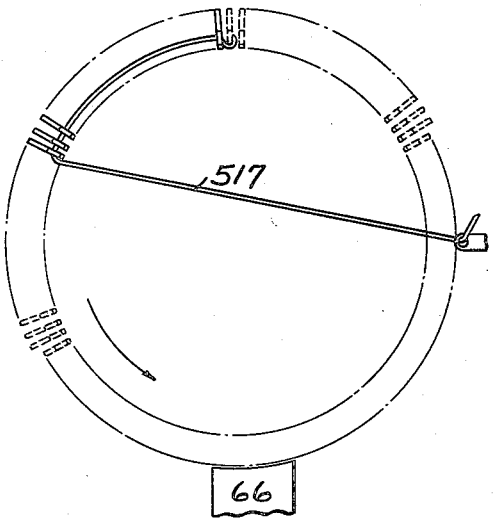
Figure 152:
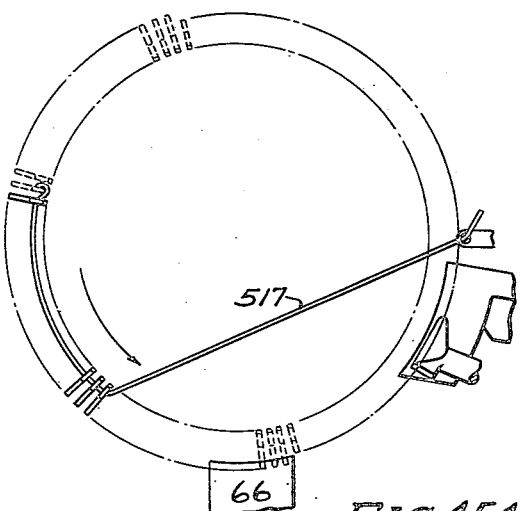
Figure 153:
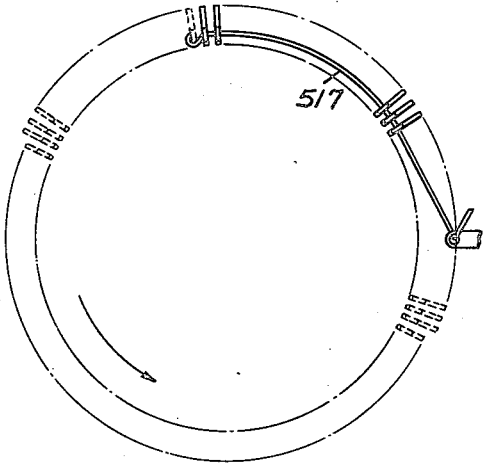
Figure 154:
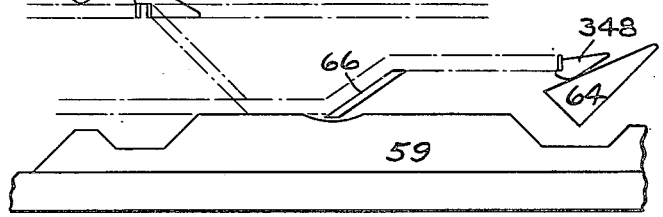

Figs. 4 and 5 are each plan views, Fig. 4 showing the left hand side of the machine and Fig. 5 showing the opposite or right hand side of the machine. Figs. 4 and 5 correspond respectively to Figs. 2 and 3;

Fig. 6 is a front elevation showing certain pattern drums on the main cam shaft and connections leading upwardly to parts of the machine to be controlled from said drums;

Fig. 7 is a plan showing some parts in section, the drive, clutch for connecting the same through to the cylinder for imparting rotary or reciprocatory movements thereto and also the drive for an auxiliary shaft at the rear of the machine being illustrated;

Fig. 8 is a sectional view taken through Fig. 7 and showing the quadrant drive, also a pattern shaft drive as taken off the auxiliary shaft at the rear of the machine;

Fig. 9 is a plan showing the cylinder in section and the various cams, picks and the attendant mechanism spaced about said cylinder;

Fig. 10 is an elevation showing the left hand side of the machine, especially the drive for and the construction of a shaft and pattern means thereon for controlling the yarn feeding fingers, picks and pattern selecting means;

Fig. 11 is a view corresponding to that shown in Fig. 10, but taken at the opposite or right hand side of the machine;

Fig. 12 is a section on line 12—12 of Fig. 14, showing one of the pattern drums for controlling the yarn feeding fingers and mechanism functioning therewith for moving that drum along its shaft to present a different set of pattern determining instrumentalities for actuating the fingers;

Fig. 13 is a fragmentary view showing the drum shaft in section and other elements as seen from the left hand side of Fig. 12;

Fig. 14 is a view corresponding to Fig. 13, but showing the parts on the drum shaft as seen from the other direction;

Fig. 15 is a detail view showing certain controlling mechanism for moving the drum endwise of the shaft;

Figs. 16 is a fragmentary view showing part of the cylinder, circular base of the machine and one pattern selecting assembly including plungers, levers and pattern drum with the ratcheting mechanism for imparting movements to the drum;

Fig. 17 is a detail view showing part of the ratcheting mechanism of Fig. 16 and the means whereby the pattern drum is retimed at certain predetermined intervals;

Fig. 18 is a detail showing the ratchet wheel and disposal of teeth thereon for retiming;

Fig. 19 is a section showing part of the ratchet wheel and pawls acting thereon during the retiming movement;

Fig. 20 is a view similar to Fig. 16 and showing a similar selecting assembly at the opposite side of the machine, this assembly being shown with the pawl for moving the same for patterning purposes;

Fig. 21 shows mechanism beneath the circular base for controlling the ratcheting pawls during timing or for removing the pawls to a completely inactive position;

Figs. 22, 23 and 24 show the different positions of this pawl controlling mechanism during three phases of its operation;

Fig. 25 is a section taken through the main cam shaft and one of the drums thereon for illustrating certain linkage functioning from cams on that drum to control the pawl withdrawing means shown in Figs. 20-24;

Fig. 26 is a section through one of the pattern drums and showing the ratcheting means therefor and the control which governs the extent of movement imparted by the pawls;

Fig. 27 is a similar view showing parts of Fig. 26 in position to allow a racheting movement of two teeth, Fig. 26 showing the position wherein the pawls engage and move the ratchet wheel the distance of a single tooth;

Fig. 28 is an elevation taken from the front of the machine showing the parts illustrated in Figs. 26 and 27;

Figs. 29 and 30 are a plan and elevation respectively, of the outer end of one of the ratcheting levers showing certain details thereof;

Fig. 31 is a section taken intermediate the frame of the machine and showing the main cam shaft and certain pattern drums thereon in plan, also the levers which are to receive movement from cams on those drums, these drums, cams and levers being shown in front elevation in Fig. 6;

Fig. 32 is an elevation of the left side of the machine showing those elements which have been illustrated in Fig. 31;

Fig. 33 is a front elevation of the machine showing the cylinder, sinker head, cams and picks to an enlarged scale;

Fig. 34 is a section taken through part of the circular base and showing the details of construction and certain control for the pattern determining plungers and their actuating levers;

Fig. 35 is a section taken through a fragment of the circular base and showing the supporting and guiding means within which the pattern selecting plungers are carried and moved;

Fig. 36 is a similar view but showing the intermediate levers for imparting selections from the pattern drum to the plungers;

Figs. 37 and 38 are detail views of master cams, one of which is to be used with each selecting assembly;

Fig. 39 is an elevation of a fragment of the machine, parts being shown in section, and showing the connections to the main pattern drum for controlling the non-patterning yarn finger and for withdrawing from action all the yarn fingers automatically, also a connection for withdrawing the main cam block;

Fig. 40 is a section showing further details of the control for yarn fingers as exercised by the main pattern drum;

Figs. 41 and 42 are further details of the same mechanism;

Fig. 43 is an elevation showing means for withdrawing the front narrowing pick at certain times;

Fig. 44 is a section and plan taken at the top of Fig. 43;

Fig. 45 is a detail showing certain parts at the upper end of Fig. 43;

Fig. 46 is a section showing in detail the linkage for periodically withdrawing certain of the pattern controlling plungers;

Fig. 47 is an isometric view showing the set-up of butts on the needle selecting jacks;

Fig. 48 is an elevation showing part of the machine, especially the plain sole mechanism at the front of the machine and the control leading to the cam drum for the same;

Fig. 49 is a section showing part of the cylinder and a plan view of the plain sole mechanism at the front and rear of the machine on the left hand side;

Fig. 50 is a detail of this plain sole mechanism at the front;

Fig. 51 is a similar detail of the similar mechanism at the back of the machine;

Figs. 52 through 63 inclusive are detail views showing the separate cams on the cam drum on the main cam shaft;

Fig. 64 is a development of the cams on the main cam drum;

Fig. 65 is a similar development of the cam drum at the middle of the main cam shaft;

Fig. 66 is a similar development of a small drum at the end of this cam shaft;

Fig. 67 is a developed view of the pattern butt set-up on the yarn lever controlling drum at the auxiliary side of the machine;

Figs. 68, 69 and 70 show in plan the arrangement of butts on those discs which are to control yarn feeding fingers;

Fig. 71 is a developed view of the pattern drum for controlling the yarn feeding levers or fingers at the main side of the machine;

Figs. 72 and 73 are similar plan views of the pattern butt set-up at this side of the machine;

Fig. 74 is a development of the cams for special control of selecting plungers and widening picks at the front, left side of the machine;

Figs. 75, 76 and 77 are elevations showing details of each of the three cams on this drum at the front, left side of the machine;

Fig. 78 is a view similar to Fig. 74, but showing the cams on the shaft at the rear right hand side of the machine;

Figs. 79, 80 and 81 are elevations showing the details of those same cams;

Fig. 82 is an elevation of a disc on the front end of the left hand shaft showing the relative position of the shaft when the cams occupy the position shown;

Fig. 83 is a development of the drum and cams at the right, front side of the machine;

Figs. 84, 85 and 86 are elevations showing the details of the three cams on that drum;

Fig. 87 is a view similar to Fig. 83, but showing the cams at the rear of the machine and at the left hand side;

Figs. 88, 89 and 90 are elevations showing further details of these same cams;

Fig. 91 is an elevation of a disc on the shaft at the front right hand side of the machine to show the relative position of the shaft when the cams occupy the position shown;

Fig. 92 is a development of the butts on the pattern drum 245 at the front, left hand side of the machine;

Fig. 93 is a similar development of the drum 300 at the rear right hand side of the machine;

Fig. 94 is a development of the butts on the drum 224 at the front right hand side;

Fig. 95 is a similar development of butts on pattern drum 301 at the rear of the machine and at the left hand side;

Fig. 96 is a diagrammatic view showing the needle cams, stationary jack cams and the narrowing and widening picks;

Fig. 97 is a corresponding diagrammatic view showing many of the same cams and also the selecting plungers, the cams and selecting mechanism shown in this figure being employed while knitting the pattern, while the cams illustrated in the previous figure show the various positions occupied during knitting the heel and toe;

Fig. 98 is a side elevation of the take-ups;

Fig. 99 is an elevation taken from the front of the machine and showing the same take-ups;

Fig. 100 is an elevational view showing a modification to be used in place of the pattern drum for controlling yarn feeding levers;

Fig. 101 is a section taken through the upper drum in Fig. 100, and showing certain other parts of the modification;

Fig. 102 is a section through a drum to be employed at the opposite side of the machine in place of one of those drums employed in the preferred form of the invention;

Fig. 103 is a section through the same drum shown in Fig. 102;

Figs. 104 and 105 are detail views illustrating one of the links in the pattern chain to be used with this modification;

Fig. 106 is a section through one of these chain links;

Fig. 107 is an elevation showing a stocking with one particular pattern knitted in solid colors, this pattern being the one described herein with respect to the operation of the machine;

Fig. 108 is an elevation showing a part of the stocking shown in Fig. 107 as seen from the back;

Fig. 109 shows the same stocking as the pattern appears at the front;

Fig. 110 is a view showing the fabric much enlarged, the particular part shown illustrating the widening of one of the front pattern formations;

Fig. 111 is a corresponding view, but showing the same part of the pattern wherein the figure is being narrowed;

Fig. 112 is a view of the fabric as seen at the back of the stocking and showing one of the solid color areas during widening;

Fig. 113 is a similar view but showing the same figure as it is being narrowed;

Fig. 114 is a diagrammatic view showing some of the needles, some of the yarn guides and the yarns being fed, this view being taken at the start of a reciprocatory stroke in the clockwise direction;

Figs. 115 through 123 inclusive, show successive steps during that clockwise stroke of knitting in the pattern areas;

Fig. 124 is a view similar to Fig. 114, but showing the position of needles, yarn levers and the various yarns at the end of the clockwise stroke or at the beginning of the counterclockwise stroke;

Figs. 125 through 133 are a series of diagrammatic views showing successive steps in the counterclockwise stroke of knitting;

Figs. 134, 135, 136 and 137 show the successive positions of needles and the yarn in the heel and toe knitting during narrowing in a clockwise direction;

Fig. 138 is a diagrammatic view showing the path of certain needles through the cams and at the end of the stroke during narrowing;

Fig. 139 is a diagrammatic view showing the path of needle butts during picking while narrowing;

Figs. 140 through 143 inclusive show successive steps during the narrowing in the heel or toe, but during the counterclockwise stroke;

Fig. 144 is a diagrammatic view showing the picking in this direction;

Figs. 145 through 148 inclusive, show successive steps in a diagrammatic fashion, of the widening in the knitting of the heel or toe, these views representing clockwise strokes;

Fig. 149 is a diagrammatic view showing the path of needle butts during this widening;

Figs. 150 through 153 inclusive show corresponding steps during the widening but in a counterclockwise direction;

Fig. 154 is a diagrammatic view similar to Fig. 149 but illustrating the pathway of needle butts as they pass through the cams in the opposite direction.

Many stockings have been produced wherein pattern effects are made by the so-called solid color methods, but to the present time, we are not aware that such hosiery has been made on anything except certain types of machines upon which methods are practiced which are generally referred to as hand methods, and thus the hosiery has been sold as hand knitted stockings. Among the purposes of the present invention is the production of a machine which will make this sort of hosiery entirely by automatic means, that is, at least as nearly automatic as it is customary to make other types of hosiery at the present time. The so-called hand methods have been exceedingly slow, and as a result, production was so limited that the cost of such hosiery has been high. The present machine, while not as rapid in its production as many circular hosiery machines, has a speed of production several times that attained by hand methods and will produce at a rate which makes it possible to put out this exceedingly popular type of stocking at a price below that of such hand knitted articles thereby making possible a greater market for the goods and tending to increase their popularity.

The patterned parts of hosiery made by the present method as well as the heel and toe of such hosiery are to be knitted by reciprocation of either the knitting instrumentalities or their actuating devices. Certain parts such as the ring top, ring toe and loopers rounds are to be knitted as circular work, that is, while the machine is rotated continuously in one direction. This greatly increases the speed of knitting, and in fact, all parts of the stocking except those in which the solid color patterns appear, will be knitted at a speed comparable to that at which similar parts of all men's hosiery are knitted.

The patterns formed in making such solid color work may be of practically any desired size, shape and variety of colors within the normal capabilities of the hand machine. The patterns most commonly knitted are those of diamond shaped areas of contrasting colors, such diamonds generally being rather large and probably extending about the article for roughly 180 degrees of its circumference. Of course, smaller figures may be produced, figures may occupy a space at either side of the article such as in forming clocks, or may take the form of different sized figures. It is not essential that the patterned areas represent diamonds, as checkerboard patterns may be made, or in fact, almost any of the usual figures may be reproduced, this depending upon the pattern scope built into the individual machine and the particular set-up of the patterning devices thereon all as controlled by the knitter. The pattern possibilities are in all respects as great as those on hand machines, and in some instances may be greater.

Stripes may be made at intervals, or throughout the entire article, thus being limited to fine lines or being made upon a single needle so as to offer additional ornamentation to the basic figures such as the diamonds, squares or other basic patterns. Several colors may be employed throughout the different areas and one single patterned area or figure may be knitted of more than one color to give a variegated effect.

The machine in general comprises a frame, driving mechanism including the usual quadrant and clutch mechanism for shifting from rotary to reciprocatory knitting and vice versa, and a main cam shaft having the usual pattern chain and pattern drums thereon. A needle cylinder is driven at times to rotate and at other times to reciprocate, and carries latch needles and sinkers. Fixed cams impart movement to the sinkers and to the needles. Two feeding stations are to be employed, one termed a main feeding station and the other the auxiliary feeding station, this terminology being employed more for purposes of identification than for reasons of relative importance as to the feeds themselves. It is to some extent a matter of choice as to which of the yarns shall be fed at one side or the other, of course, realizing that if feeding sides should be changed, the set up of the machine would have to be changed accordingly.

Selecting jacks and more or less conventional selecting assemblies are employed, the jacks being selected for the purpose of determining the contour of the patterned areas. Since the machine reciprocates to and fro during the knitting of pattern work it is essential to duplicate the pattern selecting assemblies at the front of the machine and at the back of the machine in order to provide a selection in each direction of reciprocation, and also one at each side of the article to be knitted. Dring each reciprocation one only of each pair of pattern selecting assemblies is to be in operation, thus one has to be removed from effective contact with the selecting jacks while the other is functioning.

In addition to controlling needles to determine the configuration of the patterned areas, yarn feeding fingers must be actuated to introduce and withdraw their yarns from action during each stroke of the machine and in proper sequence to control the production of the appropriate colors within these patterned areas. The knitting is carried on by reciprocatory work and the article produced has an overlapping seam at the back which marks the junction of the two sides of the fabric as formed at the ends of the reciprocating strokes. Of course, this is a knitted seam, and to all intents and purposes, the article appears as one knit on a circular machine throughout, that is, not as a flat knitted article which has been seamed up the back by a separate and distinct process.

The separate yarns of contrasting colors, or yarns differentiated in some respect are fed at each course in such a way that during each reciprocation a complete course is knitted. This is in direct contrast to the hand method wherein one color is fed to a group of needles on one stroke while it is necessary to feed another color or colors on subsequent strokes in order to complete a single course in the fabric. The separate pattern figures are thus knitted of a solid color and of different yarns so that they must be interknitted by a suture of some sort. This suture is formed in the present case by selecting needles to and from one side or the other of a suture line which line marks the joining of the two contrasting areas. Each of these assemblies as well as the other functional parts of the machine will be described in detail throughout the following paragraphs, and thereafter, the operation of the machine will be described with respect to knitting one particular pattern which may be produced thereon.

Now referring to the figures of drawing we will describe the mechanism in detail and will thereafter disclose one example of the operation of the same. Referring to Figs. 1, 2, 3 4 and 5, a frame is generally indicated at 1, a so-called circular base at 2 and a needle cylinder at 3. This needle cylinder is rotatable and carries therein a plurality of latch needles not shown in these figures but illustrated in some figures later to be described. These latch needles are of conventional type and cooperate in drawing stitches with the usual sinkers. These sinkers are mounted in a sinker head 4 and are controlled by suitable cams in the sinker cap 5. A latch ring 6 is pivoted to swing upwardly about a post at the rear of the machine and said latch ring has extensions 7 and 8 at the auxiliary and main sides of the machine respectively, within which a plurality of yarn feeding fingers are pivoted. This latch ring is to be raised and lowered by gripping a handle 9 and will be latched in operative position by the latches 10 and 11 at the opposite sides of the machine. These latches pivot about the shoulder screws 12 and 13 and are urged into position to engage pins 14 and 15 projecting from the latch ring, by means of springs 16 and 17.

*Driving means for cylinder, etc.*

Now referring to Figs. 7 and 8 a main shaft 18 is guided within suitable bearings in frame 1. A pulley 19 fast to a sleeve 20 is free to turn on shaft 18. Two pinions 21 and 22 are also free to run on this shaft, and the pinion 21 is constantly in mesh with a gear 23 known as the 104 tooth gear and rotatable in this particular instance in a manner different from that in more common types of Banner machines. A sprocket 24 is also fixed to sleeve 20 and by means of a chain 25 driving a larger sprocket 26 will rotate shaft 27 at the rear of the machine. This shaft 27 is rotatable in bearings at the outer ends of brackets 28 and 29 bolted to the frame of the machine. A pinion 30 is also fixed to shaft 27 and meshes with the gear 23 thus driving that gear continuously whenever a belt (not shown) is shifted to the pulley 19 to drive through sprockets 24 and 26 as described. This provides a slower speed for the 104 tooth gear than the normal drive provides without this additional chain and sprocket reduction. By normal drive we mean a drive wherein the 104 tooth gear is driven substantially as shown in Hemphill Patent 933,443.

A quadrant 31 is pivoted to swing at 32 and is continuously oscillated by link 33 connected at 34 to the 104 tooth gear and at 35 to an arm 36 which is an integral part of the quadrant itself. The quadrant has teeth meshing with pinion 22 which is freely rotatable on shaft 18. A clutch 37 is slidable along shaft 18 but must rotate therewith since it is keyed to the shaft by a sliding key. The said clutch is movable along the shaft by the usual clutch shifting lever and controlled from the main pattern drum, see Hemphill Patent 933,443. Dogs 38 and 39 are engaged with cooperating slots in the hubs of gears 21 and 22 so that when in position of Fig. 7, the drive will be from the quadrant 31 through the pinion 22, clutch 37 and shaft 18 to a bevel gear (not shown) at the end of said shaft 18 for reciprocating the cylinder. When the clutch is shifted in the opposite direction the drive will be through the 104 gear to pinion 21, through clutch 37 and the shaft to the cylinder, but in this instance, the motion will be purely rotary.

A collar 40 is adjustable on shaft 27 to restrain the same from axial movement. A sprocket 41 is fixed to the inner end of shaft 27 and by means of a chain 42 drives a larger sprocket 43, Figs. 5 and 10, and incidentally shaft 44, the details and purposes of this drive being explained in paragraphs to follow. The chain 42 is maintained taut and in adjustment by an idler or adjusting pulley 45 rotatable on a stud 46 which is in turn threaded into a block 47. This block 47 is adjustably fixed to an extension at the rear of the circular base. Said block is held downwardly on the base by means of bolts 48 which pass into elongated openings in the block, and adjustments are effected and maintained by the screw 49 and lock nut 50.

Needle cams

Now referring to Figs. 2, 3, 4, 5, 9, 33, 96 and 97, we will describe the cams which control the actuation of the needles and other mechanism associated therewith. There are two separate feeding stations indicated at A and M, the auxiliary and main feeding stations, respectively. At each of these ends is provided a cam assembly consisting of the usual stitch drawing cams, center cams, and at the auxiliary feed a wing cam, so called. Each of these sets of cams is mounted on a block which is in turn carried by the usual cam plate. For instance, the cams at the side A are secured to a block 51 which is in turn mounted on cam plate 52. The cylinder is unusually long in this type of machine and the cam plate is mounted at the upper end of a post 53. These cams at the auxiliary side include stitch cams 54 and 55, center cam 56 and wing cam 57. In diagrammatic views 96 and 97 the cams are cut right at the center of the auxiliary station and thus opposite halves of the said cams appear at the extreme ends of the figures. The usual raise cams are provided and are herein indicated by numerals 58, the raise cam at the back of the machine, and 59, that at the front of the machine.

Now turning to the opposite side of the machine the main cam set includes a cam block 60 mounted on a plate 61 at the front end of post 62. At the main cam set there are stitch cams 63 and 64 and a center cam 65. By mechanism hereinafter to be described this cam block may be withdrawn and likewise the front stitch cam 64 may be withdrawn separately as when transferring a rib top to the needles. From an inspection of Fig. 9 it can be seen that cam plate 61 extends farther about the circumference of the cylinder than the opposite plate 52. The raise cams 58 and 59 are also necessarily made in two pieces, but are not so illustrated in the diagrammatic views for purposes of simplicity and clearness. These cams are shown in their exact length in Figs. 9 and 33.

At the front and at the back of the machine we provide special needle raising cams 66 in front and 67 at the back of the machine. These cams are integral with stems 68 and 69 respectively, being movable to and from positions to engage the needle butts. Since the construction of these special raising cams is substantially identical at both the back and front of the machine, we will describe that at the front only. The stem 68 is slidable within a horizontal slot in a cam bracket 70 which is permanently attached to the plate 61. This slot or groove within which the cam stem slides is completed by a cap 71 which has a slot 72 aligning with a pin 73 threaded into the said stem and projecting upwardly through the slot. The stem 68 is bent downwardly at right angles to form a projecting portion 74 within which is threaded an adjusting screw 75. This provides a limit for the inward movement of the cam as the end of the screw strikes against the outer side of brackets 70. After adjustments are effected they are maintained by lock-nuts 76. A spring 77 is hooked about a projecting pin 78 which is threaded within the extension 74, and at the other end, engages a second pin 79 projecting from the bracket 70. This spring is under considerable tension and normally tends to keep the cam inwardly to engage the butts on the needles.

At various times throughout the making of a complete stocking it is essential that this cam be moved to and from its various positions. The mechanism for accomplishing this will be described in a separate paragraph.

Yarn feeding mechanism

Now referring to Figs. 2, 3, 4, 5, 12–15 and 39–42, we will describe the yarn feeding mechanism and the pattern control for the same. The usual yarn fingers are indicated at 80 at the side A and at 81 at the side M. These fingers pivot within the usual extensions of the latch ring at points 82 and 83 respectively. The springs 84 and 85, one for each of the separate fingers, normally would move those fingers to a yarn feeding position. The hand operated devices 86 and 87 serve to withdraw all the fingers at once. Their construction and function is not different from that of similar devices on other machines and will not be described in detail here. At each side of the machine a yarn lever control box projects upwardly at 88 and 89, each of these boxes at its upper end carrying a series of yarn finger engaging levers 90 and 91. In this particular example we have shown seven separate yarn fingers at each side of the machine and there would necessarily be seven cooperating levers 90 and a like number at 91. It is obvious that more or fewer fingers may be used depending upon the number of colors and the number of other yarn it is necessary to knit throughout the stocking. All of these fingers which are to feed patterning yarns, that is, the contrasting colored yarns, will be controlled by one of the levers 90 or 91 at all times. It will be necessary to make several changes of the position of the finger within a course in many patterns. For this purpose we have provided pattern drums at each side of the machine which are continuously rotating and have thereon a sufficient number of patterning cams or butts to afford the necessary movements incidental to the control of these fingers. Of course it is not necessary similarly to control the yarns which are knitted throughout areas wherein there is no patterning. Those yarns would be such as are fed in the ring top, ring toe, loopers rounds and the heel and toe. Separate yarns may be used at some of these areas, or more likely, the same yarn will serve for each of them.

These non-patterning yarn fingers are preferably controlled by the usual connections running down to the main pattern drum on the cam shaft. Referring to Figs. 39–42 this control is illustrated in detail.

In Fig. 39 the levers 81 are shown, one in raised position where it would not feed its yarn to the needles, and the others in lowermost or yarn feeding position. These fingers, as before stated, are controlled by a series of levers 91 which are in turn under the influence of a second series of levers 92 pivoted at 93 in an extension or cap 94 attached to the top of the yarn lever box 89. These levers 92 extend upwardly and have toe or follower portions 95 which are in contact with butts or other pattern determining conformations on a drum expressly for the purpose of imparting the selecting movements to the yarn fingers. The complete description and operation of these drums will be explained more fully in a following paragraph.

One of these fingers 81 at this main side of the machine has the usual connection to the main pattern drum 96 on main cam shaft 97. This connection comprises a wire 98 running up through the yarn lever box and connected by a loop at the outer end of the appropriate lever 91. At its lower end said wire connects to one end of a lever 99 which is actuated by a cam or cams as at 100 on said drum. The control is such that this non-patterning yarn finger will be brought into active position and will remain in that position for such intervals of time as that particular yarn is desired to be knitted in the fabric.

At this same side of the machine, that is, the main side, a second connection is provided which will withdraw all the other yarn fingers 81 in unison. Referring to Figs. 39 and 42, a series of shorter wires 101 are each attached within a notch at the outer end of levers 91 by the usual loop and pass downwardly through an angular element 102 being adjustably held thereby by means of stops 103 secured at the ends of the wires by set screws 104. At the back of this angular element 102 an elongated wire 105 extends downwardly to connect at the rearmost end of a lever 106 which is under control of certain cams 107 on drum 96. At the desired intervals, as will be described more fully with respect to the operation, this mechanism will lift all the yarn fingers at the main side from feeding position except the finger or fingers which are to be used to guide non-patterning yarns. It will be noted that the wire 98 passes freely down through one of the openings in element 102. Of course, at the time this control is functioning when the toe of lever 106 is on a cam 107, levers 92 are ineffective.

Now referring to Figs. 6, 40 and 41, similar mechanism is shown at the opposite or auxiliary side of the machine. Here a series of levers 108 are pivoted at 109 in an extending cap 110 fixed to the top of yarn lever box 88. The levers 90 each have a wire 111 depending from the outer end and passing through a second angular element 112, being adjustably held by that element as each of the wires has a stop 113 clamped thereto by a set screw 114. A depending wire 115 is coupled to a second wire 116 by the adjustable coupling 117 and connects at its lower end to an offset link 118. This link 118, Figs. 6, 31 and 32, attaches at the outer end of a lever 119 pivoted at the stud 120 and having a toe 121 which engages cam 122 and 122' on drum 123 at the outer end of the main cam shaft 97. The cam 122 acts to withdraw all the fingers at the auxiliary side during heel knitting and the other cam 122' performs the same function through the ring toe, toe, loopers rounds and ring top.

It is not strictly necessary to have a lever 92 or 108 for such fingers as feed these non-patterning yarns, although the same are provided on the machine and the pattern set up on the drum is arranged accordingly.

*Pattern control for the yarn feeding fingers*

Now referring to Figs. 2-5, 7, 8, 10-15, 39 and 40, we will describe the pattern control for the yarn fingers, especially those fingers that feed the color or patterning yarns. The shaft 44, as before described, is driven by a double chain drive from the main shaft of the machine, the said drive including chains 25 and 42. This shaft 44 in turn drives two other shafts 124 and 125 at the left and right sides of the machine, respectively. The shaft 44 is mounted to rotate in bearings in the extending brackets 126 and 127 and is restrained from endwise movement by collars 128 and 129. The brackets 126 and 127 are also extended towards the end of the machine to provide bearings 130 and 131 for the driven ends of said shafts 124 and 125. The other ends of these shafts are carried in similar bearings in brackets 132 and 133. Each of the shafts 124 and 125 has a bevel gear fixed thereon which is driven by a cooperating bevel pinion on shaft 44. A pinion 134 drives gear 135 on the shaft at the left hand side of the machine while a similar pinion 136 drives a gear 137 and incidentally the shaft at the right hand side of the machine. Collars 138 and 139 keep the shafts from moving axially.

On each of these shafts we provide a pattern drum for controlling the yarn fingers through levers 108 at the left side of the machine and levers 92 at the opposite side. These pattern drums will be generally designated by numerals 140 and 141, although the separate parts will be described in detail and may be designated by numerals individual to those parts. The shafts, and of course, the drums will be continuously driven and will make a complete revolution every time the cylinder makes a right and left hand stroke.

Now referring to Figs. 12, 13 and 14, one drum is shown in detail and is made up of a hub and flange 142 to which is bolted at one side a plate 143 and at the other side a ring 144 and plate 145. The outside diameter of the first mentioned plate and the ring are greater than that of the flange so that when the ring and plate at the open side of the assembly are removed, a plurality of pattern discs 146 may be slipped on to the drum and later clamped as the ring, etc., are replaced. Each disc has a plurality of butts or pattern determining conformations 147, these being preferably broken away as is common in the pattern discs used on Banner machines. Each of these discs is spaced from that adjacent by a thin spacing washer 148. The discs are made up in two halves as illustrated in Fig. 14 and are held in place by the dove-tail splines 149 and 150 each being set into the flange 142 and attached thereto by means of suitable screws as shown in Fig. 12. These engage a dove-tail slot in each half of the pattern disc to retain the same in engagement within the drum. Of course, little strain is taken by these dove-tail connections since the whole assembly is tightly clamped when the screws 151 are tightened against the plate and ring.

It will be noted that there are twice as many pattern discs as there are levers 108 at the left side of the machine, and the same applies at the opposite side. These discs are also spaced at a pitch one-half that of the spacing of the said levers. At certain times during the knitting of an article it is essential to move the pattern drum along the shaft so that said levers will engage with a different set of discs. To provide for such movement as above indicated the hub of the drum is slidable along a sleeve 152 which is fixedly attached to the shaft on which the drum is rotated. The rotational movement is imparted to the drum by a key 153 driven into the hub 142, but slidable within a key-way in the sleeve itself. Normally the entire assembly is moved to the left, Fig. 12, by a spring 154 which seats against the hub 142 and against another pattern or cam assembly adjacent to the drum. This spring keeps the said assembly over against a collar 155, or in other words, moves the drum along the sleeve until a washer 156 strikes the face of said collar. In Fig. 10 the pattern drum 140 is shown in the position just mentioned, but, in Fig. 12, that drum has been moved against the tension of spring 154 so that the levers 108 bear on seven different discs from those they bore upon in the showing of Fig. 10. The mechanism for moving this drum endwise comprises an upwardly extending spindle 157 which has its upper end flattened as shown at 158 in Figs. 13 and 15. This spindle is capable of being turned within a bearing 159 in a bracket 160 extending out from the end of the machine and holding said spindle in a position so that it will align with the shaft 124. A collar 161 prevents movement of the spindle in one direction while the hub 162 of a lever 163 for actuating the same prevents axial movement upwardly. As can be seen, when this spindle 157 is rotated 90 degrees, it will force its full diameter between the collar 155 and the washer 156 to move the drum endwise against spring 154.

The movement is obtained from the elongated and offset lever 164, Figs. 31 and 32, which is also pivoted on stud 120. This lever has a toe which engages cam 165, Figs. 31 and 32, and at its other or outer end is connected to a link 166 extending upwardly to connect to one end of a bell crank lever 167. This lever pivots at 168 to a portion of the base of the machine and at the opposite end engages a twisted link 169 which in turn is connected to the lever 163, Figs. 10, 12 and 15. A spring 170 is connected to a fixed part of the frame and to a collar 171 on link 166, this spring being under tension and tending to keep the toe of lever 164 down on the drum or in the position of Fig. 32. Fig. 15 shows the extreme positions to which the lever 163 is moved.

So much of this yarn finger controlling drum mechanism has been described with respect to the left hand side of the machine, but that mechanism shown at the opposite side is substantially identical and will not be described in any detail herein. Similar mechanism, Fig. 11, is provided at that side of the machine for moving the drum endwise of the shaft and includes a spindle 172 functioning at the upper end between a washer and collar identical with that described heretofore; the spindle also has a controlling arm or lever 173 at its lower end by means of which it is rocked through substantially 90 degrees. This lever is connected to one end of a bell crank lever 174 by a link 175. The bell crank lever has connected at its opposite arm a downwardly extending link 176 which connects to a lever 177 pivoted at 178. This lever has a toe 179 which engages a cam 180 on drum 181 on the opposite end of the main cam shaft 97. A spring 182 similar to the spring 170 serves the same purpose. The purpose of this endwise movement of the drums and the reason for bringing into action a different set of pattern discs will be described fully with respect to the operation of the machine after we have thoroughly described the mechanism itself.

Jack assembly for jack cams

Now referring to Fig. 47, the needles 183 each have a jack 184 cooperating therewith in the same slots at the lower end of the cylinder. The needles have been divided into two groups, one group having long butts 185 and the other group having short butts 186. These different lengthed butts are disposed in an equal number at either side of the cylinder, although for some purposes it may be desirable to have some different disposition of the same. In contrast to the usual practice, the long butt needles correspond to the part of the fabric knitted at the heel or toe side, while the short butt needles are identified with the instep side of the stocking.

Each of the jacks 184 has a master butt 187 adjacent the lower end thereof and a plurality of removable butts 188 disposed along the length of the jack above said master butt. These butts are herein shown of saw-tooth shape, but may be of the usual rectangular type if desired. Another butt 189 serves to push the jacks down after they have been selected and have been raised by a cam engageable with the master butt as will be described later. These butts 189 are likewise of two lengths, the long and short butt disposal being the same as that described with respect to the needles. The reason for this is that when knitting a plain sole, certain nullifying cams contact the long butts only.

The jack operating cams, Figs. 96 and 97, include two raise cams 190 and 191 which serve to align the jacks for proper passage through the selecting plungers. At the front of the machine two cams 192 and 193 serve to engage the master butts 187 and to raise jacks and incidentally their needles. A series of plungers 194 is disposed adjacent cam 192 and imparts selections to the jacks just before they strike that cam as they pass through rotating in counterclockwise direction. Another series of plungers 195 performs the same function with respect to cam 193 but in the opposite direction.

At the back of the machine, cams 196 and 197 in cooperation with a series of plungers 198 and 199 operate in the same way. Cams 192 and 197 and plunger groups 194 and 199 select needles which are to knit at the main feeding station, and cams 193 and 196 in cooperation with plungers 195 and 198 impart the necessary selections at the auxiliary side. The even numbered elements function in a counterclockwise direction while the odd numbered groups impart selections in the clockwise direction. Cams 200 and 201 engage the jack butts 189 and return those jacks to a lowermost position whereupon they will be leveled as they are raised on one or the other of cams 190 and 191. The set-up of butts as shown in Fig. 47 and the specific mode of operation during the knitting of one particular pattern will be described later with respect to the operation of the machine.

Now referring to Figs. 37 and 38, the cam 192 has been shown in detail. This cam has a butt engaging edge 202 and a stem 203, also a horizontally disposed lip 204 which engages the lower extending end of the jack as the master butt passes beneath the inclined edge 202 so that the jack is held inwardly in its slot and there is no interference with said inclined edge and the patterning butts.

Now referring to Fig. 16, this cam 192 is shown in position. The stem 203 fits within a milled slot 205 in the base of the machine and is slidable therein. The stem is slotted as at 206 and a shoulder screw 207 engages within the slot and retains the cam assembly down within the milled slot 205 so that it may slide radially therein but is not free to move in any other direction. A spring 208 serves to draw the cam into operative position but allows it to move outwardly upon improper contact of any butt with the operating surfaces. The spring is connected to a projection at the rear of the stem of the cam and also attaches to some fixed element on the machine, in this specific instance attaching to a pin extending from one of the slots which retains selecting plungers.

*Jack selecting means*

Now referring to Figs. 16, 20, 34–36, and 46, we will describe the mechanism for imparting selective movements to the jacks. The assemblies shown in Figs. 16 and 20 are substantially the same but are situated at opposite sides at the front of the machine and one only of these will be described in detail. The series of plungers 194 are arranged to be guided and slidably held between a plurality of inclined spacers 209 and 210. These spacing members are secured in slots cut within a pair of upright posts 211 and 212. These posts are attached to a plate 213 which engages and is secured within a milled slot 214 in the extension 2' from the base of the machine. Each of these plungers has a bevelled end adjacent the cylinder and is so shaped as to engage the saw-tooth, pattern butts 188 in a manner similar to that disclosed in United States Patent #2,067,877. In this particular machine there are thirty-three plungers at each of the selecting stations, although it is obvious that many different numbers of selecting butts, that is, stages of selection, may be employed depending upon the particular article and pattern to be knitted.

A second post assembly 215 is arranged adjacent the plunger assembly and provides spaced openings within which a series of levers 216 are free to be rocked in a horizontal direction. There is one lever for each of the plungers. Alternate plungers are slotted and shown in Figs. 16 and 34 at a position to accommodate knuckles 217 directly at the ends of the cooperating levers. The intervening plungers are slotted similarly to receive knuckles 218, but in an offset relationship so that there is no interference between adjacent knuckles and the slots of adjacent plungers. This avoids a lever affecting anything except the precise plunger with which it is to operate. A cap 219 is secured to the top of the post 215 and a plurality of spacers 220 serve to maintain the levers in properly spaced relationship so as to align with the respective plungers.

Each of the levers has an angular extension terminating in a toe 221 at its outer end. This toe engages with a cooperating pattern disc 222 having removable butts 223. There is a disc for each of the levers. These discs are retained in the usual way in a pattern drum 224, the specific description and mode of operation of which is to be described later. In the fingers herein described with reference to the machine itself, we have not attempted to show any of the butts broken away or otherwise removed since one particular pattern set-up is illustrated in the figures which accompany the description of the operation.

Alternate levers have extensions 225 and intermediate ones have an extension 226 offset therefrom, each having a spring 227 or 228, respectively, to maintain the levers, or the toe thereof, against the pattern disc respective thereto. These springs also serve to retain the plungers inwardly in selecting position except when the toe 221 of a lever rides up on one of the butts on its disc. Further, these springs allow a plunger to be moved outwardly in the event of some unexpected interference.

The ends of the extensions to the levers which terminate in the toe portions 221 are also to be guided between a series of spacer elements 230, properly supported and separated by an upwardly extending post 231, Figs. 16 and 34. The springs 227 and 228 attach at their fixed ends to pins 232 and 233 threaded into the base of the machine and guided at their upper ends by bar 229.

It is essential at certain times to withdraw plungers from operation, sometimes withdrawing all the plungers at once and at other times withdrawing the group at the lower end of each set and another group comprising the remaining plungers at the upper end thereof. For this latter purpose, we have extended the cap 219 outwardly at 234 and at 235 to support the upper ends of spindles 236 and 237, respectively. The lower ends of these spindles are pivotally supported within suitable bearings drilled and reamed in the base. The spindle 236 carries a cam portion 238 which in the particular example shown is of sufficient extent to contact the five levers 216 at the lower end of the group. A similar cam 239 on spindle 237 will contact the remaining levers, or the twenty-eight topmost levers.

We have described rather specifically the mechanism comprised in one of these assemblies at Fig. 16, and since all of the selecting devices are practically identical, we will not describe in detail any of the others. In Fig. 20 the corresponding selecting means in front of the auxiliary side is shown and, of course, similar parts may be identified in this particular view. In general, the plungers 195 are controlled by a series of levers 240 working within a post assembly 241 and having toes 242 for engagement with butts 243 on discs 244 in turn mounted within a drum 245 similar to drum 224. Cams 246 and 247 correspond to similar cams shown and described with respect to Figs. 16 and 34.

*Special control for selecting means*

Now referring to Figs. 2, 3, 4, 5, 16, 20, 34 and 46, we will describe special controlling means functioning through the cams 238 and 239 for controlling the withdrawal of plungers at special times. Each of the spindles 236 and 237 has fixed at its upper ends levers 248 and 249, Figs. 34 and 46. A link 250 is connected at the free end of lever 249 and also at its other end to a lever 251 pivoted at 252 at the upper end of an extending part 253 projecting from the end frame of bracket 133. This lever 251 has a cam engaging end 254, Fig. 5, which contacts certain cams 255 disposed about the circumference of a cam drum 256 arranged to rotate on the shaft 125 at the end of the machine. This lever, as the said toe portion rides on the cam, will draw the lever 249 against the tension of spring 257 and will swing the lever 249 in a direction to press the cam 239 against the inner edges of levers 216 to move them outwardly, and incidentally, to move their plungers to an inactive position. The lever 248 also has a link 258 connected to lever 259 also pivoted at 252 and having a similar toe 260 for engagement with cams 261 on drum 256. Likewise, this much of the mechanism will function to press cam 238 against the front side of the five lowermost levers 216 and will rock them in a direction to withdraw their plungers from any effective engagement with jack butts. The shaft 125 is rotating continuously and the cams 255 and 261 are so disposed about the drum as to impart the necessary withdrawing movement to the plungers.

Referring to Fig. 46, it will be seen that two similar levers 262 and 263 are attached to the upper end of spindles which affect the cams 246 and 247 respectively. Links 264 and 265 connect from the said levers to another set of levers 266 and 267 which are pivoted at the opposite side of the machine at 268 on an extension 269 from the end bracket 132. These levers are affected by cams 270 and 271 respectively. These cams are attached to a cam drum 272 similar to the drum 256, but rotatable with the opposite shaft 124.

At the back of the machine as shown in Figs. 4, 5 and 46, identical mechanism is provided working from cams 273 and 274 on a drum 275 at the opposite end of shaft 124; and at the opposite end of shaft 125, from cams 276 and 277 on a drum 278. No further description of these duplicated parts will be given herein.

Figure 1:
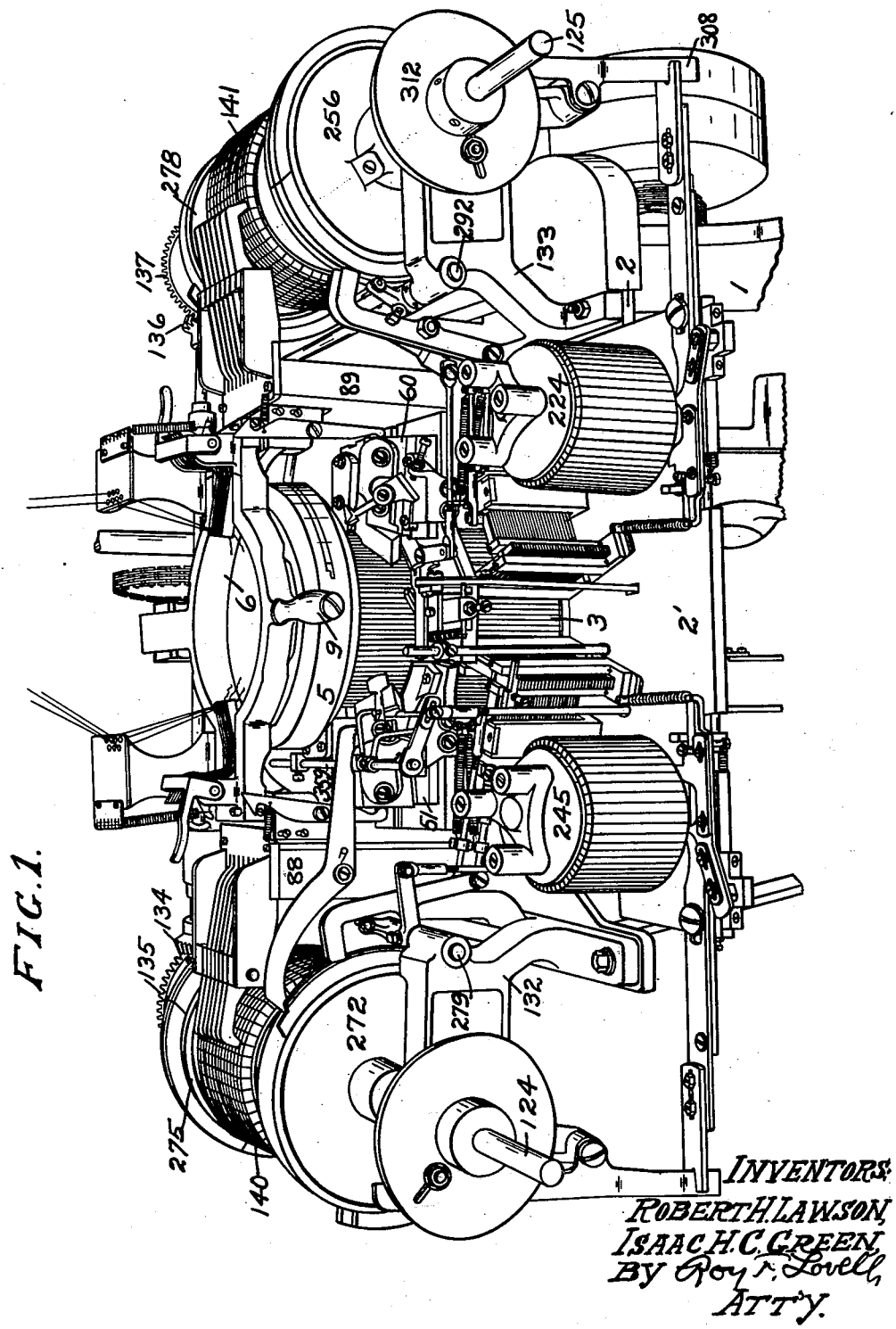
Fig. 1 is a perspective view of the main portion of the machine as seen from the front.
Figure 2:
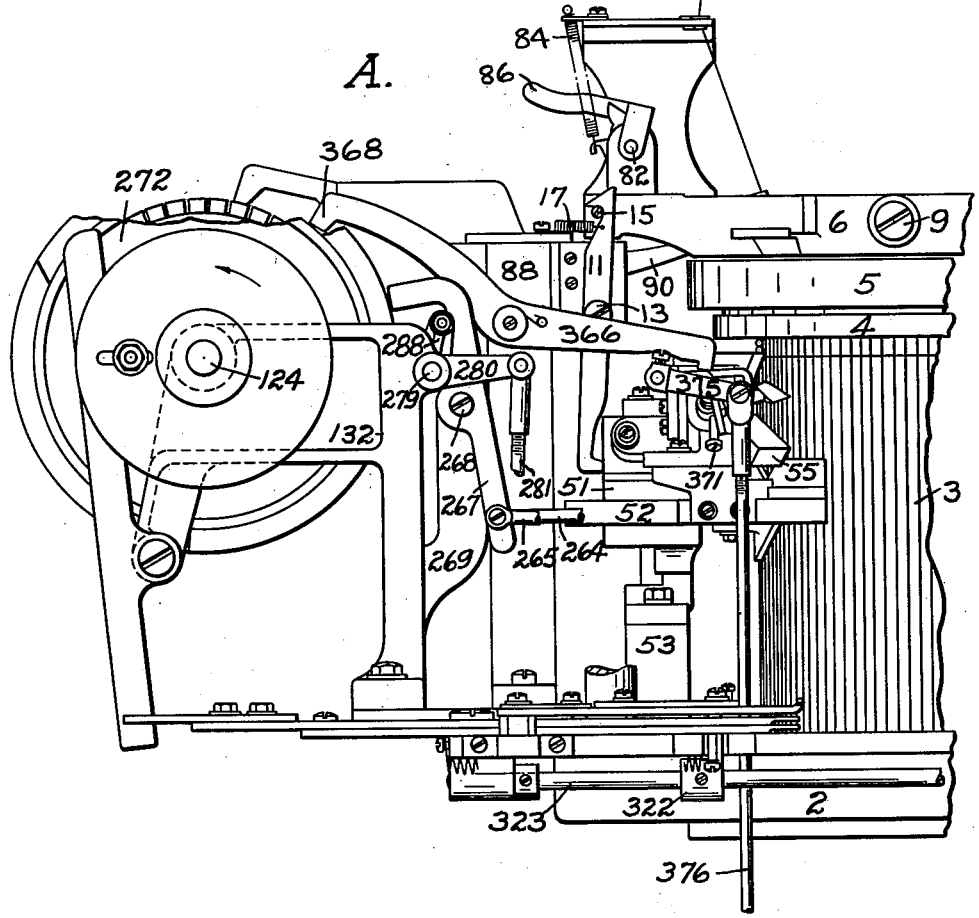
Figs. 2 and 3 are elevations showing opposite sides of the machine as viewed from the front thereof.

From what has been described above it will be evident that the cams 238 and 239 do not necessarily function at the same time, but, as a matter of fact, do control the upper and lower group of plungers separately. The same applies at the other three duplicate assemblies. It is desirable at certain times to remove all plungers simultaneously such as in the heel and toe, or at other unpatterned parts of the article knitted. To accomplish this a movement is taken from the drums on the main cam shaft and causes the withdrawal of all plungers together. Referring to Figs. 2 and 4, a spindle 279 supported in bearings at the inner side of brackets 130 and 132 has a lever 280 fixed adjacent bracket 132. A link 281 connects to the free end of this lever and extends downwardly to connect to the outer end of a lever 282, Fig. 6. This lever is pivoted to a lug 283 and connects at its opposite end to rod or bar 284 which is guided within the bracket 285 and is controlled by a series of cams 286, 286' on the drum 287 on the main cam shaft 97, Figs. 6 and 31. This spindle 279 also carries levers 288 and 289, Figs. 2 and 4, each of which has at its free end an inwardly projecting pin 290 and 291, respectively. These pins engage behind levers 266, 267 at the front and the corresponding levers at the back of the machine.

A similar spindle numbered 292 at the opposite side of the machine supports levers 293 and 294 which, by means of pins 295 and 296, will withdraw the levers at the back and front of this side of the machine. This second shaft is connected for operation with the first shaft by means of link 297 attached to an arm 298 on shaft 279 and a second arm 299 on the shaft 292. These arms 298 and 299 project in opposite directions so that the rotational movement of the second shaft will be in the opposite direction from that of the first. Whenever the rod or bar 284 rides up on cam 286, the mechanism just described serves to withdraw all of the plungers at each of the selecting stations.

Referring to Fig. 47, it can be seen that the pattern set-up on butts 188 is such that at one side of the middle long butt needle the first pattern butt is the fifth one. The middle long butt jack has butts 1 and 5, and the butts at the right thereof are butts 2, 3, 4 and then 6 on consecutive jacks. The purpose of this particular arrangement and the special control for the five butts at the bottom, is to make it possible to get the plungers in without interference with the butts which it is not desired to select at a particular time. For instance, any one of the first five plungers or all of them may be projected inwardly so as to engage the five lowermost butts without interference. This may be done by projecting these five plungers in at either side of the middle group of jacks which have these lowermost butts on them. The upper group of plungers may be projected inwardly at any point above these butts on the said middle group of jacks. This is necessary because the selection by the pattern drum occurs at one instant and at that instant as plungers were moved inwardly, some of them would probably interfere with butts which it was not desired to contact. With the present scheme each group of plungers may be selected but will not be allowed to move inwardly until the exact point is reached whereupon the control from the special cams on shafts 124 and 125 allows them to. This can be governed so as to avoid any improper interference. The same set-up prevails at the opposite side of the cylinder with respect to the short butt needle jacks. It is only necessary to have this special control down at the point of the V in the butt set-up where there is very little space.

Pattern drums and ratcheting means

Now referring to Figs. 2–5, 16–30 and 92–95, we will describe the pattern drums, the means for ratcheting those drums and the control for such ratcheting mechanism. There are two drums at the front of the machine, drum 224 at the right-hand side and drum 245 at the left. There are two corresponding drums at the back of the machine designated by numerals 300 and 301. Each of these drums and its operating mechanism is substantially the same so that a description of one will serve for all of them. The drum itself is similar to that employed on many Banner machines and is mounted for rotation upon the base of the machine, or a support projecting up from that base, and is frictionally held in position between ratcheting movements. The usual friction device 302 serves to maintain the drum in position as stated. At the bottom of the drum a ratchet wheel 303 is fixed to turn with the drum and has a number of ratchet teeth thereon equal to the number of butts 223 on one of the pattern discs. Movements of the ratchet wheel, a tooth at a time, will move the drum so that one butt will be moved past the toe of a lever 221 at each such single tooth movement. At times the drum is moved at twice that speed and the pawls engage double teeth at each stroke.

The ratchet wheel is moved by a pawl, or, more specifically, pawls 304 and 305. These pawls work together at times and separately at other times. The topmost one of the two, 304, extends outwardly and has an adjustable extension 306 which is slotted and attached by means of clamping screws 307. This extension also has a notch at its outer end which is engaged by the lower end of a lever 308 pivoted at 309 to a downwardly extending lug 310 on the end bracket 133 of the machine. This lever extends upwardly and is engaged by a roller 311 on a disc 312 at the end of shaft 125, Figs. 3 and 5. The roller 311 is adjustable radially of the disc as it may be moved inwardly or outwardly along the slot 313. This roller strikes the lever and incidentally will impart a ratcheting movement to the pawl every time shaft 125 rotates a single turn. The lower pawl 305 is attached by means of a screw 314 to the upper pawl and is free to pivot at that point. Each of the pawls has an elongated rectangular opening therein which loosely engages about a large headed screw 315 which serves to guide these pawls in a more or less general pathway, but does not prevent their movement away from the ratchet wheel at desired times.

The pawl 304 has a tooth engaging projection 316 while the lower pawl 305 has a similar projection 317. The said pawls are normally held in a position adjacent the ratchet wheel as shown in Fig. 20 by means of springs 318 and 319, the first of which connects to the inner end of pawl 304 and the other of which is connected to the lower pawl 305. Each of the springs is attached to a pin 320 fixed to the base of the machine.

At certain times it is desired to retime the mechanism, this being accomplished by withdrawing the lower pawl 305 to the position shown in Figs. 17 and 19. At that time only the upper pawl will be in engagement with the ratchet teeth and since two of the teeth on that ratchet are cut away at the upper half of the ratchet wheel, that pawl, when the projection 316 strikes said cut away portion as shown in Figs. 17 and 19, will be ineffective to advance the mechanism.

To accomplish this withdrawing of the lower pawl 305, we employ lever 321 and a corresponding lever 322 at the opposite end of the machine. These levers are fixed to a shaft 323 which is rotatable in bearings 324 and 325. Each of the levers 321 and 322 projects upwardly through an opening in the frame and is in a position to swing outwardly upon movement of shaft 323 and to engage a cam 326 which is built up at the inner end of the lower pawl. At this time the said lever 321 will thus move the lower pawl out of effective engagement with the ratchet wheel, but will not affect the upper one. At such time as it is desired to start ratcheting the pattern drums the lower pawl is allowed to return to operative position as the levers 321 and 322 are swung inwardly.

Now referring to Figs. 6 and 25, a lever 327 is fixed adjacent the center of shaft 323 and has a bar 328 pivoted to its inner end and extending downwardly through bracket 285 to contact with cams 441 and 442 on the cam drum 287. A spring 331 connects to the bracket and to a notch in the bar 328 to maintain the same downwardly and incidentally keep levers 321 and 322 from interference with the pawls except at such times as one of the cams on the drum imparts movement to them. The lower cam 442 is of a height sufficient to affect the lower pawl only.

At certain times it is desired to move both pawls outwardly so that ratcheting of the drums will be stopped. For this purpose a higher cam 441 will cause the levers to move the pawls to the position shown in Fig. 16. A spring 332 maintains or tends to maintain the pawls outwardly and the inward movement is against the tension of this spring as the roller 311 strikes the lever 308.

Referring to Figs. 3, 5 and especially 26—28, the control for the pawls is shown wherein movement is regulated to either one or two ratchet teeth. An arm 333 is pivoted at 334 on a boss 335 extending from the side of the base and has attached about half way along its length a plate 336 which carries two shoulders or steps 337 and 338. The outer end of this arm 333 is reduced in size and is retained inwardly by a tension spring 339 which is attached to the pin 320 before mentioned. This arm 333 also has a butt engaging toe or follower 340 which is arranged in position to engage with an extra pattern disc at the bottom of the drum. In Fig. 27 two butts on that disc are shown engaging said follower at which time the arm and plate are moved outwardly so that a stop pin 341 on the pawl 304 engages the outer shoulder 338. When said follower rides off these butts as in Fig. 26, that pin will stop against the inner shoulder 337. The arrangement of parts is such that in Fig. 27 the return strokes of the pawl would enable it to engage two ratchet teeth, but when striking the first shoulder as in Fig. 26 only one tooth would be engaged. Thus the bottom plate or disc on each drum can be arranged to control the ratcheting movement to determine whether or not it will move through single or double tooth spacing.

Each of the pawl assemblies is substantially identical with that just described and likewise, each may be controlled to engage single or double teeth on the ratchet wheel. At the back of the machine similar mechanism is provided for controlling the withdrawing of the pawls and the retiming of the drums. That will not be described in detail, but it should suffice to say that the same is controlled from the drum 287 by cams 342 and 343 which engage a lever 344 pivoted on the stud 345. At the other end of said lever a link or rod 346 projects upwardly to impart movements to a short lever on a shaft similar to the shaft 323.

In Figs. 22–24 one of the levers as 321 is shown in the three positions it may occupy. Fig. 22 shows the lever not affecting either pawl. Fig. 23 shows that lever affecting only the lower pawl for retiming; and, Fig. 24 shows the position in which both pawls have been moved to an ineffective position.

*Narrowing and widening picks and special control therefor*

Referring to Figs. 9, 33 and 43–45, narrowing picks are indicated at 347 and 348, these picks being mounted in the usual way on the main cam block. Each pick is adapted to lift a single needle out of action at a time and functions in the usual way during the knitting of the heel or toe of the stocking.

At certain times the front narrowing pick 348 is to be withdrawn as when going out of the heel or toe or transferring a rib top to the needles. This pick has a projecting pin 349 which is engaged by a lever 350 pivoted on the center cam 65. This lever has an offset link 351 attached to it, the other end of the lever being slotted and connected at 352 to one arm of bell crank lever 353. The other arm of this lever has a connection in the form of a wire 354 depending and attached to the outer end of lever 355 which in turn is affected by certain cams on the cam drum 96. A spring 356 attaches at the outer end of the horizontal arm of the bell crank lever and to a fixed part of the machine to maintain the mechanism in position wherein it does not affect this front pick. When the toe of lever 355 rides up on a cam on the drum, said pick will be withdrawn to a position wherein it will not be sufficiently close to the cylinder to interfere with any of the needle butts.

Widening picks 357 and 358 are mounted in the usual way at the auxiliary side. These picks are adapted to lower two needles at a time as is well known in the art. Special means is arranged to press against these picks and to withdraw them from action at predetermined intervals. A shaft 359 is rotatable in bearing lugs 360 and 361 and carries projecting fingers 362 and 363 having offset ends 364 and 365 which are disposed in a position to engage the shanks of said widening picks and to press downwardly against them. These fingers 362 and 363 are free to rotate on the shaft. Levers 366 and 367 have angularly bent projections 368 and 369 which contact the tops of the fingers 362 and 363 respectively. Now referring to Fig. 2, the lever 366 is shown pivoted on the yarn lever box 88 at that side of the machine and extending up to terminate at a cam engaging toe 368. This toe engages with the innermost cam or cams 369 on the drum 272. Likewise the lever 367 engages a cam 370 on the opposite side of the machine and on drum 275. Whenever these levers 366 and 367 are raised by the said cams 369 or 370 they function through the fingers 362 and 363 to push the widening picks downwardly and to swing them out of a position wherein they would affect any of the needle butts. Of course this happens once during every revolution of the shaft 124 on which drums 272 and 275 are mounted to rotate.

Each of the widening picks has a screw 371 or 372 projecting outwardly and downwardly. These screws are not different from the ordinary construction with respect to such picks. The shaft 359 has fixed thereto levers 373 and 374 which engage the screws 371 and 372, respectively. At the outer front end of the shaft a lever 375 is connected by means of a link 376 which passes downwardly through the circular base to be operated by a cam 377 on the drum 287, Figs. 6 and 31. Whenever the lower end of the link or rod 376 rides up on cam 377, the widening picks will be allowed to move upwardly to an active position. When not under the influence of cam 377, a spring will draw the lever 375 downwardly and the picks will be withdrawn. This latter mentioned control is for the usual purpose in such hosiery machines, while the special control from the drums on the shaft 124 functions during the knitting of pattern work to control the picks as they are affecting needles at that time.

*Needle raising cams and control therefor*

The cams 66 and 67 were described rather briefly in one of the preceding paragraphs. Those cams, one at the front and one at the back, work at times on long butt needles only and at other times on both long and short butts. During the knitting of the heel and toe each of these cams is projected inwardly to engage the long butt needles. The long butts, as before stated, are peculiar to the needles which knit in the heel and toe, and the construction is such that needles will not knit at cams 63 or 64 unless they are raised by one or the other of these cams 66, 67, or by the special jack control which functions during the knitting of patterned work only. At other times as when knitting in pattern work, the cams 66 and 67 do not need to be used and are withdrawn from operative relation with any needle butts. During the knitting of circular work, as in the ring top, etc., the front cam 66 is projected inwardly to raise all the needles over cam 64 so that they will knit under cam 63. Thus the control for these cams includes means to hold them both in an absolutely inactive position, other means to allow the front cam 66 to remain inwardly against the cylinder during rotary work, and still a third provision whereby during the knitting of the heel and toe these cams may be alternately moved in and out to engage long butts only during the reciprocatory movements of the cylinder.

Referring to Figs. 2, 3, 4, 5, 6, 9, 31, 32 and 33, the cam 66 may be held outwardly away from contact with any needle butts by means of a bell crank 378 having a pivot at 379, on an extension from the bracket 70. This bell crank has a downwardly extending part 380 which acts to withdraw the cam 66 against the tension of spring 377 by pulling outwardly against a pin 381. The bell crank lever is connected to a link 382 which extends downwardly at the front of the machine and bears upon certain cams on the cam drum 287. Whenever one of these cams lifts the link or rod 382, the cam 66 will be withdrawn to a completely inactive position. Such withdrawal takes place during the knitting of patterned work only.

A similar connection is available at the back of the machine for the cam 67 and functions from the lever 384, Fig. 31, which bears upon certain cams 385 on the same drum. These cams are adapted to withdraw cam 67 during both pattern knitting and also during knitting in the straight-a-way. The details of this mechanism at the back of the machine are not shown since they are substantially the same as have just been described with respect to the front cam.

During the knitting of a heel or toe, cams 66 and 67 are automatically moved in and out to engage long butt needles. On counterclockwise strokes cam 66 moves inwardly and on clockwise strokes, cam 67 moves in while the opposite cam moves out. This is all accomplished from a control derived from cams 386 and 387 on drums 256 and 278, respectively. These drums and cams are shown in Fig. 5 and are continuously rotated on shaft 125.

A lever 388 functions by means of the cam 386 and through a link 389 periodically to swing a lever 390 about a pivot 391. This lever 390 is in effect a bell crank lever with a pivoting extension 392 constituting one of its arms. This extension 392 pivots vertically about a pin and joint 393. Normally the extension 392 lies flat against the top of plate 71 and engages pin 73. These swinging movements will pull the cam 66 out every time the lever 388 is lifted by cam 386. As that lever rides off cam 386, the cam 66 will be allowed to project inwardly just far enough to engage long butt needles. The cam 66 when thus projected inwardly on counterclockwise strokes, will raise the heel and toe needles to engage and ride up cam 64 to clear their latches whereupon they will knit under cam 63. At the back side of the machine, cam 387 acts upon lever 394 and through link 395 will impart a similar movement to the bell crank lever 396 pivoted at 397. This lever acts on a pin 398 in the stem 69 of cam 67 and will withdraw that cam against the tension of spring 399. Cams 386 and 387 are substantially opposites, so that when cam 66 is in cam 67 is out and vice versa.

During the knitting of straight-a-way work cam 67 will be held outwardly in a completely inactive position but cam 66 must be allowed to move in against the cylinder and to engage all needle butts. Of course, it moves in on short butts and then will complete its inward movement as the long butts ride up it. The bell crank levers 390 and 396 are continuously functioning. They do not have any effect on the cams when they are held outwardly in absolute inactive position, but it is necessary to prevent contact of extension 392 with the pin 73 in order to maintain cam 66 inwardly for more than one stroke, or about a revolution of the machine. This is accomplished by mechanism functioning from cam 400, Fig. 31. This cam works on a bar 401 which passes upwardly at the front of the machine and supports an inwardly extending finger 402. This finger bears under the extension 392 and, as the cam 400 raises the bar 401, will lift that extension or swing it about pivot 393, until it has no effect on pin 73. The cam 386 may continuously actuate lever 390 but the cam 366 will at that time, be held inwardly against the cylinder so that all the needles will be raised for knitting through the main cam block. Of course, there is no need for duplicate mechanism at the back of the machine since rotary work takes place in a counterclockwise direction only.

*Means for pulling out cam blocks at transfer*

Now referring to Fig. 39, the main cam block 60 may be withdrawn in somewhat the usual fashion by mechanism presently to be described. A bell crank lever 403 pivoted at 404 to the yarn lever box at that side of the machine is connected by means of link 405 to the block itself. This connecting means at the block comprises a screw 406 and a slot 407 within the link through which the screw passes. A second lever 408 is pivoted on a suitable bracket 409 attached to the frame and one arm of this lever attaches by means of a connecting link 410 to the bell crank lever 403. The other end of this second mentioned lever carries a depending rod 411 which is in turn pivoted at its lower end to a second lever 412 pivoted to the frame and carrying a follower pin 413. This pin passes through an opening 414 in the frame and contacts a cam (not shown) fixed to the inner side of the main cam drum 96. During transfer this cam will function on the mechanism just described to withdraw the main cam block against the tension of a spring (not shown), a function not uncommon in such machines for knitting hosiery.

While it is not essential in all respects, the cam block may be pulled out without moving the center cam 65. As shown in Fig. 44, and other figures, this cam is slotted and is retained in place by means of screws passing through the slots and threaded through the block itself. A pin 65' is attached to the cam and also bears against the inner edge of yarn lever box 89 so that when the block is withdrawn the cam itself will be held inwardly by this pin 65'. The slots allow for the movement of the block without a corresponding movement of the cam. As the needles pass through they will be guided under the cam 65 and will be leveled so as to effect a better transfer. In certain instances it might be desirable to provide a separate cam for leveling needles although the present system is more convenient and involves less mechanism.

Now referring to Figs. 6, 31 and 32, the auxiliary cam block 51 is given a similar withdrawing movement by means of link 415, bell crank lever 416 and the depending rod or link 417. This depending rod connects to the outer end of a lever 418 pivoted at 120 and bearing upon a cam 419 on the drum 123 at the end of the shaft. In a similar manner, this mechanism withdraws the auxiliary block substantially simultaneously with the withdrawal of the main block.

*Plain sole mechanism*

Now referring to Figs. 31, 32 and 48 through 51, there is a special control at each of the selecting stations at the left hand side of the machine for controlling the knitting of a plain sole. Normally after the knitting of the heel, the foot would continue with the same pattern as was knitted throughout the leg. By the mechanism presently to be described it is possible to knit this pattern continuing down into the foot at the instep only, and to knit the sole plain of the same or a similar yarn as is knitted throughout the other plain portions.

At each of the selecting assemblies adjacent the auxiliary cam set, that is, the front and rear selecting assemblies at the left hand side of the machine, plain sole cams 420 and 421 are arranged to operate on the butts 189, Fig. 47, of the jacks. These plain sole cams function on the long butts 189 only, those butts being peculiar to needles which knit in the sole of the stocking only. The cam 420 has a stem 422 which is guided within the uppermost guideway provided in the supports for the selector plunger groups at that station. The end of this stem has an angularly projecting extension 423 by means of which the cam is pulled out to an inactive position. A plate 424 is bolted to the side of the outermost supporting post for the plungers and has a pivot 425 upon which a bell crank 426 is free to turn. This bell crank connects at 427 to a depending rod or link 428, and terminates in a sort of cam 429 at the other end. This cam 429, when the bell crank is rocked, will push against the projection 423 and move the cam 420 out away from the cylinder. A spring 430 connects to a projection extending out from the stem 422 and also to some fixed part of the assembly and tends to hold the cam inwardly. The rod or link 428 projects down through the circular base and an extension thereof is guided to function under the influence of certain cams on cam drum 287. Whenever the toe of the depending rod 428 or its extension is on the cam indicated at 431, the plain sole cam will be held outwardly; at other times it will be allowed to move in adjacent the cylinder and will function on the long butt jacks so that the needles which tend to be selected at that side of the machine (the auxiliary side), will not be selected because the jacks selected at the stations adjacent that side will have their selection immediately cancelled. In other words, just as soon as one of the jacks at that side of the machine is selected by any one of the plungers 195 or 198, the cams 120 or 121 will immediately move those jacks down before they would engage either of the cams 193 or 196 as the case may be. Since these cams work only on the long butt jacks, they will have no effect on the action and selection of jacks at the instep side.

The cam 421 has a similar stem 432 and is controlled in exactly the same way by means of a bell crank lever 433 and rod 434. This rod 434 is offset as shown in Fig. 48 and connects at its lower end to a lever 435, Figs. 31 and 48, this lever being controlled by a cam indicated at 436 on the drum. Cams 431 and 436 are substantially opposite since they must control the cams 420 and 421 to operate simultaneously. Of course, these cams may be employed to effect the knitting of plain portions at other than the sole of the stocking if desired. Suitable arrangement of cams 431 and 436 would accomplish this purpose.

*Cam details with respect to drums on main cam shaft*

Now referring to Figs. 6, 31, 32, 39, 43 and 52 through 66, we will describe the cams on the main cam shaft, and, in a general way, their function. The main cam shaft rotates one revolution throughout the knitting of a complete stocking as is the usual practice. The drum 96, Figs. 39, 43 and 64 has cams 107 and 107', one of which controls the withdrawal of yarn fingers during the knitting of the heel and the other of which performs a similar function during the knitting of the toe. This withdrawal of yarn fingers at the main side includes all fingers except that which feeds the heel and toe yarn. The cam 107' incidentally controls this withdrawal of fingers during the knitting of the ring toe, loopers rounds and the ring top as well as during the knitting of the toe.

The next adjacent group of cams designated by numerals 100, 100' and 100'' controls the yarn lever that feeds the yarn for knitting the ring top, heel, ring toe, toe and loopers rounds. The said lever drops into place during the knitting of the parts of the stocking just enumerated and is withdrawn at all other times.

The third group of cams on that drum function to withdraw the front narrowing picks 348 during transfer and at other desired times. These cams are designated by numerals 437, 438 and 439. The other cams generally designated by numeral 440 serve the usual purpose of switching the machine from rotary to reciprocatory knitting and vice versa. Their function is so well known that no more need to be said in this case.

Now referring to Figs. 6, 31, 32 and 52–63 and 65, the drum 287 will be considered with respect to the cams thereon. Beginning at the inner end, Fig. 52, the first row of cams includes the cams 343 and 342, the first of which controls the pawls at the back of the machine during the knitting going into the heel and the second of which controls those pawls in the retiming during the ring toe and toe through the ring top so that the pattern drums at the back of the machine will be properly timed at the beginning of knitting in the leg and at the start in the foot after the heel.

Now referring to Fig. 55, the sixth row of cams includes the cams 441 and 442 which function to perform the same duties at the front of the machine as the first row of cams, Fig. 52, does at the back of the machine. Referring to Fig. 62, the cam 436 functions as previously described, to control the cam 421 for knitting a plain sole. A cam having a similar function is illustrated in Fig. 63, this cam being designated by numeral 431. This cam controls the withdrawal of a plain sole cam 420 at the front of the machine. It will be noted that the cam 431 is the complement of the cam 436. This is because one of the controlling mechanisms is reversed by the addition of a lever at its lower end while the other rod coming down from the selecting assembly at the front part of the machine works directly upon the cam itself. Thus one is moved in by the cam itself while the other is held outwardly by the cam. However, both are in at the same time.

The third row of cams, Fig. 53, functions to move the so-called heel and toe cam 67 at the rear of the machine into position during the knitting of the heel and thereafter the toe. The cam functioning during the knitting of the heel is designated at 385 while the opposite cam 385' allows that cam 67 to be moved inwardly when knitting the toe.

The next row of cams, Fig. 54, includes those for moving the front heel and toe cam 66 to and from its various positions. These cams are of two heights since, as it will be remembered, this front cam works during the knitting of the heel and toe and also during the straight-a-way knitting. The higher parts of these cams 445 and 446 function to allow cam 66 to move out to an inactive position during the knitting of the leg and foot, respectively. When the follower for the depending link or bar 382 is not bearing on any of these cams, the machine will be in the straight-a-way as in the ring top, and again throughout the ring toe and loopers rounds. The parts of the cams indicated at 447 and 448 retain the cam 66 in mid-position for knitting the heel and toe respectively. The other parts of the cam 449 and 450 functions during the projecting of the cam inwardly and removing it to engage as far as the short butts and thereafter the long butts, and vice versa.

In Fig. 56, the row of cams including the cams 400 and 400' operate on the rod 401 to raise pivoted extension 392, Fig. 9, for the purpose described. Cam 400 works during the loopers rounds and throughout the ring top; cam 400' performs the same function during ring toe knitting.

In Fig. 57, the cams 286 and 286' function to withdraw all the plungers, this withdrawal of plungers was described with respect to the spindles 279 and 292, Figs. 2, 3, 4 and 5. The cam 286 would withdraw all these plungers during the knitting of the ring toe throughout the ring top while cam 286' performs a similar function while knitting the heel. In other words, these cams withdraw all plungers except during the knitting of the leg and foot which are the only parts patterned.

Now referring to Fig. 58, cams 377 and 377' act upon the mechanism which controls the widening picks. These cams hold the widening picks out of operation except during the knitting of the heel and toe.

In Fig. 59, cams 122 and 122' function through the lever 119 and the connection 118 to raise all of the levers at the auxiliary side. Cam 122 works in the heel while the cam 122' performs a similar function during the knitting of the ring toe, toe, loopers rounds and ring top.

The single cam 419, Fig. 60, works upon the lever 418 and withdraws the auxiliary cam block whenever the machine is in position for transfer of the rib top to the needles.

The cam 165, Fig. 61 is the last cam on drum 123, Figs. 6, 31, 32 and 66, and this cam operates to move the drum 140 endwise on the shaft 124, Fig. 10. This drum might have more cams, or cams differently disposed depending upon the pattern that is to be knitted, this will be expressed more fully with respect to the operation of the machine.

*Yarn lever controlling drums*

Referring to Figs. 2, 3, 4, 5, 10, 11 and 67 through 73, the set-up of pattern butts on the drums 140 and 141 will be explained. In the first figures none of the butts on these drums were shown broken away, but of course, there must be a set-up in accordance with the pattern to be knitted. Each of the shafts 124 and 125 rotates a complete turn every time the needle cylinder makes a stroke of one and one-half turns in one direction. In the particular example herein shown by way of illustration and which will be discussed later with respect to the operation, all of the yarn feeding fingers are not being used. At the auxiliary side four fingers are being used while at the main side only three fingers are in use. At the auxiliary side the four fingers feed the colored yarns which go to make up the pattern, or which may be termed the solid colors. In the particular example shown two fingers will feed a yarn of one color while the other two fingers will feed yarns of a color different from that fed by the first mentioned fingers. At the main side of the machine two guides each feed a yarn of the same color one of these yarns being fed at one side of the stocking and the other at the opposite side and forming solid colors in between the solid color yarns knitted at the auxiliary side. These might be termed the base yarns while the yarns at the auxiliary side are the patterning yarns. At this side the other finger feeds the yarn which is knitted in the heel, toe and other unpatterned part of the stocking.

The drum 140 carries fourteen separate pattern discs, all of which might be used with some particular patterns, but in this instance, eight only of the said discs are employed. As before stated, the levers which bear on these discs are spaced to bear upon or engage butts on every other disc at one time. The movement endwise on the shaft makes it possible to use first one group of four discs in the total of eight discs being employed, and at other times, to use the remaining four. The discs being used are numbered 451 through 458 inclusive. In one situation the odd numbered discs would be working on the four fingers which were feeding yarns; in the opposite position, the even numbered discs would be controlling the movements of the yarn fingers. In Figs. 68–70, the discs which have butts broken away are shown. Note that the end discs 451 and 458 which are being used do not have any butts broken away. The reason for this is that at no one time are there more than three fingers actually being used although in the opposite position of the drum, it is a different finger that is being retired. In one position the disc 451 will maintain that finger out of active position continuously while in the opposite position, the disc 458 will move the finger at the opposite end of the group out of operative relation to any of the needles.

The reason for this endwise movement of the drum on the shaft is that a pattern of one solid color being knitted at the front, for example, will be knitted throughout a complete figure at that position and then will be knitted at the back or opposite part of the stocking. At the same time the other solid color being knitted would be knitted first at the back and then at the front. The control of yarn guiding fingers, therefore, must be varied at the completion of each figure. This set-up requires the remaining discs in use to be duplicated throughout each pair, there being six discs, each pair of which are identical.

The discs in the sixth and seventh rows numbered 452 and 453 are shown in Fig. 68, or rather, one of them is shown. The discs 454 and 455 correspond to that shown in Fig. 69. The remaining discs 456 and 457 are formed as shown in Fig. 70.

Each time the shaft 124 rotates, that is, during each stroke of reciprocation, the yarn guides controlled by discs 452 and 453 will drop into position for almost one-half a revolution of the drum or during the interval in which no butts are present on the discs. There are two positions of the drum when the yarn guides controlled by discs 454 and 455 are dropped in, these positions will be shown in Fig. 69. Fig. 70 shows the set-up on discs 456 and 457 from which it can be seen that the yarn guides controlled at that position will drop in for a similar period of time to that mentioned with respect to the first pair of discs 452 and 453, but at the opposite side of the drum, that is, when one is in the other is out and vice versa. With respect to the operation, this functioning of the yarn levers will be described more fully.

Now referring to Figs. 71–73, the main drum has three special discs. This drum, although it has provision for being moved endwise on the shaft, is not necessarily so moved with the particular pattern which we are going to describe herein. For some patterns the drum would have to be moved endwise and obviously can be.

The disc 459 is entirely blank. This disc is in alignment with the lever which feeds yarn throughout the heel and toe etc., and of course, that lever has been described as being completely controlled from the main cam drum. Two other discs 460 and 461 shown in Figs. 72 and 73, respectively, are substantially opposites and control the yarn levers which feed the so-called base yarn at the main-side of the machine. If the drum at the main side were to be moved endwise, the discs 459, 460 and 461 would have to be duplicated as was done with respect to discs on the drum at the other side.

*Details of cams for withdrawing selecting plungers, controlling widening picks, and heel and toe cams*

Now referring to Figs. 2, 3, 4, 5 and 74–91 we will describe in detail the cams before mentioned in a general way, which function on the shafts 124 and 125 for controlling certain elements and functions of the machine. Now referring to Figs. 4 and 74–77, the cams 270, 271 and 369 are shown in their exact proportions and also in the relative positions which they occupy on the drum. All these Figures 74–91 are taken with respect to a definite position of the machine and of the shafts 124 and 125. In Fig. 82 the disc at the front end of the shaft is shown in the position which it occupies while the cams 270, 271 and 369 are in the positions illustrated in Figs. 74–77. The positions shown in Figs. 2–5 do not necessarily correspond to those shown in Figs. 74–91.

In Figs. 78–81 the positions and extent of cams 276, 277 and 387 are shown. In Fig. 82 the disc at the front of shaft 124 has been shown in the position occupied while the cams at the front left and at the rear left of the machine are in the positions shown in Figs. 74–77 and 87–90. In Fig. 91 the front disc on shaft 125 is shown in the position that shaft occupies and necessarily the position occupied while the cams at the front right and rear right are in the positions illustrated in Figs. 78–81 and 83 and 86. The cams have all been illustrated in detail, but it will not be attempted to describe them further since it is believed their function is quite apparent from the illustrations and from what has been said here and in the previous parts of the description.

Pattern selecting drums

Drums 245 and 300 function at the auxiliary and at the main sides of the machines respectively, during clockwise strokes, to select jacks for the patterning. Drums 224 and 301 function at the main and auxiliary sides respectively, during counterclockwise strokes for the same purpose. Each of these drums has thirty-two discs, thirty-one of them being employed for selecting purposes while the lowermost disc in each instance is employed to control the ratcheting as previously described. That is, in the positions wherein butts are broken away on these lowermost discs the pattern drum will be ratcheted throughout single teeth and at other times some drum will be ratcheted two teeth at a time. There are twenty-seven ratcheting movements to be imparted to each of the drums in the particular pattern hereinafter to be described. To obtain this, there are six single tooth moves and twenty-one double tooth moves. Whatever pattern is desired may be knitted up to a maximum obtained by the total number of butts on each disc in which case single tooth movements would be employed throughout, down to any minimum desired. Of course different numbers of butts on the discs and different numbers of discs may be employed to increase the scope of the machine. If the number of moves desired to obtain the pattern is not equal to the maximum number obtained by single tooth movements or equal to the maximum obtained by double tooth movements, it is necessary as herein shown, to split them up into some single and some double tooth movements. In this case that number happens to be twenty-seven. No attempt will be made to explain just how the entire pattern is controlled by the particular set-up of butts on these drums. Of course, it is sufficient to say that the pattern is controlled by the drums and that other patterns may be produced by simple changes in the number and disposal of butts within the drum, all of this being within the power of the knitter to accomplish.

Take-up mechanism

In Figs. 98 and 99 we have shown the take-up devices which are employed. These are mounted on a post 462. A bracket 463 supports a shaft 464 upon which are free to pivot a series of arms 465 each of which has the usual eyelet through which its yarn is threaded. Springs 466 connect at the opposite end of each take-up arm to move them into uppermost position. Each of the yarns is threaded through an eyelet 467, then through a second eyelet 468 and between a binder comprising the block 469 and cooperating clamp 470 at the end of a lever pivoted at 471. Each of these levers may be lifted in the usual way as the take-up arm is pulled downwardly and will release the yarn being clamped thereby. In the usual way the yarn is threaded through an eyelet 472, then through the eyelet 473 in the end of the take-up arm and downwardly through other eyelet 474, thence to the yarn feeding levers at the needles.

In the particular instance herein shown no special control is available for these take-ups. Each yarn has a take-up so that there are four take-ups employed at the auxiliary side and three at the main side of the machine.

Modified form of pattern drum using a chain

Now referring to Figs. 100–106, we will describe a modified form of mechanism to be employed in place of the pattern drums on the shafts 124 and 125 for controlling yarn feeding levers. The size of drum shown in those figures is sufficient for certain patterns; it is sufficient for the pattern herein illustrated and described by way of example, but at times it may be desired to knit certain fabrics wherein there will be desired at one or both sides of the machine, more changes then may be provided with the pattern drums unless they are to be of an unusually large diameter. For these reasons we employ a chain at either one or both sides of the machine. The chain is more compact and more easily constructed than an unusually large pattern drum would be.

In Fig. 100 the same bracket 132 at the left hand side of the machine is shown supporting the shaft 124 upon which has been mounted a drum comprising a hub 475 and a rim 476. The hub of this drum is slidable upon a sleeve 477 in the same way the drum 140 was capable of sliding. Two flanges 478 and 479 are attached at either end of the drum to complete the assembly and guide a plurality of pattern chains generally indicated at 480. By the usual mechanism working against a collar 481 the drum is capable of being shifted endwise along the shaft for the same purpose described with respect to the pattern drum 140. There are the same number of chains to be driven by this drum as there were pattern discs in the first form of the invention disclosed. Of course, only part of these chains are used at one time, and for pattern purposes, a shift is made to different sets of chains at other times. The rim 476 is provided with teeth 482 which engage indentations 483 within the links 484 of the pattern chain.

A similar drum or pulley generally indicated at 485 is freely rotatable on a spindle 486 which is fixed at the outer end of two arms 487 and 488. These arms are in turn pivoted at 489 to a pair of bearing lugs attached to a fixed part of the framework of the machine. The drum 485 merely acts as a loose pulley about which the chain passes and by means of which it is tensioned or retained in proper working position. This drum has no sprocket teeth as in the first instance. It is of sufficient length so that the chain may shift from one side to the other upon movements endwise of the shaft 124, as above described.

In Figs. 104–106 one of the links of the chain is shown, these links comprising two opposite parts indicated at 490 and 491 which are connected together by any suitable means as by electric welding. The links have the indentations 483 for receiving the teeth of the sprocket and also each end which overlaps the other portion has a hole 491 through which is projected a rivet or other connection whereby the adjacent links are attached. Each of the parts 490 and 491 has continuing along its entire length the pattern controlling portions 492 which may be cut or broken away in any satisfactory manner so as to form high or low parts along the chain for the actuation of the lever controlling means. These parts are cut out in accordance with any pattern desired. As can be seen, one of these chains is of such length that different patterning movements may be imparted to the yarn feeding levers in subsequent strokes of the needle cylinder. The only other way this could be accomplished would be to increase the size of the pattern drum as illustrated in Figs. 2–5 and to vary the speed at which the shafts 124 and/or 125 were to be rotated.

It is not necessary to employ a full length of chain at all times, or at both sides of the machine. For instance, a chain such as shown in Fig. 100 might be used at one side of the machine while a drum at the other side should suffice. In Figs. 102 and 103 we have shown a drum exactly like that illustrated in Figs. 100 and 101, but wherein a series of links 484 are circumscribed about the drum rather than having a series of pattern discs thereon. The links are merely connected together about the drum to take the place of said discs. In such instances the loose drum or pulley 485 would not need to be used.

Operation

Now referring to Figs. 107–154 inclusive and others, we will describe rather briefly the operation of the machine as it functions to knit the characteristic parts of a stocking or half-hose. In Figs. 107, 108 and 109 a typical half-hose is illustrated having the rib top 493, ring top 494, leg 495, heel 496, foot 497, ring toe 498 and toe 499. Naturally the toe will terminate in the ordinary loopers rounds (not shown). The rib top is to be knitted on any of the usual rib top knitting machines, or produced in any other desired way to be transferred to the needles of this machine. The ring top is knitted at the main side of the machine from a yarn which may or may not be used for knitting the ring toe and loopers rounds as well as the heel and toe. For simplicity, we will assume that the same yarn is knitted throughout these portions of the stocking. The ring top will be knitted during straight-a-way or rotary work. At the completion of the ring top the machine will start its reciprocatory knitting and all of the pattern mechanism will come into play. During these reciprocations one of the needles, the center needle in the long butt group, will knit two separate yarns and thus twice as many loops as other needles. This will result in a suture 500 which will have the appearance of a seam up the back of the stocking. During this solid pattern knitting, there will be two yarns fed at the main side. These yarns will knit what we would term the basic color and will form the diamonds or partial diamonds at the side of the stocking. In the example herein shown and described we will consider these diamonds knitted from the basic yarns to be gray in color. Beginning at the top of the stocking we knit a black diamond at the front indicated at B and a red diamond R at the back. These diamonds will be equal in size to the gray diamonds knitting at the side, that is, will extend about the article for half its circumference.

After the completion of one black and one red diamond at the front and back respectively, the colors will be alternated to appear as red at the front and black at the back of the stocking. This alternation is repeated throughout the length of the leg and the foot of the stocking and it is for this reason, that it becomes essential at the auxiliary side at which these red and black colored yarns are knitted, to move the pattern drum endwise of the shaft so as to first control the yarn levers or lever feeding the black yarn to knit at the front and thereafter at the back and vice versa with respect to the yarn levers feeding the red yarn or yarns. At the instep the knitting of the pattern is suspended during the formation of a heel, and after that heel has been completed, it is again taken up without interruption. The gray diamond knitted at the point of the heel will be somewhat distorted as illustrated in Fig. 107, but will in fact be a true diamond having the same number and disposal of loops as the others. This diamond will preferably although not necessarily be knitted to its mid-position or its widest point just as the heel is started so that the heel will be formed at the central portion of said patterned area.

Throughout the foot we may knit the pattern just as in the leg, although it is quite possible by the mechanism disclosed to continue the pattern throughout the instep but to knit the gray yarn only throughout all the rest of the article to produce a plain colored sole. At the termination of knitting the solid pattern throughout the foot a ring toe is knitted in very much the usual way at the main side of the machine and thereafter, the usual toe pocket and loopers rounds. The gray yarns, two in number are also fed at the main side of the machine along with the other yarn which knits in the heel and toe, etc. Of course these three yarns do not knit at one time at the main side except for short intervals such as are necessary for an overlap to prevent eyelets.

In Figs. 110, 111, 112 and 113, we have shown sections of the fabric at the front and at the back wherein the solid colored areas are illustrated. It will be noted that at the front of the stocking the solid colored patterns are produced by the knitting of either the red or black yarn throughout the entire half of the front of the stocking. At the back these yarns appear showing the same color at either side of the seam or suture 500, but for that half of the stocking separate yarns are used. These yarns must be matched in color so that the two reds or the two blacks as the case may be, will give the appearance of a solid colored area knitted from a single yarn. Thus it becomes necessary to feed two black yarns and two red yarns at the auxiliary side. Of course when one color is knitted in the front, one of the yarn feeding levers through which that colored yarn is threaded will be maintained out of action. When feeding at the back, both of these colors will necessarily be fed into the fabric, although not at the same time. Two gray yarns or base yarns are to be fed at the main side, but they do not feed to the needles at the same time. All this will be explained more fully with respect to the showing of the fabric and the operation of the machine as illustrated in the diagrammatic views.

Ring top

After the rib top 493 has been transferred to the needles, a few rounds of circular knitting intervene to knit the usual ring top 494 before starting pattern work in the leg. We do not show this knitting in any of the diagrammatic views since only a single yarn is fed, that yarn being fed from the same guide or finger employed to feed throughout the heel, toe, etc. Referring to Fig. 71, the lever feeding this yarn will not be controlled by one of the discs on drum 141 at the right side of the machine since the disc 459 is blank. That finger will be controlled by cams on the main cam drum 96, Figs. 39 and 64. During this knitting the cams 107, etc. on the main cam drum will function to withdraw all the other yarn guides at that side while at the opposite side of the machine, cam 122', Fig. 59, will withdraw all the yarn levers at that side.

Referring to Fig. 96 the knitting would occur at the main side while the auxiliary block was withdrawn and the cam 66 at the front of the machine will be in place to elevate all the needles so that they would rise over cam 63 and knit under cam 64. Cam 66 would be controlled by those cams shown in Fig. 54, the controlling element acting thereon having fallen off cam 448 and bearing on the drum at this time. The cam 67 would be held out of action at this time since its operating mechanism would be resting on the drum, Fig. 53. At the termination of this ring top the yarn will be withdrawn and one of the yarns at the main side will be introduced so that there will be a slight overlap as in the usual practice. At substantially the same time the colored yarns at the other side, auxiliary side, will be allowed to come into action, although they will be under the control of the cams on cam drum 140 so that although there is the capability of them being fed, they will not be taken by the needles except as governed by cam drum 140, and of course, selected needles only will be raised to take the colored yarns. This will be explained more fully in the following paragraphs.

Knitting the pattern throughout the leg

During the knitting preceding the start in the leg the plungers were not affecting selecting jacks at all. These plungers were being held out of action by means of certain cams shown in Fig. 57. Of course the auxiliary cam block will be brought back into operative position as the cam 419, Fig. 60, ceases to control the withdrawing means for the block. Cams 342 and 442, Figs. 52 and 55 have retimed the pattern mechanism so that when cam 286, Fig. 57, releases the plungers, the entire pattern means will be in proper position to start in the knitting of a pattern. At this time it will be assumed that a black diamond is to be started at the front of the stocking and a red diamond at the back of the stocking. These diamonds will start at a point and will be widened until they meet at the sides, then will be narrowed back to a point. Obviously the gray color at the sides will fill in the diamond shaped openings left between those black and red areas so that while the black and red are widening, the gray will be narrowing and vice versa.

At the right hand side, drum 141 will control the gray yarns, the yarn feeding levers at that side being under the influence of the discs 460 and 461, Fig. 71. At the other side, the drum 140 will be moved to that side which will withdraw one of the yarn levers feeding a black yarn. The yarns are threaded as shown in Fig. 124. The lever 501 feeds the first black yarn 501', lever 502 then feeds a red yarn 502' while the next lever 503 feeds a second black 503' and the end lever 504 feeds a second red yarn 504'. Obviously the drum 140 will be moved to the back of the machine so that the disc will hold yarn lever 501 continuously in raised position. The other yarn levers 502, 503 and 504 will then be under the control of discs 453, 455 and 457, respectively. These discs will impart to those levers the necessary movements so that they will feed the yarns at the proper time.

Of course the start in this patterned area occurs at the end of rotary knitting and in Fig. 114, we have shown the first position of needles and levers as the first clockwise stroke is started. These strokes take up about one and one-half turns of the cylinder in each direction, although that may be varied to suit the particular case. The yarns are shown in Fig. 114 as though they had been knitted for a time and not as though this were the start of the pattern. This is for purposes of clearness and simplicity and should not make any real difference to a general understanding of what is going on during the knitting of the pattern. As will be seen from this figure two gray yarns are being fed from levers 505 and 506 at the main side and two red yarns from levers 502 and 504 at the auxiliary side, while the black is to be fed by lever 503. At the start of the first black diamond at the front a single needle will take the black yarn, likewise at the rear of the stocking a single needle will knit red yarn, although, that needle being the middle long butt needle, as before stated, will knit twice in the seam 500 and so will knit both red yarns. It is to be understood that thereafter, at one side of the seam one red yarn will be knitted while at the other side the other red yarn will be knitted. Both yarns will be knitted throughout the seam. At this time it is appropriate to explain rather briefly what is being shown in Figs. 110 and 112. The knitting progresses from the bottom towards the top in these figures although it is to be understood that they represent the beginning of the diamond after knitting in the ring top and that the actual disposal of the fabric depends upon point of view. In Fig. 110 the courses are marked by arrows indicating the direction in which they are knitted and the first courses 507 and 508 are the last courses knitted in the straight-a-way. We have designated the course 509 as the first one knitted on a reciprocatory stroke or at the first clockwise movement of the needle. In that course one gray yarn is shown at the right and is indicated by the numeral 510; the other gray yarn is indicated by numeral 511 and is knitted at the left, Fig. 110. To distinguish these two yarns the shading or cross-hatching in one is heavier than in the other, although it is to be understood that the colors will actually match as nearly as possible. In this course at 509 the middle short butt needle knitting in the wale 512 will knit three loops, first, one of the gray yarn 510, then a loop of black yarn and then a second gray yarn 511. Of course, the gray yarns are knitted at the main side and the black yarn at the auxiliary side.

Now turning to Fig. 112 in which the start of the red diamond is shown, the last course 508 is shown preceding the first course 509 which, as the arrows indicate, is knitted in a clockwise direction. The gray yarns are shown at the side of the suture 500 which is knitted on the central long butt needle. Hereinafter we will designate the side of the fabric at the left of this suture as $a$ and that at the right as $b$. This same designation is used in Fig. 110, but it will be noted that the sides are apparently reversed although when we consider these patterns as imposed upon the fabric of Fig. 107, it can be seen that the showing is correct.

For purposes of indentification, the red yarn in Fig. 112 has been shown as unshaded at the left of the suture and as completely shaded at the right of that suture. It is to be understood that this entire figure is of red, or of some single color, and the diamond or other figure in the fabric would appear as a single area of a solid color. The colors are indicated by the letters B, R and G so that no confusion should result. In this course 509 the suture needle knits first of the red yarn, then at the main side knitting the gray yarn 510 and at the same time, taking the other gray yarn 511 which is introduced at that point, and thereafter at the auxiliary side, taking the other red yarn. To summarize what has happened on the first stroke we list the steps as follows:

1. Red yarn at suture at auxiliary side.
2. Gray on all needles at the side *a* at main side.
3. Black on middle short butt needle at auxiliary side.
4. Gray on all needles at side *b* at main side.
5. Red on middle long butt needle at auxiliary side.

Note that when the gray is knitted as in #2 and #4, above, that it knits through the suture needle at the end of the stroke in #2 and at the beginning of the stroke in #4. At the wale 512 the black knits through a loop at the beginning of group *a* and is then knitted through by a loop of gray at end of group *b*.

It will be noted that in the preceding paragraphs we describe the knitting at the front of the stocking and then at the back, however, the actual sequence of steps is correctly given in the summary in each instance.

In following through the fabric at the course 509 these loops may be identified, although it is not considered necessary to designate each separate loop or to go to further detail with respect to the knitting of this course. Obviously, the selecting means are operating, the drum 245 selecting a single needle in each group for knitting the red and black at the side A, while the drum 300 selects all needles for knitting the gray yarns at the main side of the machine.

Now referring to the next course which we shall designate as the course 513 and which is knitted in a counter-clockwise direction, the opposite selecting devices will come into play, that is, the drums 224 at the main and 301 at the auxiliary side. As was previously described, these pairs of drums work together and the cams on the shafts 124 and 125 serve alternately to withdraw the plungers which are not being used. Of course, the racking of the drums continues periodically so that while widening, more needles are continuously being selected at the auxiliary side while needles are being withdrawn from action at the main side. The knitting of the black yarn at the front takes place as one single group of needles passes the auxiliary knitting station, but at the suture side, the red yarn will be knitted first at the side *b* and then at the side *a* in clockwise strokes, and then in the opposite sequence during counterclockwise strokes.

Referring to Fig. 110, two needles, one on either side of the middle short butt needle knitting the wale 512, will be raised for taking the black yarn. These needles will also take the gray yarn on this stroke since the selection for the gray yarn pattern operates at practically one needle behind the selection for knitting the red and black colors. In other words, while one needle has been added at either side of the center for taking the black yarn those same needles have not been withdrawn by the selection at the main side insofar as taking the gray yarn is concerned. This merely means that those needles will knit at both sides and will take both colors. This is not peculiar to the course 513 but progresses right straight through the fabric.

At the back of the fabric the red is knitted first on one needle at the left of the suture wale and at the suture wale, Fig. 112. The same needle knitting in what we will call wale 514 also takes both gray yarns in that course. Then the suture needle knits again from the opposite red yarn and in company with a second needle knitting in wale 515 or on the side *b* with respect to the suture. This last needle also knits the gray yarn at the side *b*. Summing up the steps on this counterclockwise stroke as before, we have:

1. Red on suture needle and first needle at side *a* at auxiliary side.
2. Gray on all needles except middle long butt and middle short butt to knit side *b* at main station.
3. Black on middle short butt needle and needles at either side thereof at auxiliary side.
4. Gray on all needles except middle long butt and middle short butt to knit side *a* at main station.
5. Red at auxiliary side on suture needle and adjacent needle at side *b*.

On the next stroke which is in the clockwise direction, the black knits on five needles as indicated at course 516, Fig. 110. The gray knits on one needle less at either end of the group knitting that color at both sides *a* and *b*.

At the back of the stocking, Fig. 112, this course 516 is shown having one additional red loop knitted at either side, although the same general scheme prevails as did in the previous course 513. Each red yarn knits once on the needle knitting wale 500. The following is a summary of the steps in this clockwise stroke, the same selecting means being in operation as in the first clockwise stroke:

1. Red on middle long butt and two adjacent needles at side *b* at auxiliary side.
2. Gray on all needles at side *a* except middle long butts and middle short butt plus one adjacent needle at the main side.
3. Black on middle short butt and two adjoining needles at either side thereof at auxiliary side.
4. Gray on same number of needles as at 2, supra, but at side *b*.
5. Red on middle long butt and two adjacent needles at side *a* at auxiliary side.

During the following courses needles are added at the front and back to widen the diamonds just as in the three cocurses explained. Likewise needles are dropped out from the groups knitting *a* and *b* to form the gray at the sides. It is not believed necessary to make further statements with respect to the widening of these patterned areas.

Referring to Figs. 114–123 which show successive steps in a clockwise direction, Fig. 114 shows the start of the stroke. It will be noted that the several yarns float across the needle circle and that they become entangled to some extent. However, these yarns do not entangle to the point where there is any undue interference and the machine functions during reciprocatory work without any trouble resulting from the usual number of floats and the unusually long stroke which the cylinder makes. In Fig. 114 all those yarns being knitted are shown; in Fig. 124 all the yarns are shown, although it is to be understood that the yarn indicated at 517 which is the heel and toe yarn is not shown at the other views merely for purposes of simplifying the showing. Likewise in Fig. 114, the black yarn being fed from lever 501 is not illustrated. It is to be understood though, that all of these yarns are being floated or knitted at all times, there being no binder and cutter necessary to the machine. Of course, a binder and cutter might be used whereupon some of the yarns would be severed and held thus avoiding some of the floats. Figs. 114 and 124 show the maximum of entanglements or interference since they show opposite extremes in the needle cylinder movement. At the mid-point of the stocking all the floats were straightened out and that point marked a sort of neutral position insofar as the movement of these floats across the cylinder is concerned.

In Fig. 115 the cylinder has moved so that the needle 518 which is the middle long butt needle and which knits wale 500 has progressed around and is taking the red yarn fed by the lever 504.

In Fig. 116 the elements have progressed until a group of needles 518 to 519 have taken that red yarn whereupon it is withdrawn. At the opposite side the gray yarn 510 is about to be taken by a group of needles which are to knit at the side a.

In the next Fig. 117, the gray yarn is being knitted at the side a while none of the yarns is being knitted in the patterned areas of red or black.

Figure 118:
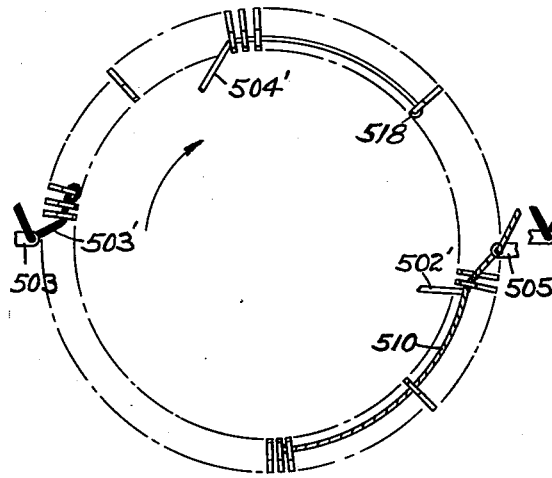

In Fig. 118 the gray yarn 510 which has knitted upon its group is to be withdrawn and the black yarn at the auxiliary side which is fed by lever 503 is just being taken by the group of needless which are knitting that color at the front of the stocking. Of course, this black yarn is being knitted over the complete group of needles which knits it in this course.

Figure 119:
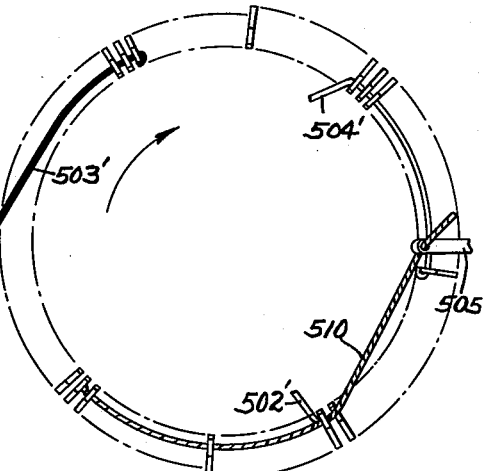

In Fig. 119 that black yarn is still knitting at the auxiliary side while none of the yarns is knitting at the main side.

Figure 120:
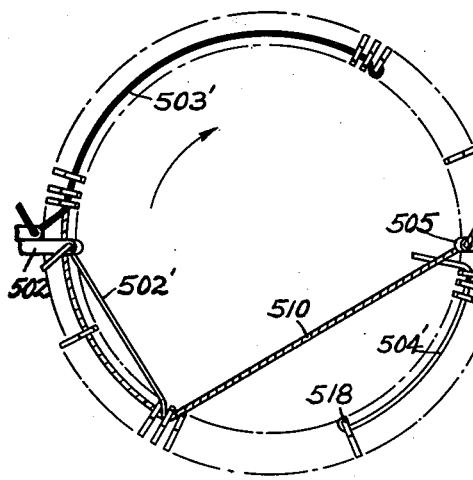

In Fig. 120 the black yarn has ceased to knit after knitting over the requisite distance and at the main side, the other gray yarn 511 has been thrown in to knit the gray diamond at b.

Figure 121:
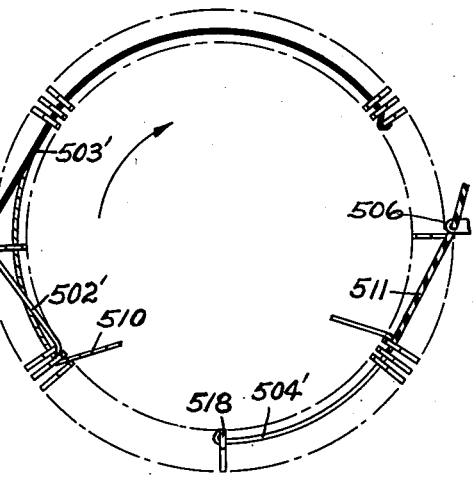

In Fig. 121 that yarn 511 is shown having been knit for some distance while none of the yarns are knitted at the opposite side.

Figure 122:
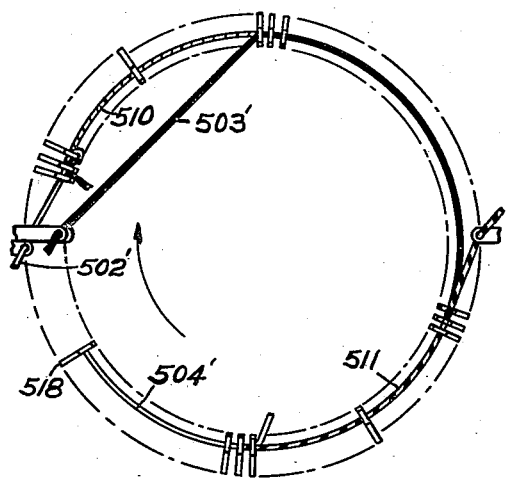

In Fig. 122 that gray yarn 511 is to be withdrawn while the other yarn which is fed by yarn lever 502 is about to be introduced and will knit the remainder of the red from and including the needle at that end of the group to wale 500. This knits the side opposite from that which was knitted from the first red yarn fed by the finger or lever 504, Figs. 114, 115 and 116.

Figure 123:
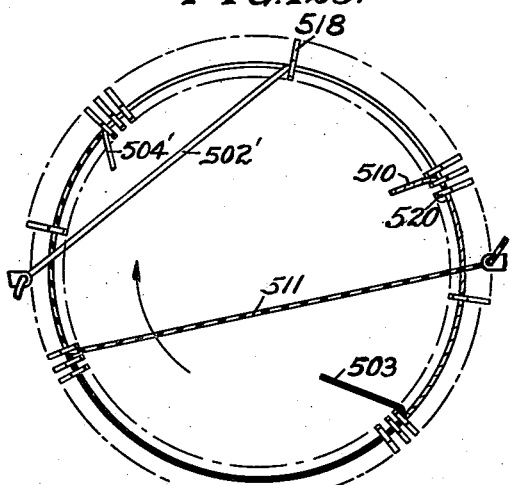

In Fig. 123 the parts are shown at the end of this clockwise stroke, that second red yarn having been knitted from needle 520 to middle long butt needle 518, this completing the course. What has just been described with respect to these figures takes place on all clockwise strokes of knitting, although it is evident that the groups of needles taking their respective colored yarns are constantly changing during the narrowing and widening of figures. In some figures it might not be necessary to narrow and widen, or at least not to narrow and widen at all times. The selection would be arranged accordingly and in the event vertical lines of separation were to mark the juncture between figures, a suture might by knitted merely be selecting one needle alternately at one side and then the other.

Referring to Figs. 124–133, similar diagrammatic views show knitting in the counterclockwise direction. The needle 518 is shown at the end of the previous clockkwise stroke which, of course, corresponds to the beginning of the counterclockwise stroke. No knitting takes place throughout the distance moved in Figs. 125 and 126, although in Fig. 126 the needle 518 is approaching the yarn lever 502 and will start to knit the red yarn fed at that lever. Thus it may be seen that the last red yarn knitted on the preceding course will be the first one knitted on the following.

Figure 127:
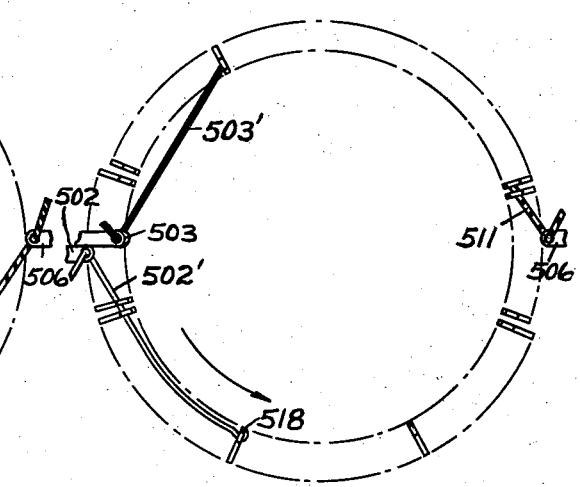
Figure 128:
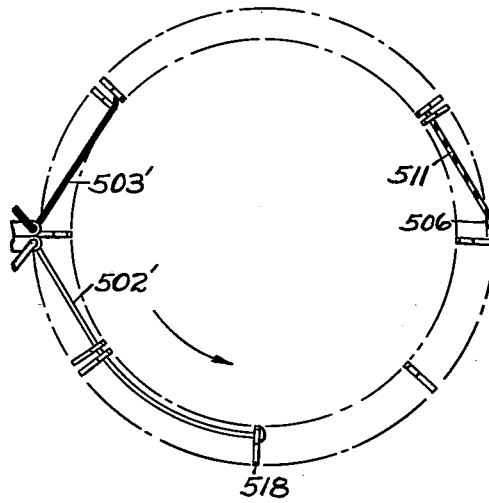
Figure 129:
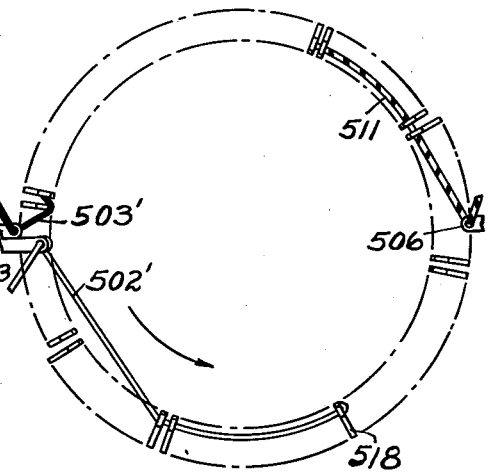

In Fig. 127 that needle 518 has taken the red yarn just mentioned and that portion of the figure will have been completed. The gray yarn 511 which was the last one knitted on the previous stroke will also be the first one knitted on this stroke and is shown starting to knit in this figure. Continuing through Figures 128 and 129, the gray yarn has been knitted for a considerable distance and is to be withdrawn while the first needle to take the black yarn is approaching the yarn guide 503 at the auxiliary side of the machine. The red is being withdrawn.

Figure 130:
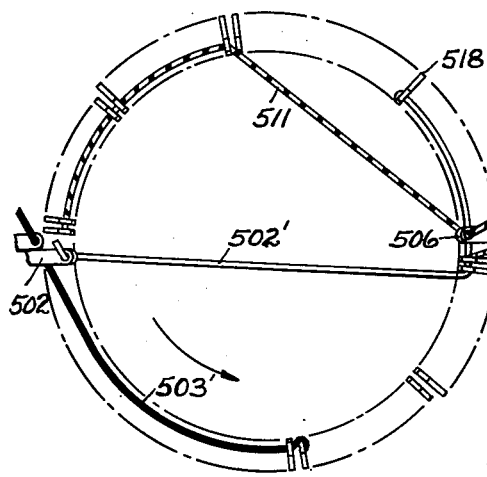

In Fig. 130 the first mentioned gray yarn has ceased to knit while the black yarn has knitted over a considerable distance. The opposite gray yarn 510 is starting to knit at the side a, and at the main side of the machine.

Figure 131:
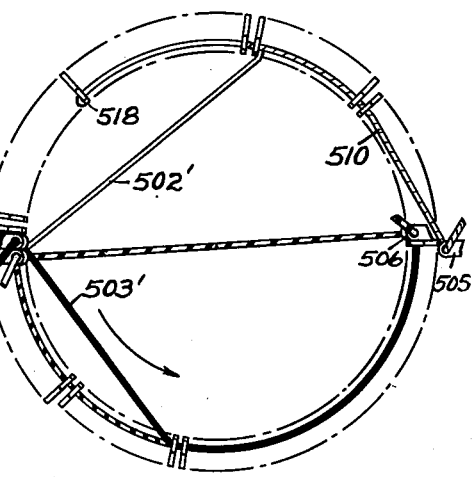

In the next Fig. 131 that gray yarn 510 is still knitting, the black yarn has ceased to be fed and the opposite red yarn fed from the finger 504 has been introduced and is started to knit.

Figure 132:
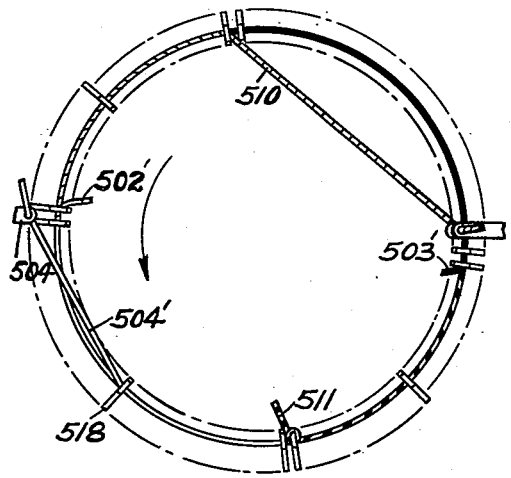
Figure 133:
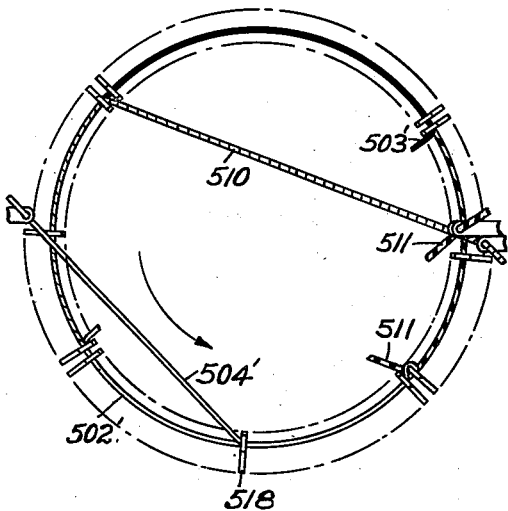

In Fig. 132 that red yarn is to be withdrawn as the gray yarn 510 has been. The cylinder is merely completing its stroke and the extreme position of that stroke is illustrated in Fig. 133.

Now referring to Figs. 111 and 113, we have shown sections of the fabric showing the narrowing of a black and a red area to the extreme point thereof. The steps in this narrowing are practically the reverse of the steps in widening, that is, the selecting devices continue to function on the jacks and the needles to withdraw needles at the front and back and to add them at the sides. The yarn feeding levers still continue to function as before under the influence of the cam drum and the different colored yarns will be knitted throughout the necessary distances to make up the figure. In the actual rabric the disposal of floats is slightly different from that during widening, although this merely results in the fabric from the operation of the machine as described. The illustrations are true representations of the fabric at these points and apparently are self-explanatory.

After the knitting of the black diamond at the front and a red one at the back of the fabric the same may be repeated or as illustrated herein, the position of these diamonds may be switched so that red occurs at the front and the black at the back. It merely becomes necessary to move the drum 140 endwise of the shaft 124 so that a different set of pattern discs becomes effective on the yarn levers at the side A. At that time the lever 504 feeding the red yarn will be removed to an inactive position by disc 458, Figs. 124 and 67, while the remaining yarn levers 501, 502 and 503 will be controlled by the discs 452, 454 and 456, respectively. The result will be that the red yarn fed from lever 502 will be controlled and will be fed to the same group of needles as the black yarn from lever 503 was in the previous instance. The two black yarns fed from levers 501 and 503 will be knitted at the back of the fabric just as the red yarns were in the previous illustration.

*Heel and toe—narrowing*

Referring to Figs. 134–154, we will describe the knitting of the heel and/or toe. These parts are knitted on the long butt needles and are narrowed and widened in very much the usual fashion. The short butt needles which retain the instep loops pass through the main cam block but do not rise over the knitting cams so that this is more or less an idle movement. During this heel and toe knitting the cams 66 and 67 are projected inwardly during alternate strokes by the mechanism heretofore described, but this inward projection is only to an extent sufficient for contacting long butts. Both the heel and toe are knitted on about one-half the needles according to the present set-up, but it is to be understood that we may knit these parts on more or less than one-half the needles, and that narrowing and widening may take place at the usual rate or at other rates depending upon the control for the narrowing and widening picks.

Figure 134:
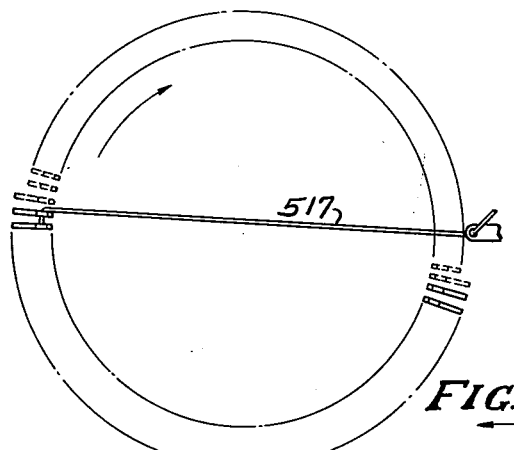
Figure 135:
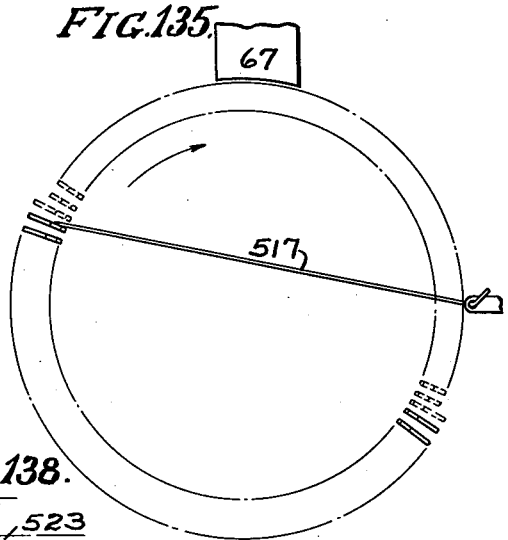

In Figs. 134-139 clockwise strokes are shown and the narrowing action is illustrated along with the path of needle butts in Figs. 138 and 139. In Fig. 134 the first of the long butt needles has been picked up on each side. Fig. 135 shows about the position of the cylinder at the time the cam 67 is projected inwardly. As the long butt needles pass this cam they will be raised to a position to engage the back stitch cam 63. As these needle butts approach the cam 67 in the pathway 521, the long butts ride up the cam to a pathway 522 in which the leading needle in the group will contact the pick 347. As is shown in this Fig. 139, one needle has been raised previously and is in the elevated path 523. The pick 347 will immediately raise this second needle to that upper pathway. The remaining long butt needles will pass through the cams and will knit under stitch cam 64.

The short butt needles continue in the pathway 521 and pass under both stitch cams in their inactive position during knitting.

The extent of the stroke of the cylinder is so great that this group of long butt needles would actually pass through the main cam block twice on each stroke. However, these needles do not knit twice nor do they contact the narrowing picks twice since the cam 67 will be withdrawn at a point after it has raised all the needles necessary and prior to their approaching the second time.

Now referring to Figs. 140-144, the opposite stroke in the counterclockwise direction is illustrated. During this stroke cam 67 is withdrawn while cam 66 is projected in to raise the long butt needles from a pathway 524 to the pathway 525 whereupon they will contact the pick 348 so that the leading long butt needles will be raised to the inactive pathway 523. One needle has already been picked up to that elevation, and on this stroke, a second needle would be picked up. Likewise the short butts continue down under cams 64 and 63 merely retaining the instep loops. The long butts which have not been picked up continue down under cams 65 and 63 to knit. In the same way cam 66 is withdrawn after the long butts knit once so that they pass through the cam block idly on continuance of the stroke.

Heel and toe—widening

Now referring to Figs. 145-154, we will describe the widening during the knitting of a heel or toe. Of course, the narrowing picks continue to lift a single long butt needle to the inactive group on each stroke of knitting. The widening picks will move into position at the termination of narrowing and will move two of these needles down for every one that is picked up. The Figs. 145-149 show this widening during clockwise strokes. As shown in Figs. 145-148 narrowing has continued down to a narrow group of needles at the center of the heel or toe.

Upon the start of this movement the group of long butts in the pathway 823 will contact the widening pick 357 which will move the first two of these long butts down to the pathway 521 whereupon they will continue up the cam 67 to knit. The leading needle of the lower group will be lifted back up to the pathway 523 by the narrowing pick 347. The short butts will pass through without knitting and the long butts will knit at the cam 64 previously described. It has been explained how cam 67 is withdrawn so that the long butts do not knit twice nor encounter the narrowing picks twice, however, if the widening picks were to remain in position, the raised long butts in path 523 would engage them again on the same stroke. To avoid this, special control from the drums on shaft 124 acts to withdraw these picks periodically as has been explained with respect to the mechanism involved in preceding parts of the disclosure.

In Figs. 150-154 the opposite stroke of widening is illustrated and substantially the same thing is happening in that stroke as happens with respect to the clockwise stroke just described.

At the end of the widening, since after one of the picks brings down the last two butts the narrowing picks will again raise a single butt, it would be impossible with the mechanism thus far described to keep this single long butt down. In order to accomplish this the front narrowing pick is withdrawn so that on the first stroke after finishing the heel or the toe the long butts will not contact said pick to be raised. This assures that all needles lowered by the widening pick will remain down. Reference is hereby made to Figs. 43, 44 and 45 and the description relative thereto wherein the mechanism for controlling this pick has been shown and described.

In certain cases it may be desirable to control both the front and back narrowing pick as when knitting tuck stitches, and the invention contemplates duplicating the control so as to withdraw both of these picks at will. In such event, no harm will be done in withdrawing both picks even though the front pick only had to be withdrawn for assuring that all needles return to knitting position.

This duplicate mechanism is illustrated to an extent in the Figs. 43, 44 and 45 wherein similar parts are indicated by similar numerals having primes. The control for these picks may be from the same cam or cams or may be separate. Preferably, the control will be connected up to the same initial means so that both picks are pulled out at once. There is no harm in pulling out the back pick even though it is only necessary during transfer to pull out the front pick. During knitting in some reciprocatory work as while knitting in plain sole it is necessary to withdraw both of the picks.

Plain sole

Although the stocking illustrated in Fig. 107 has the same pattern scheme throughout the foot as in the leg, it is quite possible to knit that pattern in the instep only and to make a plain sole. For this purpose the mechanism shown in Figs. 48-51 and 97 may be used so that the selection at the auxiliary side will be modified to an extent which allows patterning in the instep but not throughout the sole. Cams 420, 421 are to be projected inwardly and will engage the long butts on jacks at the level 189 so that any selection of those jacks by the plungers will immediately be cancelled before said selection has any effect on the needles. This means that all the long butts will never take the pattern threads fed at the auxiliary side, but will knit continuously at the main side of the machine.

Summary

This invention has been described with respect to one embodiment of the same in a machine and the operation has been illustrated with respect to one simple type of pattern merely for purposes of disclosure. It is to be understood that many patterns can be knitted depending upon the set-up of the various pattern controlling elements on the machine. All of the cams and all of the pattern discs on the various drums may be altered by those skilled in the art to produce different effects without departing from the scope of the invention. It is quite possible to feed more yarns at the auxiliary side so that the patterned areas which we have described here as being black and red and being confined to those colors may be knitted alternately of two colors appearing in adjacent courses. This will give a striped effect within the figures. One other common system of ornamentation lies in the possibility of knitting tuck stitches at certain areas. This has the effect of producing lines of a single color within the patterned area which might be comprised of alternate courses of two colors. These lines may be caused to run diagonally or vertically as desired.

One further scheme of ornamentation is that of feeding still another color to needles along the edges of the patterned areas, or at other places, to produce single needle lines, these being preferably diagonally arranged in the diamond formations to give the effect of single color border or dividing lines within the areas such as might be produced by wrap. In fact, it is contemplated to use a true wrap if desired, and to produce other patterns within the solid color areas themselves.

Other modifications may appear to those skilled in the art without departing from the scope of the original invention and it is the intent to cover such in this case and the claims. The invention is defined in the appended claims.

It is claimed:

1. A method of knitting in a circular knitting machine including the relative reciprocation of a needle cylinder through an extent sufficient to knit three or more yarns individually within a stroke and to interknit the terminal loops of courses drawn at each stroke thereby to form a suture.

2. A method of reciprocatorily knitting a tubular fabric in a circular knitting machine including the feeding and knitting of at least three yarns by different groups of needles, said different groups of needles being selected and said yarns being so fed that each needle group knits one only of the yarns.

3. A method of reciprocatorily knitting a tubular fabric in a circular knitting machine including the feeding of at least three yarns to be knitted by different groups of needles at a single stroke, said different groups of needles being selected and the yarns so fed that each group knits a single yarn, and further, wherein the terminal needles of a group connect the yarns knitted by the respective groups of needles.

4. A method of knitting in a circular knitting machine including the reciprocation of a series of needles and the feeding of a plurality of yarns to be knitted by separate selected groups of needles, joining the ends of fabric knitted in reciprocatory strokes by a suture knitted of the terminal loops of one of said groups, so selecting needles and feeding yarns that one only of the yarns will feed over a group of needles and that each group will interknit at its terminal loops to form sutures between the respective areas knitted on said groups.

5. A method as defined in claim 4, wherein said sutures between groups will be knitted along diagonal lines.

6. A method of knitting tubular fabric in a circular knitting machine including the reciprocation of a group of needles and feeding of at least three yarns throughout said reciprocations and selectively acting upon feeding means for feeding yarns to effect the feeding and withdrawing of yarns so as to knit single yarns on groups of needles.

7. In a circular knitting machine the combination of a needle bed, needles, and means for feeding yarns to said needles at a plurality of knitting stations, means for reciprocating said bed and needles so that terminal loops of each reciprocatory course may be interknitted to form a common suture, and other means for rotating said bed and needles so as to knit rotary work at other times.

8. In a circular knitting machine the combination of a needle bed, needles, two feeding stations, and means for reciprocating said bed and needles so as to knit reciprocatory courses, the terminal loops of which will be interknitted to form a common connecting suture, pattern means at each of the feeding stations for periodically varying the feeding of the yarns within each course.

9. In a circular knitting machine the combination of needles, means for feeding a plurality of yarns and means for reciprocating them relative to a said means for feeding a plurality of yarns to knit a tubular fabric, pattern mechanism for actuating said yarn feeding means to cause a plurality of yarn changes within a single course.

10. In a circular knitting machine the combination of needles, means for feeding a plurality of yarns and means for reciprocating them with respect to said means for feeding a plurality of yarns at each of two feeding stations to knit a split-work, tubular fabric, pattern devices at each feeding station for causing the feeding and withdrawing of several yarns within a single course.

11. In a circular knitting machine for knitting tubular fabric yarn feeding means and pattern mechanism functioning thereon, said pattern mechanism being constructed and arranged for varying the position of all yarn feeding means to and from active position at least once during each course, and other means for rendering said pattern means ineffective over a plurality of courses.

12. In a circular knitting machine for knitting tubular fabric the combination of yarn feeding means, pattern mechanism for the separate control of each yarn feeding means constructed and arranged to vary the position of all means twice during each course of knitting and other means for rendering said pattern mechanism ineffective over a plurality of courses.

13. In a circular knitting machine the combination of a plurality of yarn feeding levers, pattern devices for selectively moving said yarn levers a plurality of times during each course, and means for varying the effect of said pattern mechanism to alter the sequence in which said levers will be varied as to position.

14. In a circular knitting machine yarn feeding means including a plurality of yarn feeding levers, a pattern drum and means for rotating said drum one turn for each course to be knitted, pattern means on said drum operable on a cooperating finger, and means for shifting the position of said drum so as selectively to bring this pattern means into and out of effective engagement with said levers.

15. In a circular knitting machine yarn feeding means including a plurality of yarn feeding levers, a pattern mechanism including separate pattern elements, at least one for each of the said levers, and means for rotating said pattern means throughout a complete cycle for each course of knitting.

16. In a circular knitting machine, yarn feeding means including a plurality of yarn feeding levers, a pattern drum, means on said drum including two separate pattern devices for each of said levers, means for rotating said pattern drum and other means for moving said drum endwise to determine which one of the pattern means for each lever shall at that time affect the movement of said lever.

17. In a circular knitting machine, two feeding stations, a plurality of feeding means at each station and pattern control mechanism at each station for varying the positions of said feeding means throughout a complete cycle during each course of knitting.

18. In a circular knitting machine, a feeding station, a plurality of knitting instrumentalities and means for reciprocating them in alternate directions past said feeding station, means at said feeding station for feeding yarns at selected groups of said knitting instrumentalities and for changing said yarn within a knitted course, selecting means at either side of said station operable to select the instrumentalities first in one direction and then in the opposite direction.

19. In a circular knitting machine the combination of a feeding station, knitting instrumentalities and means for reciprocating said instrumentalities to and fro past said station, means at said feeding station for feeding yarns at selected groups of said knitting instrumentalities and for changing said yarns within a knitted course, selected means at either side of said station each of which is operable for selecting instrumentalities passing in one direction only.

20. In a circular knitting machine the combination of a feeding station, a plurality of instrumentalities and means for reciprocating them to and fro past said station, means at said feeding station for feeding yarns at selected groups of said knitting instrumentalities and for changing said yarns within a knitted course, selecting devices at either side of said station and means for withdrawing one of said devices at such times as instrumentalities pass in a direction in which it is not desired to impart any selections to the said instrumentalities.

21. In a circular knitting machine the combination of a plurality of feeding stations, instrumentalities for knitting and means for reciprocating them to and fro past said knitting stations, selecting means at both stations, one of which is operable at a station to select instrumentalities approaching that station, and means for rendering inactive diagonally opposite selecting means to avoid interference as said instrumentalities pass in a direction in which it is not desired to impart selections.

22. In a circular knitting machine the combination of a plurality of feeding stations, knitting instrumentalities and means for reciprocating them to and fro through said feeding stations, selecting means at each feeding station including a plurality of selecting plungers, pattern means for varying the position of said plungers and other means for withdrawing plungers in one direction of reciprocation.

23. In a circular knitting machine the combination of a feeding station, knitting instrumentalities and means for reciprocating them past said feeding station, yarn feeding means at said station and pattern controlled devices for varying the position of said feeding means to control the knitting of a plurality of yarns at a single course, selecting means at either side of said station constructed and arranged to impart selecting movements to said instrumentalities, one such means being effective in each stroke of knitting only.

24. In a circular knitting machine the combination of a series of knitting instrumentalities, means for positioning these instrumentalities to receive a rib top transferred thereto and means for thereafter knitting a ring top by rotary knitting, and means for immediately knitting by split work a patterned portion of fabric wherein several yarns are knitted separately on different groups of needles in each course.

25. In a circular knitting machine the combination of knitting instrumentalities, means for positioning said instrumentalities to receive a rib top transferred thereto, means for knitting a ring top in continuation of said rib top by rotary knitting and thereafter, means for reciprocating said instrumentalities to knit a solid colored patterned portion wherein three or more yarns are fed singly to groups of needles throughout each course of knitting.

26. In a circular knitting machine the combination of knitting instrumentalities, means for positioning said instrumentalities to receive a rib top transferred thereto, means for knitting a ring top in continuation of said rib top by rotary knitting and thereafter, means for reciprocating said instrumentalities to knit a solid colored, patterned portion wherein three or more yarns are fed singly to groups of needles throughout each course of knitting, and pattern means for varying the groups of needles which are to receive said yarns fed separately within each solid colored area.

27. In a circular knitting machine the combination of knitting instrumentalities, a feeding station and means for reciprocating said instrumentalities through said feeding station, said means reciprocating the instrumentalities so that some of them pass through said station twice on each stroke, narrowing and widening picks, and means functioning to move said widening picks from a position in which they would engage instrumentalities upon the second passage of any of the said instrumentalities through the feeding station.

28. In a circular knitting machine the combination of a feeding station and knitting instrumentalities, butts on said instrumentalities, means for reciprocating instrumentalities through said feeding station, picks at said feeding station for engaging butts and moving instrumentalities from one pathway to another, the construction being such that certain instrumentalities pass through the feeding station more than once on every stroke of knitting, means operable upon said picks to withdraw them from butt engaging position prior to the time when any of the butts approach said picks a second time.

29. In a circular knitting machine the combination of knitting instrumentalities, a cam block with cams including a center cam, said center cam being relatively movable with respect to said block, means for withdrawing the block and other means restraining said center cam so that when the block is withdrawn the center cam remains in active position.

30. In a circular knitting machine the combination of a feeding station, instrumentalities and means for reciprocating said instrumentalities through said station to knit fabric, picks so arranged at said station as to engage butts of instrumentalities passing through at an elevation of said picks and means for withdrawing said picks for a period of partial revolution of the instrumentalities only.

31. In a circular knitting machine the combination of a feeding station, means for feeding yarn at that station, knitting instrumentalities and means for reciprocating the instrumentalities relatively to said feeding station to knit yarn, cams at said station so arranged that needles normally pass beneath them, other cams, one at either side of said station, positively movable to and from butt engaging position for raising instrumentalities so that they will engage said knitting cams at an elevation which will allow them to rise above said cams.

32. In a circular knitting machine the combination of a feeding station, means for feeding yarn, knitting instrumentalities and means for reciprocating said instrumentalities through said feeding station, butts on said instrumentalities, the construction being such that said butts would normally pass beneath cams at said feeding station, movable cams, one at either side of said station, and pattern controlled means for projecting said cams alternately in and out on consecutive strokes of knitting so as to raise certain needle butts to an elevation for passing over said cams.

33. In a circular knitting machine the combination of a feeding station, cams at said station, knitting instrumentalities and means for reciprocating said instrumentalities through said station, butts on said instrumentalities, one group having long butts and another group having short butts, the construction being such that at normal conditions said butts would pass beneath said cams, movable cams at either side of said station and means for moving either of the cams to a position for engaging long butts and other means for moving one of the cams to a position for engaging butts of both lengths.

34. In a circular knitting machine the combination of a yarn feeding station, knitting instrumentalities and means for reciprocating said instrumentalities to pass through said knitting station, butts on said instrumentalities, one group having long butts and the other group having short butts, the construction being such that butts would normally pass beneath cams at said knitting station, movable cams at either side of said knitting station and pattern controlled mechanism functioning on said cams alternately to move them to a position to engage long butts only on consecutive strokes of knitting in a reciprocatory manner, and other means for moving one of said cams to a position for engaging butts of all lengths during rotary knitting.

35. In a circular knitting machine the combination of a yarn feeding station, knitting instrumentalities and means for reciprocating said instrumentalities to and fro past said station, selecting means at either side of said station for selecting certain of said instrumentalities to knit thereat, other means functioning with said selecting means to nullify the selection as to some or all of the instrumentalities.

36. In a circular knitting machine the combination of a series of knitting instrumentalities, long butts on one group of said instrumentalities and short butts on the other, means for reciprocating said instrumentalities to and fro past a yarn feeding station, means for controlling long butt instrumentalities only for the knitting of a heel and toe pocket, said means being so constructed that short butt instrumentalities remain at a low elevation and pass beneath cams at said feeding station, picks for periodically moving long butt needles to a raised position wherein they will be temporarily inactive and other picks for returning said long butt needles to the active knitting group.

37. In a circular knitting machine the combination of knitting instrumentalities having a plurality of selecting butts thereon, pattern means including plungers for the engagement of these butts, the construction being such that all plungers may not be moved in at the same time without undesired engagement between plungers and some of the selecting butts, and means for controlling said plungers so that groups of them are moved into position at different times.

38. In a circular knitting machine the combination of knitting instrumentalities having a plurality of selecting butts thereon, pattern controlled means for engagement with said butts, the construction being such that said pattern controlled means may not be projected to butt engaging position at one time without improper interference with certain of said selecting butts, and means functioning to control the inward projection of said engaging means so as to move to butt engaging position first one group of said means and thereafter another group.

39. In a circular knitting machine the combination of knitting instrumentalities having a plurality of removable selecting butts thereon, said butts being arranged according to some predetermined pattern formation, means for engaging said butts thereby to move the instrumentalities for selecting purposes, said means having pattern controlling elements functioning thereon for changing their position so as periodically to vary the pattern knitted, other means for controlling the inward movement of the butt engaging means after the selective movements have been imparted so that one group moves to butt engaging position in advance of the other.

40. In a circular knitting machine the combination of knitting instrumentalities having a plurality of selecting butts thereon, said butts being arranged in accordance with a predetermined pattern, movable plungers for engagement with said butts, levers for moving said plungers, a pattern drum having pattern determining formations thereon for engaging said lever thereby selectively to control said plungers, cam means functioning upon one group of levers and separate cam means functioning upon another group of levers for controlling their inward projection to engage butts after selections have been determined by said pattern drum, and means for controlling said cam means so that the respective groups of plungers move inwardly at different times.

41. In a circular knitting machine the combination of knitting instrumentalities having selecting butts thereon, selecting means including butt engaging elements and pattern determining means for periodically altering the position of said elements, other means for functioning on said elements to withdraw them from butt engaging position and means for returning them to position, said last mentioned means being separately timed so that different groups of elements move to butt engaging position at different times.

42. Mechanism as defined in claim 41, wherein additional means is provided for retaining said selecting elements in an inoperative position over a plurality of courses.

43. In a circular knitting machine the combination of a cylinder, knitting instrumentalities associated with said cylinder, a plurality of yarn feeding levers at each of two feeding stations, means for reciprocating said cylinder to and fro, selecting means at either side of said separate feeding stations, one of which will function at each station during each reciprocation of the cylinder, shafts at either side of the machine adjacent said feeding stations, driving means for said shafts rotating them in synchronism with the oscillation of said cylinder and pattern means on each shaft for determining the feeding position of said yarn feeding levers.

44. Mechanism as defined in claim 43, wherein said end shafts are further provided with mechanism for imparting ratcheting movements to the pattern means for the knitting instrumentalities.

45. In a circular knitting machine a cam periodically movable to and from a position to engage butts on knitting instrumentalities, cam means for engaging this cam to impart movements thereto once during every course and other means functioning from separate cams to nullify the continuous action of said first mentioned cam means and to allow said cam to remain in position over a plurality of courses.

46. In a circular knitting machine a cam movable to and from butt engaging position, cam means and connections therefrom to said cam for imparting periodic movements thereto, said connections including a lever one portion of which is pivoted and which engages a projection on said cam for imparting movements thereto, other means for engaging said pivoted portion of the lever to move it away from engagement with said projection thereby to nullify the effect of said mechanism for imparting periodic movements and to allow said cam to remain in position over a plurality of courses.

47. A circular knitting machine having needles independently movable to and from yarn taking position and cam means for controlling movements of the needles, means for feeding yarn to the needles, means for causing relative rotary and reciprocatory movements between the needles and cam means, and means for effecting the aforesaid relative rotary movements during the knitting of a plurality of courses to effect the knitting of ring tops of hosiery, and for effecting the aforesaid relative reciprocatory movements to effect the knitting of split-foot portions of hosiery, the said split-foot portions consisting of more than two joined portions each separately knitted with one of the said yarns, the means last mentioned also effecting aforesaid relative reciprocatory movements for the knitting of heels and toes of hosiery.

48. A circular knitting machine having needles independently movable to and from yarn taking position and cam means for controlling movements of the needles, means for feeding yarn to the needles, means for causing relative rotary and reciprocatory movements between the needles and cam means, and means for effecting the aforesaid relative rotary movements during the knitting of a plurality of courses to effect the knitting of ring tops of hosiery, and for effecting the aforesaid relative reciprocatory movements to effect the knitting of split-foot portions of hosiery, the said split-foot portions consisting of more than two joined portions each separately knitted with one of the said yarns.

49. An independent needle knitting machine having needles independently movable to and from yarn taking position, means for feeding separate yarns at each of two feeding stations, in combination with needle selection at each feeding station, the construction being such that the needle selection effects the knitting of sutures connecting partial courses knitted with different yarns and so that the sutures cross wales in successively knitted courses.

50. A circular knitting machine having a needle cylinder and cam means for independently moving the needles to and from yarn taking position, means for effecting relative reciprocating movements as between the needle cylinder and cam means, means for feeding at least three yarns to different groups of needles, and means for selectively acting upon the needles, the construction and operation being such that each group of selected needles knits one only of the said three yarns.

51. A circular knitting machine having a needle cylinder and cam means for independently moving the needles to and from yarn taking position, means for effecting relative reciprocating movements as between the needle cylinder and cam means, means for feeding at least three yarns to different groups of needles, and means for selectively acting upon the needles, the construction and operation being such that each group of selected needles knits one only of the said three yarns, and needles in addition to the said groups of needles alternately knitting two of the said three yarns to join the partial courses knitted by two of the groups of needles.

52. A circular knitting machine having a needle cylinder and cam means for independently moving the needles to and from yarn taking position, means for effecting relative reciprocating movements as between the needle cylinder and cam means, means for feeding at least three yarns to different groups of needles, and means for selectively acting upon the needles, the construction and operation being such that each group of selected needles knits one only of the said three yarns in combination with means for selectively acting upon the needles in such a manner that a varied number of needles in the several groups knit the yarn pertaining to the said group.

53. A circular knitting machine having a needle cylinder and cam means for independently moving the needles to and from yarn taking position, means for effecting relative reciprocating movements as between the needle cylinder and cam means, means for feeding at least three yarns to different groups of needles, the means for selectively acting upon the needles, the construction and operation being such that each group of selected yarns knits one only of the said three yarns, and needles in addition to the said groups of needles alternately knitting two of the said three yarns to join the partial courses knitted by two of the groups of needles in combination with means for selectively acting upon the needles in such a manner that a varied number of needles in the several groups knit the yarn pertaining to the said group.

54. A circular knitting machine having needles independently movable to and from yarn taking position and a needle cylinder in which the said needles are mounted, yarn guides and cam means for imparting to the needles their independent movements, there being relative reciprocatory movements between the needle bed and the yarn guides, means for selectively acting upon the yarn guides in such a manner that each of a plurality of said yarn guides is moved to and from feeding position during each relative movement, in one direction, between the needle cylinder and yarn guides.

55. A circular knitting machine having needles independently movable to and from yarn taking position, cam means and yarn guides between which and the needle cylinder there are relative reciprocatory movements, means for selectively acting upon the yarn guides so that not more than two of said guides are in position to feed their respective yarns to groups of needles other than groups of needles pertaining to the several yarn guides during a relative movement, in one direction, between the needle cylinder and yarn guides, in combination with means for selectively acting upon the needles during each of a plurality of successive reciprocations as aforesaid.

56. A method of reciprocatorily knitting a tubular fabric in a circular knitting machine including the feeding and knitting of at least three yarns by groups of needles, periodically moving each of the several yarns to a position to be taken by needles and knitted for a part of each reciprocatory course, and holding said yarns in feeding position for a period substantially less than the entire period consumed in knitting a reciprocatory course, selecting the groups of needles at each reciprocation so that certain groups will knit courses progressively increasing in length while other groups knit courses decreasing in length correspondingly, and knitting said parts of courses together on common needles at the ends of each group.

57. A circular knitting machine having in combination a needle bed, needles and means for reciprocating said bed and needles throughout a stroke sufficient in extent so that the terminal loops at the end of each stroke of knitting will be interknitted to form a suture, and means for feeding several yarns to the needles in each reciprocatory course and connecting together the areas formed by each of the several yarns by knitted sutures.

58. In a circular knitting machine the combination of knitting instrumentalities, a cam block and cams including a center cam for functioning upon instrumentalities, means for withdrawing said cam block and means for preventing the withdrawal of the center cam as the cam block is withdrawn.

ROBERT H. LAWSON.
ISAAC H. C. GREEN.